(12) United States Patent
Laulicht et al.

(10) Patent No.: US 11,469,465 B2
(45) Date of Patent: Oct. 11, 2022

(54) SAFELY INGESTIBLE BATTERIES THAT RAPIDLY DEACTIVATE IN BIOLOGICAL ENVIRONMENTS AND METHODS OF MAKING SAME

(71) Applicant: Fenwood Labs Inc., Fairfield, CT (US)

(72) Inventors: Bryan Laulicht, Danbury, CT (US); Jonah Myerberg, Lexington, MA (US); Ravikumar Vasudevan, Fairfield, CT (US); Zachary Kelly, Middletown, CT (US)

(73) Assignee: Fenwood Labs Inc., Fairfield, CT (US)

( * ) Notice: Subject to any disclaimer, the term of this patent is extended or adjusted under 35 U.S.C. 154(b) by 0 days.

(21) Appl. No.: 17/410,904

(22) Filed: Aug. 24, 2021

(65) Prior Publication Data

US 2022/0069389 A1    Mar. 3, 2022

Related U.S. Application Data

(60) Provisional application No. 63/070,623, filed on Aug. 26, 2020.

(51) Int. Cl.
| | |
|---|---|
| *H01M 50/124* | (2021.01) |
| *H01M 50/109* | (2021.01) |
| *H01M 50/133* | (2021.01) |
| *H01M 50/186* | (2021.01) |
| *H01M 50/56* | (2021.01) |
| *H01M 50/562* | (2021.01) |
| *H01M 50/119* | (2021.01) |
| *H01M 50/545* | (2021.01) |

(Continued)

(52) U.S. Cl.
CPC ........ *H01M 50/124* (2021.01); *H01M 4/366* (2013.01); *H01M 4/626* (2013.01); *H01M 50/109* (2021.01); *H01M 50/119* (2021.01); *H01M 50/133* (2021.01); *H01M 50/184* (2021.01); *H01M 50/186* (2021.01); *H01M 50/545* (2021.01); *H01M 50/56* (2021.01); *H01M 50/562* (2021.01); *H01M 2004/021* (2013.01); *H01M 2200/00* (2013.01)

(58) Field of Classification Search
None
See application file for complete search history.

(56) References Cited

U.S. PATENT DOCUMENTS

| | | |
|---|---|---|
| 3,655,450 A | 4/1972 | Soto-Krebs |
| 4,028,138 A | 6/1977 | Dey |

(Continued)

FOREIGN PATENT DOCUMENTS

| | | |
|---|---|---|
| DE | 102014015641 A1 | 4/2015 |
| EP | 989624 A1 | 3/2000 |

(Continued)

OTHER PUBLICATIONS

Machine translation of Takahashi et al. (JP 2017126420 A).*

(Continued)

*Primary Examiner* — Haixia Zhang
(74) *Attorney, Agent, or Firm* — McNeill Baur PLLC

(57) ABSTRACT

The present disclosure provides batteries that have a reduced risk or no risk of esophageal or gastrointestinal damage in a conductive aqueous environment, such as when accidentally swallowed. The batteries are, in some embodiments, nominally 9V, 3V or 1.5V coin or button cell-type batteries.

30 Claims, 25 Drawing Sheets

(51) Int. Cl.
  *H01M 50/184* (2021.01)
  *H01M 4/36* (2006.01)
  *H01M 4/62* (2006.01)
  *H01M 4/02* (2006.01)

(56) References Cited

U.S. PATENT DOCUMENTS

| | | |
|---|---|---|
| 4,128,705 A | 12/1978 | Winsel |
| 5,069,989 A | 12/1991 | Uetani et al. |
| 5,187,033 A | 2/1993 | Koshiba |
| 6,083,644 A | 7/2000 | Watanabe et al. |
| 6,245,464 B1 | 6/2001 | Spillman et al. |
| 6,551,742 B1 | 4/2003 | Huq et al. |
| 6,586,134 B2 | 7/2003 | Skoumpris |
| 6,828,060 B2 | 12/2004 | Zavilenski |
| 7,378,186 B2 | 5/2008 | Suzuki et al. |
| 8,383,269 B2 | 2/2013 | Scott et al. |
| 9,077,022 B2 | 7/2015 | Howard et al. |
| 9,130,200 B2 | 9/2015 | DiPietro et al. |
| 9,520,582 B2 | 12/2016 | Kawabata et al. |
| 9,711,798 B2 | 7/2017 | Son et al. |
| 9,741,975 B2 | 8/2017 | Laulicht et al. |
| 9,865,862 B2 | 1/2018 | Ok |
| 9,985,320 B2 | 5/2018 | Bettinger et al. |
| 10,103,361 B2 | 10/2018 | Takahashi et al. |
| 10,608,236 B2 | 3/2020 | Pozin et al. |
| 10,629,859 B2 | 4/2020 | Yagishita et al. |
| 10,693,119 B2 | 6/2020 | Wyser et al. |
| 10,700,362 B2 | 6/2020 | Boolish et al. |
| 10,763,486 B2 | 9/2020 | Bae |
| 10,826,050 B1 | 11/2020 | Kaehr et al. |
| 10,826,112 B2 | 11/2020 | Matsushita et al. |
| 10,868,284 B2 | 12/2020 | Laulicht et al. |
| 10,998,552 B2 | 5/2021 | Lanning et al. |
| 11,196,077 B2 | 12/2021 | Kim et al. |
| 11,196,089 B2 | 12/2021 | Ogihara |
| 2002/0187392 A1 | 12/2002 | Ishizaki |
| 2006/0115724 A1 | 6/2006 | Buckle et al. |
| 2007/0283558 A1 | 12/2007 | Kelemen et al. |
| 2015/0214514 A1 | 7/2015 | Imanishi et al. |
| 2016/0020436 A1 | 1/2016 | Laulicht et al. |
| 2017/0018776 A1* | 1/2017 | Kim ................... H01M 4/60 |
| 2017/0324069 A1 | 11/2017 | Laulicht et al. |
| 2018/0076467 A1 | 3/2018 | Boolish et al. |
| 2018/0159092 A1 | 6/2018 | Barenberg et al. |
| 2018/0159093 A1 | 6/2018 | Barenberg et al. |
| 2019/0140248 A1 | 5/2019 | Bae |
| 2019/0161847 A1 | 5/2019 | Ready et al. |
| 2021/0083297 A1 | 3/2021 | Kanai et al. |
| 2021/0234144 A1 | 7/2021 | Hawa et al. |
| 2021/0336297 A1 | 10/2021 | Suzuki |
| 2022/0069311 A1 | 3/2022 | Laulicht et al. |
| 2022/0069389 A1 | 3/2022 | Laulicht et al. |

FOREIGN PATENT DOCUMENTS

| | | |
|---|---|---|
| EP | 2058890 A3 | 1/2012 |
| EP | 2803096 A1 | 11/2014 |
| EP | 3707765 B1 | 11/2021 |
| EP | 3921155 A1 | 12/2021 |
| JP | H03275463 A | 12/1991 |
| JP | 2013033937 A | 2/2013 |
| JP | 2017-126420 * | 7/2017 |
| WO | 2013106821 A1 | 7/2013 |
| WO | 2014164098 A1 | 10/2014 |
| WO | 2016103590 A1 | 6/2016 |
| WO | 2016179507 A1 | 11/2016 |
| WO | 2016179508 A2 | 12/2016 |
| WO | 2017119033 A1 | 7/2017 |
| WO | 2020251998 A1 | 12/2020 |
| WO | 2021059592 A1 | 4/2021 |
| WO | 2021059927 A1 | 4/2021 |

OTHER PUBLICATIONS

International Search Report and Written Opinion issued in International Application No. PCT/US20/36963, dated Sep. 2, 2020; 11 pages.

Hong et al., "Annealing induced interfacial layers in niobium-clad stainless steel developed as a bipolar plate material for polymer electrolyte membrane fuel cell stacks" Journal of Power Sources 1(95), pp. 2592-2598 (2010).

Hong et al., "Effect of annealing on two different niobium-clad stainless steel PEMFC bipolar plate materials" Transactions of Nonferrous Metals Society of China, pp. s56-s60 (2009).

Hong et al., "Niobium-clad 304L stainless steel PEMFC bipolar plate material Tensile and bend properties" Science Direct Journal of Power Sources, p. 408-417 (2007).

International Search Report and Written Opinion issued in International Application No. PCT/US21/47379, dated Jan. 6, 2022; 15 pages.

* cited by examiner

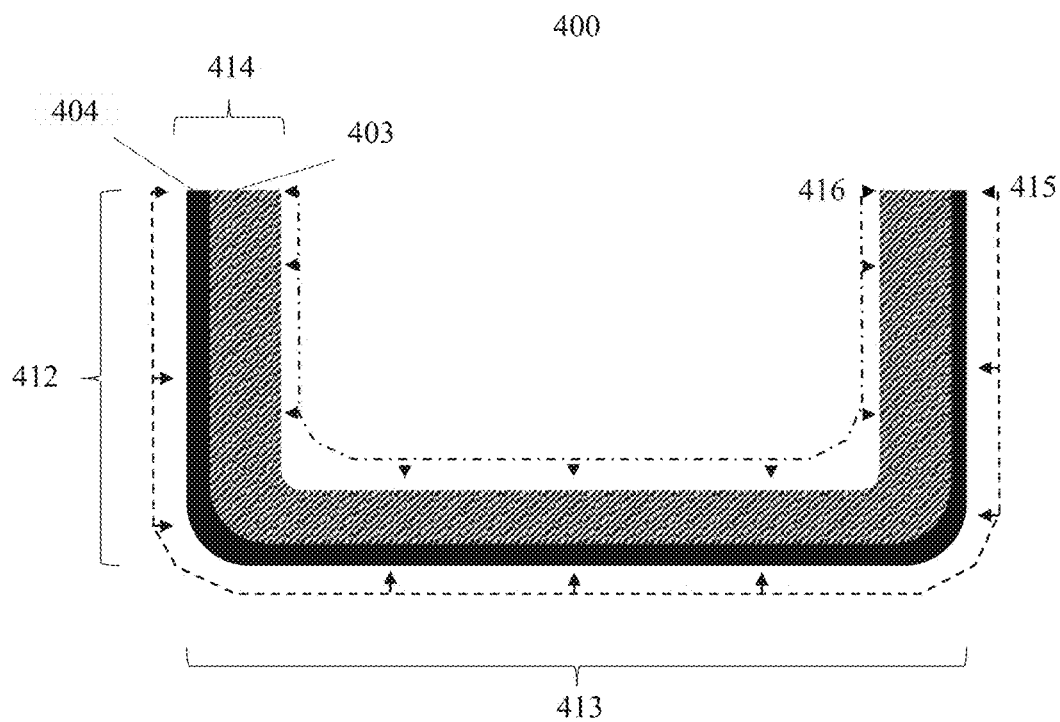
Fig. 4
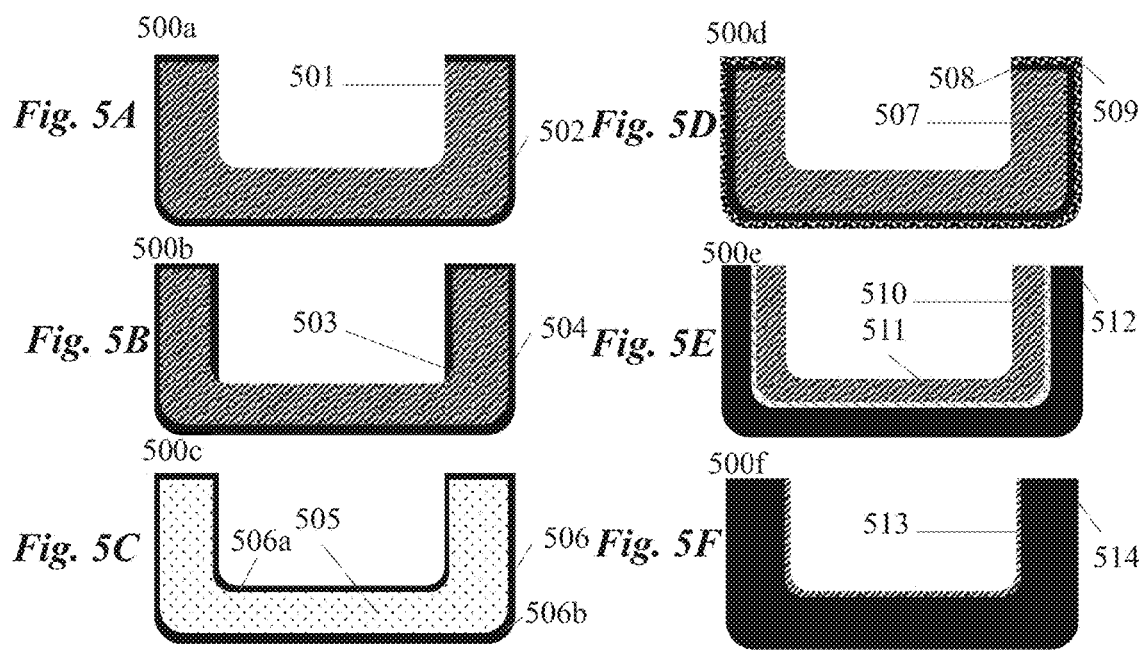

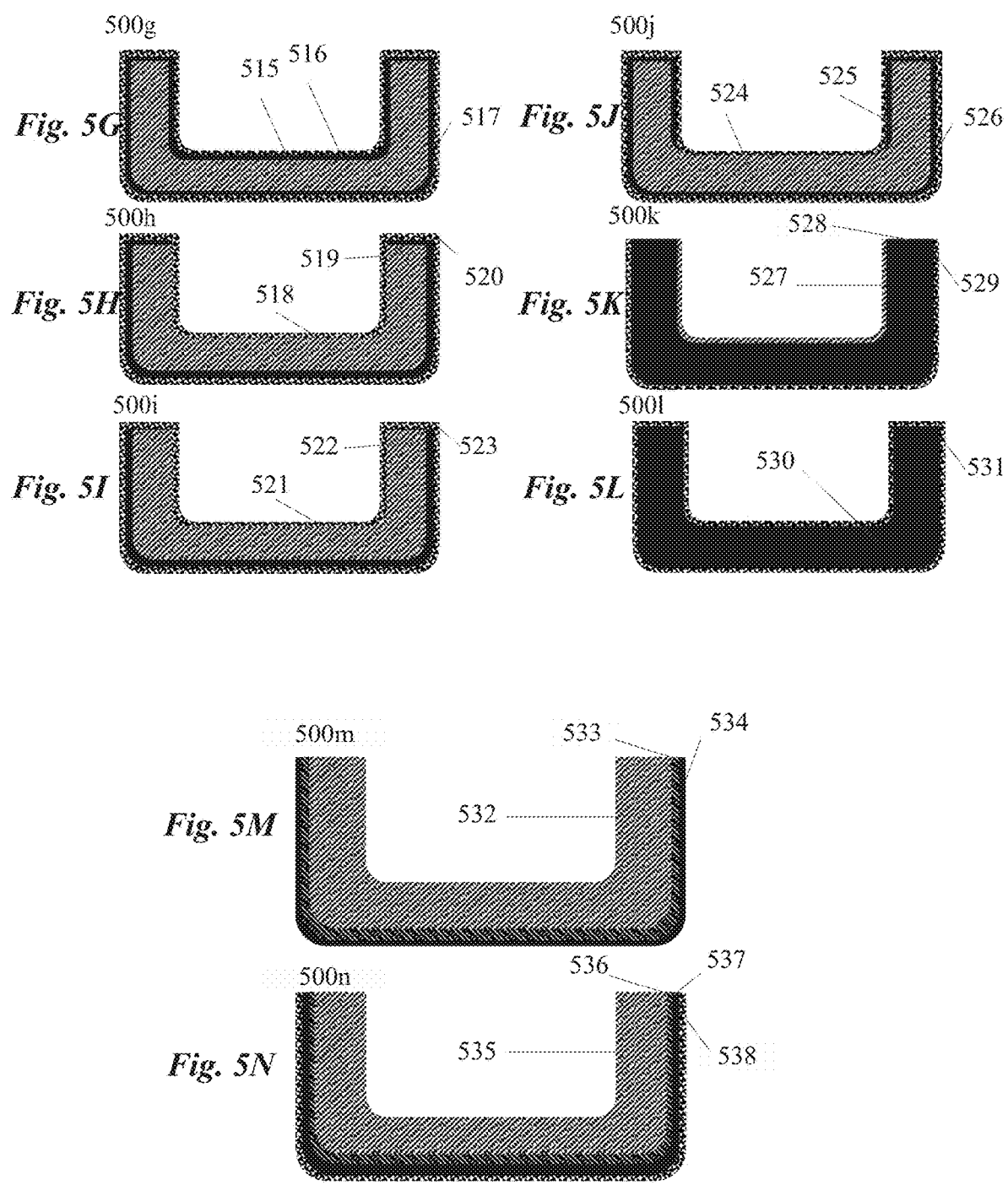

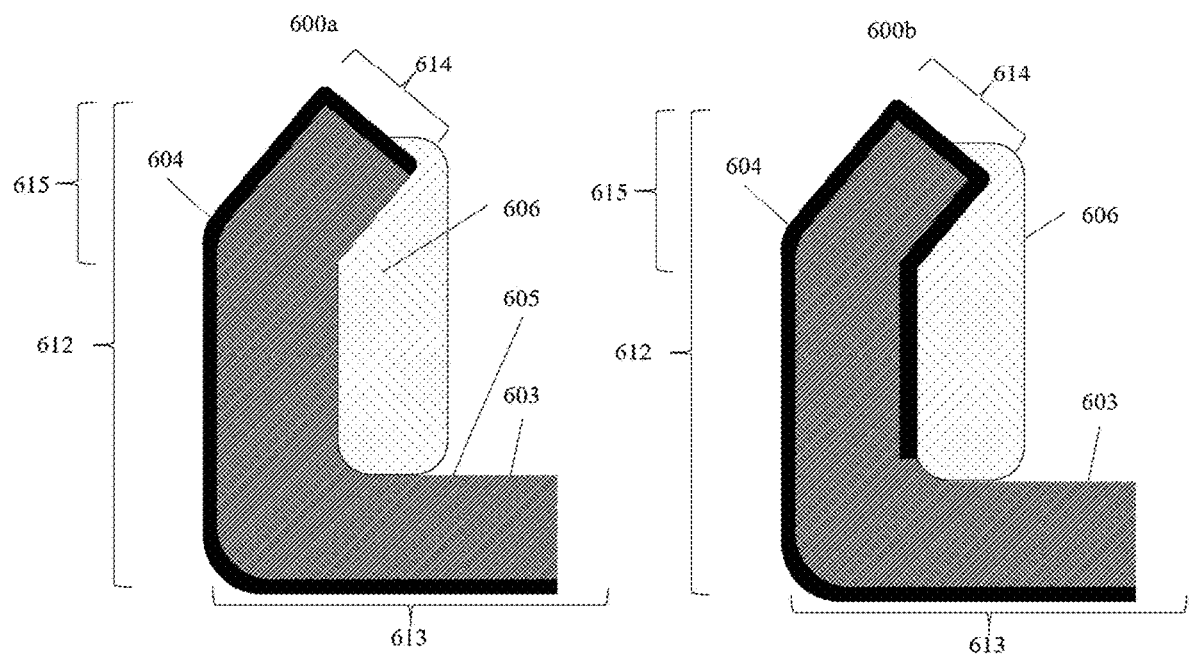
Fig. 6A  Fig. 6B
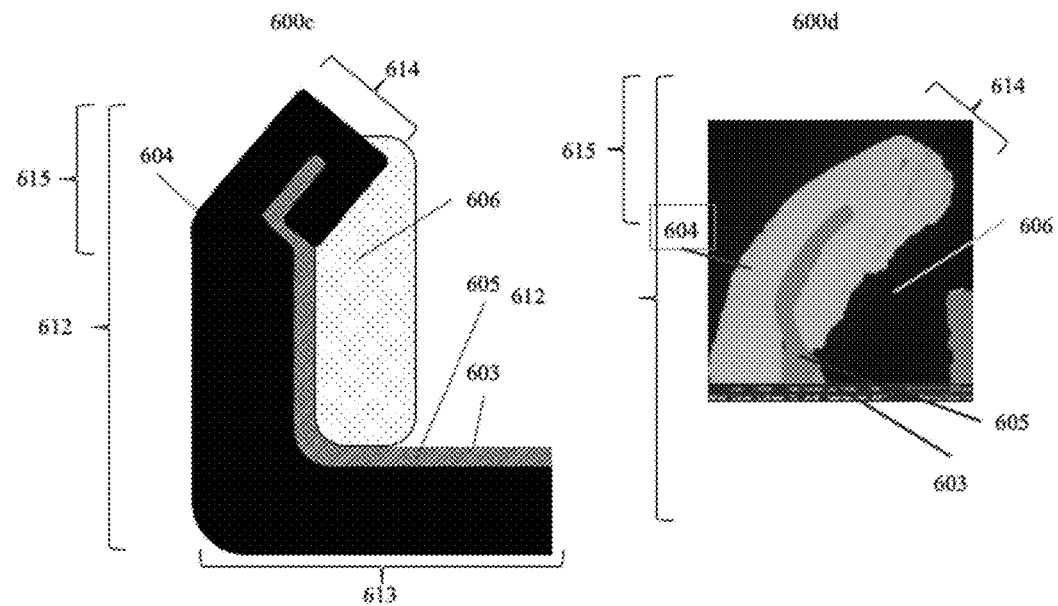
Fig. 6C  Fig. 6D

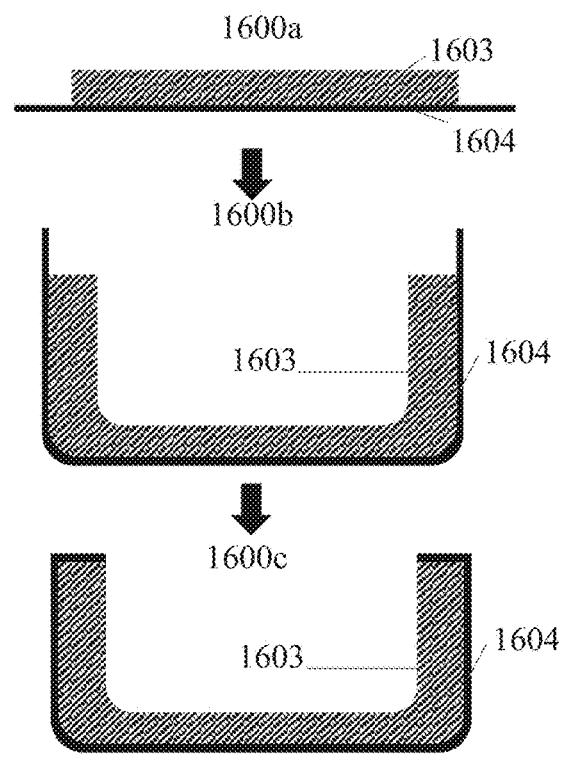
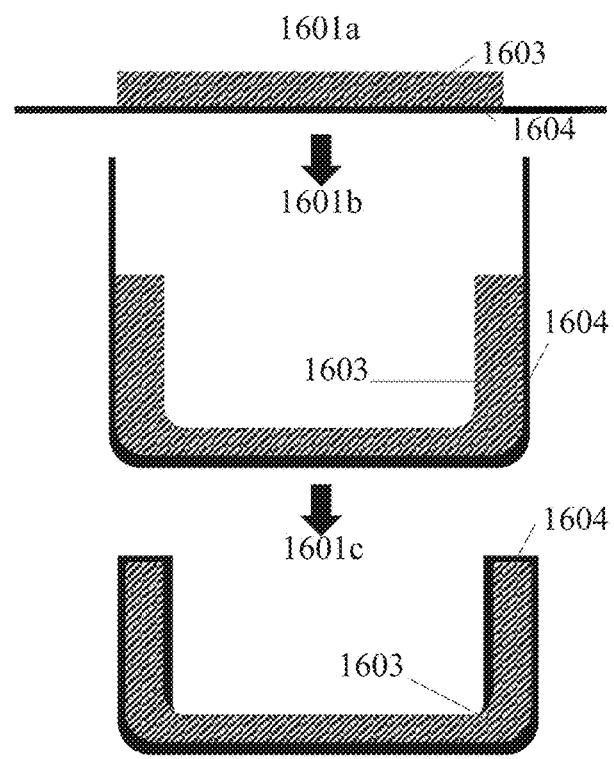
*Fig. 16A*  *Fig. 16B*
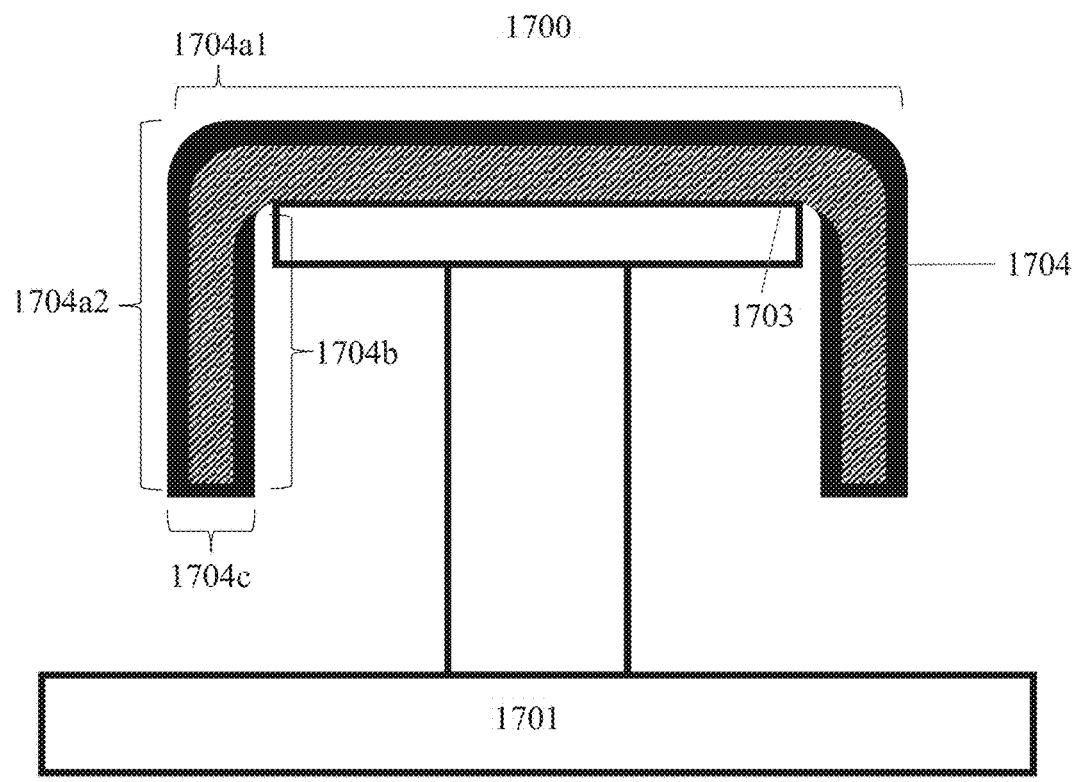
*Fig. 17*

2101-3.3V after 120 min 2102-3.3V after 30 min

SAFELY INGESTIBLE BATTERIES THAT RAPIDLY DEACTIVATE IN BIOLOGICAL ENVIRONMENTS AND METHODS OF MAKING SAME

CROSS-REFERENCE TO RELATED APPLICATIONS

This application claims the benefit of priority to U.S. Provisional Application No. 63/070,623, filed Aug. 26, 2020, which is incorporated by reference herein in its entirety for any purpose.

FIELD

The present disclosure is generally directed to batteries, and more particularly, batteries that have a reduced risk or de minimis risk of esophageal and/or gastrointestinal damage in biological, electrically conductive aqueous environments, such as when accidentally swallowed.

BACKGROUND

Billions of batteries are sold each year to power electronic devices including, for example, remote controls, flashlights, cameras, car key fobs, calculators, scales, musical greeting cards, glucometers, watches, thermometers, virtual pet devices, hearing aids, laser pointers, games, toys, the internet of things devices, and the like. Unfortunately, children, pets, and the elderly are at risk of ingesting batteries due to their widespread presence in the home and society at large.

Ingestion of batteries causes devastating injuries. Gastrointestinal (GI) obstruction is a risk from ingestion of any foreign object. But battery ingestion is far more severe than ingestion of comparably sized objects, such as coins, because of tissue damage caused when the battery discharges in the GI tract. Current flow in conductive GI fluids can cause electrolysis and generate hydroxide ions, thereby creating long-term tissue damage in the digestive tract. Damage from ingested batteries has caused acute injuries including esophageal and other GI perforations, tracheoesophageal fistulae, atrioesophageal fistulae, esophageal stenosis, esophageal stricture, chemical burns and vocal cord paralysis. These injuries can cause permanent, life-altering damage and even death. Case studies have shown that GI perforation in humans can occur as soon as five hours after battery ingestion. In pets, severe GI damage occurs even more quickly, with reports of transmural esophageal necrosis within one hour of ingestion in dogs and within two to four hours in cats.

Potentially less common, but no less concerning, are injuries in the ear, ear canal, and nasal cavities that result when a battery becomes lodged in those areas of the body.

As manufacturers create more powerful and more energy dense batteries in smaller casings, battery ingestion and injury is on the rise. The increase in battery power results in a corresponding increase in severity of injuries and mortality from battery ingestion. Though safety standards now regulate locked battery compartments in toys, little has been done to the design of the batteries themselves to make them safer. Indeed, the incidence of battery ingestion-related injuries has continued to rise even after the introduction of tamper proof packaging in batteries and locked battery compartments, as shown in FIG. 1.

Numerous attempts have been made to mitigate the problems caused by battery ingestion. However no safely ingestible batteries that rapidly deactivate in biological environment exist today.

Some initial work, reflected in U.S. Pat. No. 5,069,989, was premised on the theory that acidic gastric juices corroded the battery casing to a point where the alkaline electrolyte actually leaked out of the cell and caused tissue damage. The proposed solution was a chrome-based alloy of stainless steel that was supposed to be resistant to acidic corrosion; however, subsequent experience (as evidenced by the steady increase of per capita major or fatal outcomes shown in FIG. 1 and confirmed by the inventors' own observations) suggests this theory and/or the solution itself was ineffective. It is also known that ingested batteries that become lodged in the esophagus cause injury before being exposed to gastric fluids.

More recent investigations established hydrolysis as a cause of injuries. Specifically, when a coin cell becomes lodged in the esophagus, the aqueous biological fluid surrounding the cell completes a closed circuit that discharges the cell allowing electrolytic current to flow. The resultant reactions on and near the surface of the cell casing lead to the formation of hydroxide ions by hydrolysis which causes alkaline burns and, potentially, tissue perforations in the esophagus.

Exposure to electrolytic current can be very damaging to tissue as the pH rises to unsafe levels. In some instances ingested batteries cause debilitating injuries and have even led to fatal events. One proposed solution constructed a battery cell with a polymer fuse-type mechanism. U.S. Pat. No. 9,130,200 discloses coating an anode with a polymer fuse that decomposes upon contact with bodily fluids. U.S. Pat. No. 10,763,486 discloses the use of a "spacer" comprising an electronically insulating material that dissolves, softens, or swells upon exposure to an aqueous solution, with the spacer configured to electronically decouple the cell when such changes occur. Unfortunately, these proposed solutions do not address the need to deactivate the cell rapidly and are not commercially viable because they introduce inactive materials into cells that have predetermined sizes, thereby reducing the volumetric capacity of the cell.

Similar questions of efficacy arise in connection with the invention contemplated by U.S. Pat. No. 10,700,362. Here, a soluble acid is coated onto the cell in an amount intended to be sufficient to neutralize the amounts of hydroxide created by the hydrolysis reaction. However, given that the cell capacity and the unabated oxidation of the cathode results in large, sustained rises in pH, the soluble acid volumes are likely insufficient to stop the ingested battery from causing significant damage over time. Such coatings are also susceptible to degradation under higher than ambient temperatures and relative humidity levels.

Each of the aforementioned battery designs and/or battery materials are generally incompatible with existing battery manufacturing processes. None of the proposals offer a component or components that can be utilized in an established battery production line, which in some circumstances may be a significant impediment to the large scale adoption required to address the injuries caused by battery ingestion.

An additional proposal focused on the selection of specialized alloys that were believed to be resistant to reactions that formed hydrogen gas during exposure to saliva-containing solutions. Patent Cooperation Treaty publication WO 2013/106821 recommends the selection of materials with high hydrogen gas evolution overpotentials, including materials such as nickel, specific grades of stainless steel, titanium, gold, niobium, and tantalum. Notably, this disclosure is limited to reaction materials producing an open circuit voltage of at least 2.0 volts in a non-aqueous electrolyte (with the applicants claiming devices with open circuit voltage of at least 2.8 voltage and noting that the lower output voltage of 1.5V of an alkaline cell made it less likely to produce harmful electrolysis reactions). If the material's hydrogen gas evolution overpotential were the only consideration for making a safe battery, then deactivation of the electrolytic reaction upon exposure to a conductive aqueous medium would be instantaneous, which importantly does not happen. If the material overpotential were the only consideration then any one of the proposed metals would work equally well, which as shown in Example i) and FIG. 30, they do not.

More specifically, WO 2013/106821 does not consider the current output, when cell circuits are made with the proposed materials, as electrodes come in contact with aqueous media. For instance, when a electrochemical cell using gold as a cathode electrode and stainless steel 430 as the anode electrode in a neutral salt solution and the cell is then subject to a 3V potential, the resultant cell circuit produces an electrolysis reaction leading to an increase in pH in the environment at and near the cathode. In other words, the proposed solution of using gold to cover the battery casing would not prevent electrochemical burns where the battery came into contact with biological tissues. This effect is even more pronounced in the presence of simulated gastric fluid and occurs at 1.5V as seen in Example i) and FIG. 30, contrary to the WO 2013/106821 teaching that the 1.5V alkaline cells are less likely to produce harmful electrolysis reactions. Therefore, the proposed mechanism of employing any metal with a sufficiently high hydrogen gas overpotential, like gold, does not produce the desired safety improvements.

Notably absent from the disclosure in WO 2013/106821 are design and manufacturing details that provide a battery that functions as a battery when used in a device and rapidly deactivates upon ingestion or exposure to a conductive aqueous medium. Many materials are suggested, but few are tested and none successfully undergo a traditional manufacturing step of stamping or hem-folding. While at least some of the test devices comprising titanium and stainless steel were stamped into a cathode can shape, the stamping process is known to form cracks in the outer layer that expose the underlying stainless steel resulting in batteries that are not safe if ingested. In addition some of the stamped stainless steel cans are sputtered coated or plated with gold.

In WO 2013/106821, when gold, or titanium or a S32750 (+)/55 Cu-32 Sn-12 Zn alloy-plated steel(−) couple were tested, the S32750(+)/55 Cu-32 Sn-12 Zn alloy-plated steel (−) couple at the anode is identified as the best embodiment. In other tests using stainless steel battery cases plated with nickel or gold, it is noted that the gold lots performed poorly. This embodiment is in operable partly because the gold coating was incomplete, as noted in the disclosure, which allows for exposure of stainless steel, and partly because gold does not create an oxide. FIG. 30 shows the lack of oxide growth on gold under a potential in an aqueous conductive medium. In addition, the reference discloses that duplex stainless steel proved to be a strong candidate even when coupled to a nickel negative electrode.

U.S. Pat. No. 10,103,361 proposes a three-layer cladding material in which the surface of a coin cell casing is made of nickel, with an underlying intermediate layer of titanium (all clad on top of an ordinary battery container). Under ingestion conditions, the nickel layer dissolves, exposing the titanium layer of the ingested battery. During the time that the outer nickel layer is dissolving, the hydrolysis reaction continues, causing tissue damage. In addition, it is generally known that titanium clad-materials do not function as indicated in this reference.

Accordingly, there remains a need to provide batteries that do not cause significant tissue damage when accidentally ingested. There is a need to provide a component or components of a battery that may be easily incorporated into existing battery manufacturing processes that will allow for the manufacture of a battery that does not cause significant tissue damage when ingested. More particularly, there is a need to provide batteries that do not generate a significant amount of hydroxide for long periods of time at a potential difference above the electrolysis threshold of approximately 1.23 V when immersed in an electrically conductive aqueous environment, such as a GI tract. Even more particularly, there is a need to provide batteries that comprise a material capable of growing a metal oxide layer within 2 hours, or within 1 hour or within 30 min after being immersed in an electrically conductive aqueous environment, such as a GI tract. Even more particularly, there is a need to provide batteries that comprise a material capable of reducing or eliminating electrolytic current within 2 hours, or within 1 hour or within 30 min after being immersed in an electrically conductive aqueous environment, such as a GI tract.

SUMMARY

The present disclosure is based in part on the findings that use of oxide forming deactivating metals in a cathode or anode case of a battery suppresses or reduces injuries caused by that battery if ingested. Accordingly, one aspect described herein provides a battery comprising a cathode or anode case comprising a deactivating metal.

The following embodiments are provided.

Embodiment 1 is a battery comprising:
a) an anode case;
b) a cathode case comprising a deactivating metal;
c) an electrochemical cell comprising an anode, a cathode, and a separator positioned between the anode and the cathode; and
d) a gasket between the anode case and the cathode case; wherein the deactivating metal is present in a layer that has a uniform or varying thickness of 100 nm to 400 μm.

Embodiment 2 is the battery of embodiment 1, wherein the deactivating metal comprises Nb, Ta, an alloy thereof, or any combination thereof.

Embodiment 3 is the battery of embodiment 1 or embodiment 2, wherein the deactivating metal is present in a layer that has a uniform or varying thickness of 100 nm to 1 μm, 100 nm to 3 μm, 100 nm to 5 μm, 100 nm to 10 μm, 1 μm to 400 μm, 3 μm to 100 μm, 3 μm to 50 μm, 15 μm to 300 μm, 14 μm to 200 μm, 25 μm to 50 μm, 50 μm to 400 μm, 50 μm to 300 μm, 50 μm to 200 μm, 50 μm to 175 μm, 55 μm to 400 μm, 55 μm to 300 μm, 55 μm to 200 μm, 60 μm to 400 μm, 60 μm to 300 μm, 60 μm to 200 μm, 200 μm to 300 μm, or 300 μm to 400 μm.

Embodiment 4 is the battery of any one of embodiments 1 to 3, wherein the cathode case consists essentially of a layer comprising the deactivating metal, wherein the layer has a uniform or varying thickness of 15 μm to 300 μm, 14 μm to 200 μm, or greater than 50 μm to 300 μm.

Embodiment 5 is the battery of any one of embodiments 1 to 4, wherein the cathode case consists of a layer comprising the deactivating metal, wherein the layer has a uniform or varying thickness of 15 μm to 300 μm, 14 μm to 200 μm, or greater than 50 μm to 300 μm.

Embodiment 6 is the battery of any one of embodiments 1 to 5, wherein the battery further comprises an external coating on an outer surface of the anode case, or an outer surface of the cathode case, or both, wherein the external coating comprises Ni, Al, Cu, Cr, Zn, an alloy thereof, or any combination of two or more thereof.

Embodiment 7 is the battery of any one of embodiments 1 to 6, wherein the battery further comprises an external coating on an outer surface of the anode case, or an outer surface of the cathode case, or both, wherein the external coating comprises Ni, Al, Cu, Cr, Zn, an alloy thereof, or any combination of two or more thereof, and further wherein the external coating has a uniform or varying thickness of 100 nm to 7 µm, 100 nm to 5 µm, or of 100 nm to 200 nm.

Embodiment 8 is the battery of any one of embodiments 1 to 7, wherein the cathode case comprises
a cathode inner conductive layer, and
a cathode deactivating layer comprising the deactivating metal, wherein the cathode inner conductive layer and the cathode deactivating layer are in electrical contact.

Embodiment 9 is the battery of any one of embodiments 1 to 8, wherein the cathode case comprises
a cathode inner conductive layer,
a cathode deactivating layer comprising the deactivating metal, wherein the cathode inner conductive layer and the cathode deactivating layer are in electrical contact; and
wherein the battery further comprises an external coating on an outer surface of the anode case, or an outer surface of the cathode case, or both, wherein the external coating comprises Ni, Al, Cu, Cr, Zn, an alloy thereof, or any combination of two or more thereof, and wherein the external coating and the cathode deactivating layer are in electrical contact.

Embodiment 10 is the battery of embodiment 1 or embodiment 2, wherein the cathode case consists essentially of
a cathode inner conductive layer, and
a cathode deactivating layer comprising the deactivating metal, wherein the cathode inner conductive layer and the cathode deactivating layer are in electrical contact.

Embodiment 11 is the battery of embodiment 1 or embodiment 2, wherein the cathode case consists of
a cathode inner conductive layer, and
a cathode deactivating layer comprising the deactivating metal, wherein the cathode inner conductive layer and the cathode deactivating layer are in electrical contact.

Embodiment 12 is the battery of any one of embodiments 8 to 11, wherein the cathode deactivating layer has a uniform or varying thickness of 1 µm to 400 µm, 15 µm to 300 µm, 14 µm to 200 µm, or greater than 50 µm to 400 µm, or greater than 50 µm to 300 µm, or greater than 50 µm to 200 µm, or greater than 50 µm to 175 µm.

Embodiment 13 is the battery of any one of embodiments 8 to 12, wherein the cathode deactivating layer has a uniform or varying thickness of 1 µm to 400 µm, 15 µm to 300 µm, 14 µm to 200 µm, or greater than 50 µm to 400 µm, or greater than 50 µm to 175 µm, and the cathode inner conductive layer has a uniform or varying thickness of 75 µm to 350 µm, or of 125 µm to 350 µm, or of 200 µm to 300 µm, or of 25 µm to 100 µm.

Embodiment 14 is the battery of any one of embodiments 8 to 13, wherein the ratio of the thickness of the cathode deactivating layer to the thickness of the inner conductive layer is from 8:1 to 1:5, or 8:1 to 1:3, or 8:1 to 1:2, or 8:1 to 1:1.1, or 8:1 to 1:1, or 6:1 to 1:5, or 6:1 to 1:3, or 6:1 to 1:2, or 6:1 to 1:1.1, or 6:1 to 1:1, 3:1 to 1:5, or 3:1 to 1:3, or 3:1 to 1:2, or 3:1 to 1:1.1, or 3:1 to 1:1, or 2:1 to 1:5, or 2:1 to 1:3, or 2:1 to 1:2, or 2:1 to 1:1.1, or 2:1 to 1:1, or from 8:1 to 1:2.5, or from 8:1 to 1:3, or 8:1 to 1:2, or 8:1 to 1:1.1, or 8:1 to 1:1, or 6:1 to 1:2, or 3:1 to 1:2; for example at least at a point in a bottom portion of the cathode case.

Embodiment 15 is the battery of any one of embodiments 8 to 14, wherein the external coating has a uniform or varying thickness of 100 nm to 200 nm.

Embodiment 16 is the battery of any one of embodiments 9 to 15, wherein the external coating comprises Ni.

Embodiment 17 is the battery of any one of embodiments 8 to 16, wherein the surface of the cathode inner conductive layer that is in electrical contact with the cathode deactivating layer is not exposed to an ambient environment after manufacture.

Embodiment 18 is the battery of embodiment 17, wherein less than 0.01 mm$^2$, or less than 0.05 mm$^2$, or less than 0.1 mm$^2$, or less than 0.5 mm$^2$, or less than 1.0 mm$^2$, or less than 1.5 mm$^2$ of the surface of the cathode inner conductive layer that is in electrical contact with the cathode deactivating layer is exposed to an ambient environment after manufacture.

Embodiment 19 is the battery of any one of embodiments 1 to 18, wherein the cathode case is prepared from a clad laminate comprising a deactivating layer having a uniform or varying thickness of 60 µm to 200 µm and a conductive layer having a uniform or varying thickness of 50 µm to 190 µm; and
wherein the cathode case has a uniform or varying thickness of 200 µm to 250 µm; and
wherein the cathode case comprises a hem fold having a deactivating layer having a uniform or varying thickness of 14 µm to 75 µm on each side of the hem fold and a total inner conductive layer thickness of 222 µm to 50 µm; and
wherein the cathode case comprises an annular side wall comprising a deactivating layer having a uniform or varying thickness of 60 µm to 200 µm and an inner conductive layer thickness of 190 µm to 50 µm.

Embodiment 19a is the battery of any one of embodiments 1 to 18, wherein the cathode case is prepared from a clad laminate comprising a deactivating layer having a uniform or varying thickness of 60 µm to 200 µm and a conductive layer having a uniform or varying thickness of 50 µm to 190 µm; and
wherein the cathode case has a uniform or varying thickness of 200 µm to 250 µm; and
wherein the cathode case comprises a hem fold and wherein the hem fold comprises a first side and a second side, and further wherein each of the first and second sides have a deactivating layer with uniform or varying thickness of 14 µm to 75 µm and the hem fold has a total thickness of 200 µm to 250 µm where the first side of the hem fold contacts the second side of the hem fold.

Embodiment 20 is the battery of any one of embodiments 1 to 19, wherein the cathode case comprises a hem fold structure.

Embodiment 21 is the battery of any one of embodiments 8 to 20, wherein the cathode deactivating layer comprises a first layer comprising a first deactivating metal and a second layer comprising a second deactivating metal.

Embodiment 22 is the battery of any one of embodiments 8 to 21, wherein the cathode deactivating layer comprises a first layer comprising Ta or an alloy thereof.

Embodiment 23 is the battery of any one of embodiments 8 to 22, wherein the cathode deactivating layer comprises a first layer comprising Ta or an alloy thereof, wherein the first layer has a uniform or varying thickness of 1 µm to 3 µm.

Embodiment 24 is the battery of any one of embodiments 8 to 23, wherein the cathode deactivating layer comprises a second layer comprising Nb or an alloy thereof.

Embodiment 25 is the battery of any one of embodiments 8 to 24, wherein the cathode deactivating layer comprises a second layer comprising Nb or an alloy thereof, wherein the second layer has a uniform or varying thickness of 10 µm to 250 µm.

Embodiment 26 is the battery of any one of embodiments 8 to 25, wherein the cathode inner conductive layer has a uniform or varying thickness of 100 µm to 350.

Embodiment 27 is the battery of any one of embodiments 1 to 26, wherein the anode case comprises a deactivating metal, wherein the deactivating metal is present in a layer that has a uniform or varying thickness of 100 nm to 400 µm.

Embodiment 28 is the battery of any one of embodiments 1 to 27, wherein the anode case comprises a deactivating metal comprising Nb, Ta, an alloy thereof, or any combination thereof.

Embodiment 29 is the battery of any one of embodiments 1 to 28, wherein the anode case comprises
an anode inner conductive layer, and
an anode deactivating layer comprising the deactivating metal, wherein the anode inner conductive layer and the anode deactivating layer are in electrical contact.

Embodiment 30 is the battery of any one of embodiments 1 to 29, wherein the anode case comprises
an anode inner conductive layer,
an anode deactivating layer comprising the deactivating metal, wherein the anode inner conductive layer and the anode deactivating layer are in electrical contact; and
wherein the battery further comprises an external coating on an outer surface of the anode case, or an outer surface of the cathode case, or both, wherein the external coating comprises Ni, Al, Cu, Cr, Zn, an alloy thereof, or any combination of two or more thereof, and wherein the external coating and the anode deactivating layer are in electrical contact.

Embodiment 31 is the battery of any one of embodiments 1-3, 8, or 10-29, wherein the anode case consists essentially of
an anode inner conductive layer, and
an anode deactivating layer comprising the deactivating metal, wherein the anode inner conductive layer and the anode deactivating layer are in electrical contact.

Embodiment 32 is the battery of any one of embodiments 1-3, 8, or 10-29, wherein the anode case consists of
an anode inner conductive layer, and
an anode deactivating layer comprising the deactivating metal, wherein the anode inner conductive layer and the anode deactivating layer are in electrical contact.

Embodiment 33 is the battery of any one of embodiments 29 to 32, wherein the anode deactivating layer has a uniform or varying thickness of 100 nm to 1 µm, 100 nm to 3 µm, 100 nm to 5 µm, 100 nm to 10 µm, 1 µm to 400 µm, 3 µm to 100 µm, 3 µm to 50 µm, 15 µm to 300 µm, 14 µm to 200 µm, 25 µm to 50 µm, 50 µm to 400 µm, 50 µm to 300 µm, 50 µm to 200 µm, 50 µm to 175 µm, 55 µm to 400 µm, 55 µm to 300 µm, 55 µm to 200 µm, 60 µm to 400 µm, 60 µm to 300 µm, 60 µm to 200 µm, 200 µm to 300 µm, or 300 µm to 400 µm.

Embodiment 34 is the battery of any one of embodiments 29 to 33, wherein the anode deactivating layer has a uniform or varying thickness of 15 µm to 300 µm, 14 µm to 200 µm, or greater than 50 µm to 300 µm and the anode inner conductive layer has a uniform or varying thickness of 75 µm to 350 µm, or of 125 µm to 350 µm, or of 200 µm to 300 µm, or 25 µm to 100 µm.

Embodiment 35 is the battery of any one of embodiments 29 to 34, wherein the anode deactivating layer comprises a first layer comprising a first deactivating metal and a second layer comprising a second deactivating metal.

Embodiment 36 is the battery of any one of embodiments 29 to 35, wherein the anode deactivating layer comprises a first layer comprising Ta or an alloy thereof.

Embodiment 37 is the battery of any one of embodiments 29 to 36, wherein the anode deactivating layer comprises a first layer comprising Ta or an alloy thereof, wherein the first layer has a uniform or varying thickness of 1 µm to 3 µm.

Embodiment 38 is the battery of any one of embodiments 29 to 37, wherein the anode deactivating layer comprises a second layer comprising Nb or an alloy thereof.

Embodiment 39 is the battery of any one of embodiments 35 to 38, wherein the second layer has a uniform or varying thickness of 10 µm to 250 µm.

Embodiment 40 is the battery of any one of embodiments 22 to 32, wherein the anode inner conductive layer has a uniform or varying thickness of 100 µm to 350 µm.

Embodiment 41 is the battery of embodiment 1, wherein the deactivating metal comprises Re, W, or an alloy thereof.

Embodiment 42 is the battery of embodiment 41, wherein the deactivating metal is present in a layer that has a uniform or varying thickness of 100 nm to 1 µm, 100 nm to 3 µm, 100 nm to 5 µm, 100 nm to 10 µm, 3 µm to 100 µm, 1 µm to 400 µm, 3 µm to 50 µm, 15 µm to 300 µm, 14 µm to 200 µm, 25 µm to 50 µm, 50 µm to 400 µm, 50 µm to 300 µm, 50 µm to 200 µm, 50 µm to 175 µm, 55 µm to 400 µm, 55 µm to 300 µm, 55 µm to 200 µm, 60 µm to 400 µm, 60 µm to 300 µm, 60 µm to 200 µm, 200 µm to 300 µm, or 300 µm to 400 µm.

Embodiment 43 is the battery of embodiment 41 or 42, wherein the battery further comprises an external coating on an outer surface of the anode case, or an outer surface of the cathode case, or both, wherein the external coating comprises Ni, Al, Cu, Cr, Zn, an alloy thereof, or any combination of two or more thereof.

Embodiment 44 is the battery of any one of embodiments 41 to 43, wherein the battery further comprises an external coating on an outer surface of the anode case, or an outer surface of the cathode case, or both, wherein the external coating comprises Ni, Al, Cu, Cr, Zn, an alloy thereof, or any combination of two or more thereof, and further wherein the external coating has a uniform or varying thickness of 100 nm to 7 µm, 100 nm to 5 µm, or of 100 nm to 200 nm.

Embodiment 45 is the battery of any one of embodiments 41 to 44, wherein the cathode case comprises
a cathode inner conductive layer, and
a cathode deactivating layer comprising the deactivating metal, wherein the cathode inner conductive layer and the cathode deactivating layer are in electrical contact.

Embodiment 46 is the battery of any one of embodiments 41 to 45, wherein the cathode case comprises
a cathode inner conductive layer,
a cathode deactivating layer comprising the deactivating metal, wherein the cathode inner conductive layer and the cathode deactivating layer are in electrical contact; and
wherein the battery further comprises an external coating on an outer surface of the anode case, or an outer surface of the cathode case, or both, wherein the external coating comprises Ni, Al, Cu, Cr, Zn, an alloy thereof, or any combination of two or more thereof, and wherein the external coating and the cathode deactivating layer are in electrical contact.

Embodiment 47 is the battery of embodiment 41, 42, or 45 wherein the cathode case consists essentially of
a cathode inner conductive layer, and
a cathode deactivating layer comprising the deactivating metal, wherein the cathode inner conductive layer and the cathode deactivating layer are in electrical contact.

Embodiment 48 is the battery of embodiment 41, 42, or 45 wherein the cathode case consists of
a cathode inner conductive layer, and
a cathode deactivating layer comprising the deactivating metal, wherein the cathode inner conductive layer and the cathode deactivating layer are in electrical contact.

Embodiment 49 is the battery of any one of embodiments 45 to 48, wherein the cathode deactivating layer has a uniform or varying thickness of 15 µm to 300 µm, 14 µm to 200 µm, or greater than 50 µm to 400 µm, or greater than 50 µm to 300 µm, or greater than 50 µm to 200 µm, or greater than 50 µm to 175 µm.

Embodiment 50 is the battery of any one of embodiments 45 to 49, wherein the cathode deactivating layer has a uniform or varying thickness of 15 µm to 300 µm, 14 µm to 200 µm, or greater than 50 µm to 400 µm, or greater than 50 µm to 175 µm and the cathode inner conductive layer has a uniform or varying thickness of 75 µm to 350 µm, or of 125 µm to 350 µm, or of 200 µm to 300 µm, or of 25 µm to 100 µm.

Embodiment 51 is the battery of any one of embodiments 45 to 50, wherein the ratio of the thickness of the cathode deactivating layer to the thickness of the inner conductive layer is from 8:1 to 1:5, or 8:1 to 1:3, or 8:1 to 1:2, or 8:1 to 1:1.1, or 8:1 to 1:1, or 6:1 to 1:5, or 6:1 to 1:3, or 6:1 to 1:2, or 6:1 to 1:1.1, or 6:1 to 1:1, 3:1 to 1:5, or 3:1 to 1:3, or 3:1 to 1:2, or 3:1 to 1:1.1, or 3:1 to 1:1, or 2:1 to 1:5, or 2:1 to 1:3, or 2:1 to 1:2, or 2:1 to 1:1.1, or 2:1 to 1:1, or from 8:1 to 1:2.5, or from 8:1 to 1:3, or 8:1 to 1:2, or 8:1 to 1:1.1, or 8:1 to 1:1, or 6:1 to 1:2, or 3:1 to 1:2; for example at least at a point in a bottom portion of the cathode case.

Embodiment 52 is the battery of any one of embodiments 45 to 51, wherein the external coating has a uniform or varying thickness of 100 nm to 200 nm.

Embodiment 53 is the battery of any one of embodiments 45 to 52, wherein the external coating comprises Ni.

Embodiment 54 is the battery of any one of embodiments 45 to 53, wherein the surface of the cathode inner conductive layer that is in electrical contact with the cathode deactivating layer is not exposed to an ambient environment after manufacture.

Embodiment 55 is the battery of any one of embodiments 45 to 54, wherein less than 0.01 mm², or less than 0.05 mm², or less than 0.1 mm², or less than 0.5 mm², or less than 1.0 mm², or less than 1.5 mm² of the surface of the cathode inner conductive layer that is in electrical contact with the cathode deactivating layer is exposed to an ambient environment after manufacture.

Embodiment 56 is the battery of any one of embodiments 45 to 55, wherein the cathode case is prepared from a clad laminate comprising a deactivating layer having a uniform or varying thickness of 60 µm to 200 µm and a conductive layer having a uniform or varying thickness of 50 µm to 190 µm; and
wherein the cathode case has a uniform or varying thickness of 200 µm to 250 µm; and
wherein the cathode case comprises a hem fold and wherein the hem fold comprises a first side and a second side, and further wherein each of the first and second sides have a deactivating layer with uniform or varying thickness of 14 µm to 75 µm and the hem fold has a total thickness of 200 µm to 250 µm where the first side of the hem fold contacts the second side of the hem fold.

Embodiment 57 is the battery of any one of embodiments 45 to 56, wherein the cathode case comprises a hem fold structure.

Embodiment 58 is the battery of any one of embodiments 45 to 57, wherein the cathode deactivating layer comprises a first layer comprising a first deactivating metal and a second layer comprising a second deactivating metal.

Embodiment 59 is the battery of any one of embodiments 45 to 58, wherein the cathode deactivating layer comprises a first layer comprising Re, W or an alloy thereof.

Embodiment 60 is the battery of any one of embodiments 45 to 59, wherein the cathode deactivating layer comprises a first layer comprising Re, W or an alloy thereof, wherein the first layer has a uniform or varying thickness of 1 µm to 25 µm.

Embodiment 61 is the battery of any one of embodiments 45 to 60, wherein the cathode deactivating layer comprises a second layer comprising Nb or an alloy thereof.

Embodiment 62 is the battery of any one of embodiments 45 to 61, wherein the cathode deactivating layer comprises a second layer comprising Nb or an alloy thereof, wherein the second layer has a uniform or varying thickness of 5 µm to 250 µm.

Embodiment 63 is the battery of any one of embodiments 45 to 62, the cathode inner conductive layer has a uniform or varying thickness of 100 µm to 350.

Embodiment 64 is the battery of any one of embodiments 41 to 63, wherein the anode case comprises a deactivating metal, wherein the deactivating metal is present in a layer that has a uniform or varying thickness of 100 nm to 400 µm.

Embodiment 65 is the battery of any one of embodiments 41 to 64, wherein the anode case comprises a deactivating metal comprising Re, W or an alloy thereof.

Embodiment 66 is the battery of any one of embodiments 41 to 65, wherein the anode case comprises
an anode inner conductive layer, and
an anode deactivating layer comprising the deactivating metal, wherein the anode inner conductive layer and the anode deactivating layer are in electrical contact.

Embodiment 67 is the battery of any one of embodiments 41 to 66, wherein the anode case comprises
an anode inner conductive layer,
an anode deactivating layer comprising the deactivating metal, wherein the anode inner conductive layer and the anode deactivating layer are in electrical contact; and
wherein the battery further comprises an external coating on an outer surface of the anode case, or an outer surface of the cathode case, or both, wherein the external coating comprises Ni, Al, Cu, Cr, Zn, an alloy thereof, or any combination of two or more thereof, and wherein the external coating and the anode deactivating layer are in electrical contact.

Embodiment 68 is the battery of any one of embodiments 41, 42, 45, or 47-66, wherein the anode case consists essentially of
an anode inner conductive layer, and
an anode deactivating layer comprising the deactivating metal, wherein the anode inner conductive layer and the anode deactivating layer are in electrical contact.

Embodiment 69 is the battery of any one of embodiments 41, 42, 45, or 47-66, wherein the anode case consists of
an anode inner conductive layer, and an anode deactivating layer comprising the deactivating metal, wherein the anode inner conductive layer and the anode deactivating layer are in electrical contact.

Embodiment 70 is the battery of any one of embodiments 66 to 69, wherein the anode deactivating layer has a uniform or varying thickness of 100 nm to 1 µm, 100 nm to 3 µm, 100 nm to 5 µm, 100 nm to 10 µm, 3 µm to 100 µm, 1 µm to 400 µm, 3 µm to 50 µm, 15 µm to 300 µm, 14 µm to 200 µm, 25 µm to 50 µm, 50 µm to 400 µm, 50 µm to 300 µm, 50 µm to 200 µm, 50 µm to 175 µm, 55 µm to 400 µm, 55 µm to 300 µm, 55 µm to 200 µm, 60 µm to 400 µm, 60 µm to 300 µm, 60 µm to 200 µm, 200 µm to 300 µm, or 300 µm to 400 µm.

Embodiment 71 is the battery of any one of embodiments 66 to 70, wherein the anode deactivating layer has a uniform or varying thickness of 15 µm to 300 µm, 14 µm to 200 µm, or greater than 50 µm to 300 µm and the anode inner conductive layer has a uniform or varying thickness of 75 µm to 350 µm, or of 125 µm to 350 µm, or of 200 µm to 300 µm, or 25 µm to 100 µm.

Embodiment 72 is the battery of any one of embodiments 66 to 71, wherein the anode deactivating layer further comprises a first layer comprising a first deactivating metal and a second layer comprising a second deactivating metal.

Embodiment 73 is the battery of any one of embodiments 66 to 72, wherein the anode deactivating layer further comprises a first layer comprising Re, W or an alloy thereof.

Embodiment 74 is the battery of any one of embodiments 66 to 72, wherein the anode deactivating layer further comprises a first layer comprising Re, W or an alloy thereof, wherein the first layer has a uniform or varying thickness of 1 µm to 3 µm.

Embodiment 75 is the battery of any one of embodiments 66 to 72, wherein the anode deactivating layer further comprises a second layer comprising Nb or an alloy thereof.

Embodiment 76 is the battery of any one of embodiments 66 to 72, wherein the anode deactivating layer further comprises a second layer comprising Nb or an alloy thereof, wherein the second layer has a uniform or varying thickness of 10 µm to 250 µm.

Embodiment 77 is the battery of any one of embodiments 66 to 72, wherein the anode inner conductive layer has a uniform or varying thickness of 100 µm to 350 µm.

Embodiment 78 is the battery of embodiment 1, wherein the deactivating metal comprises Ti or an alloy thereof, and the battery optionally comprises an external coating on an outer surface of the anode case, or an outer surface of the cathode case, or both, wherein the external coating comprises Al, Cu, Cr, or Zn, an alloy thereof, or any combination of two or more thereof.

Embodiment 79 is the battery of embodiment 78, wherein the deactivating metal is present in a layer that has a uniform or varying thickness of greater than 50 µm to 300 µm, or greater than 50 µm to 200 µm, 200 µm to 300 µm, or 300 µm to 400 µm.

Embodiment 80 is the battery of embodiment 78 or 80, wherein the cathode case consists essentially of a layer comprising the deactivating metal, wherein the layer has a uniform or varying thickness of greater than 50 µm to 300 µm.

Embodiment 81 is the battery of embodiment 78 or 80, wherein the cathode case consists of a layer comprising the deactivating metal, wherein the layer has a uniform or varying thickness of greater than 50 µm to 300 µm.

Embodiment 82 is the battery of any one of embodiments 78 to 81, wherein the external coating is present on both the outer surface of the anode case and the outer surface of the cathode case.

Embodiment 83 is the battery of any one of embodiments 78 to 81, wherein the external coating is present on the outer surface of the anode case.

Embodiment 84 is the battery of any one of embodiments 78 to 83, wherein the external coating is present on the outer surface of the cathode case.

Embodiment 85 is the battery of any one of embodiments 78 to 84, wherein the external coating has a uniform or varying thickness of 100 nm to 7 µm, 100 nm to 5 µm, or of 100 nm to 200 nm.

Embodiment 86 is the battery of any one of embodiments 78 to 85, wherein the cathode case comprises
a cathode inner conductive layer, and
a cathode deactivating layer comprising the deactivating metal, wherein the cathode inner conductive layer and the cathode deactivating layer are in electrical contact.

Embodiment 87 is the battery of any one of embodiments 78 to 86, wherein the cathode case comprises
a cathode inner conductive layer,
a cathode deactivating layer comprising the deactivating metal, wherein the cathode inner conductive layer and the cathode deactivating layer are in electrical contact; and
wherein the battery further comprises an external coating on an outer surface of the anode case, or an outer surface of the cathode case, or both, wherein the external coating comprises Al, Cu, Cr, Zn, an alloy thereof, or any combination of two or more thereof, and wherein the external coating and the cathode deactivating layer are in electrical contact.

Embodiment 88 is the battery of any one of embodiments 78-81, or 86, wherein the cathode case consists essentially of
a cathode inner conductive layer, and
a cathode deactivating layer comprising the deactivating metal, wherein the cathode inner conductive layer and the cathode deactivating layer are in electrical contact.

Embodiment 89 is the battery of any one of embodiments 78-81, or 86, wherein the cathode case consists of
a cathode inner conductive layer, and
a cathode deactivating layer comprising the deactivating metal, wherein the cathode inner conductive layer and the cathode deactivating layer are in electrical contact.

Embodiment 90 is the battery of any one of embodiments 86 to 89, wherein the cathode deactivating layer has a uniform or varying thickness of greater than 50 µm to 400 µm, or greater than 50 µm to 300 µm, or greater than 50 µm to 200 µm, or greater than 50 µm to 175 µm.

Embodiment 91 is the battery of any one of embodiments 86 to 90, wherein the cathode inner conductive layer has a uniform or varying thickness of 75 µm to 350 µm, or of 125 µm to 350 µm, or of 200 µm to 300 µm, or of 25 µm to 100 µm.

Embodiment 92 is the battery of any one of embodiments 86 to 91, wherein the ratio of thickness of the cathode deactivating layer to the thickness of the inner conductive layer is from 8:1 to 1:5, or 8:1 to 1:3, or 8:1 to 1:2, or 8:1 to 1:1.1, or 8:1 to 1:1, or 6:1 to 1:5, or 6:1 to 1:3, or 6:1 to 1:2, or 6:1 to 1:1.1, or 6:1 to 1:1, 3:1 to 1:5, or 3:1 to 1:3, or 3:1 to 1:2, or 3:1 to 1:1.1, or 3:1 to 1:1, or 2:1 to 1:5, or 2:1 to 1:3, or 2:1 to 1:2, or 2:1 to 1:1.1, or 2:1 to 1:1, or from 8:1 to 1:2.5, for example at least at a point in a bottom portion of the cathode case, or 8:1 to 1:3, or 8:1 to 1:2, or 8:1 to 1:1.1, or 8:1 to 1:1, or 6:1 to 1:2, or 3:1 to 1:2.

Embodiment 93 is the battery of any one of embodiments 86 to 92, wherein the external coating has a uniform or varying thickness of 100 nm to 200 nm.

Embodiment 94 is the battery of any one of embodiments 86 to 93, wherein the external coating comprises Ni.

Embodiment 95 is the battery of any one of embodiments 86 to 94, wherein the surface of the cathode inner conductive layer that is in electrical contact with the cathode deactivating layer is not exposed to an ambient environment after manufacture.

Embodiment 96 is the battery of any one of embodiments 86 to 95, wherein less than 0.01 mm$^2$, or less than 0.05 mm$^2$, or less than 0.1 mm$^2$, or less than 0.5 mm$^2$, or less than 1.0 mm$^2$, or less than 1.5 mm$^2$ of the surface of the cathode inner conductive layer that is in electrical contact with the cathode deactivating layer is exposed to an ambient environment after manufacture.

Embodiment 97 is the battery of any one of embodiments 86 to 96, wherein the cathode case is prepared from a clad laminate comprising a deactivating layer having a uniform or varying thickness of 60 μm to 200 μm and a conductive layer having a uniform or varying thickness of 50 μm to 190 μm; and wherein the cathode case has a uniform or varying thickness of 200 μm to 250 μm; and wherein the cathode case comprises a hem fold having a deactivating layer having a uniform or varying thickness of 14 μm to 75 μm on each side of the hem fold and a total inner conductive layer thickness of 222 μm to 50 μm; and wherein the cathode case comprises an annular side wall comprising a deactivating layer having a uniform or varying thickness of 60 μm to 200 μm and an inner conductive layer thickness of 190 μm to 50 μm.

Embodiment 98 is the battery of any one of embodiments 86 to 97 wherein the cathode case comprises a hem fold structure.

Embodiment 99 is the battery of any one of embodiments 86 to 98, wherein the anode case comprises a deactivating metal, wherein the deactivating metal is present in a layer that has a uniform or varying thickness of greater than 50 μm to 400 μm.

Embodiment 100 is the battery of any one of embodiments 86 to 99, wherein the anode case comprises a deactivating metal comprising Ti or an alloy thereof, and the battery optionally comprises an external coating on an outer surface of the anode case, or an outer surface of the cathode case, or both, wherein the external coating comprises Al, Cu, Cr, or Zn, an alloy thereof, or any combination of two or more thereof.

Embodiment 101 is the battery of any one of embodiments 86 to 100, wherein the anode case comprises
an anode inner conductive layer, and
an anode deactivating layer comprising the deactivating metal, wherein the anode inner conductive layer and the anode deactivating layer are in electrical contact.

Embodiment 102 is the battery of any one of embodiments 86 to 101, wherein the anode case comprises
an anode inner conductive layer,
an anode deactivating layer comprising the deactivating metal, wherein the anode inner conductive layer and the anode deactivating layer are in electrical contact; and
wherein the battery further comprises an external coating on an outer surface of the anode case, or an outer surface of the cathode case, or both, wherein the external coating comprises Al, Cu, Cr, Zn, an alloy thereof, or any combination of any two or more thereof, and wherein the external coating and the anode deactivating layer are in electrical contact.

Embodiment 103 is the battery of any one of embodiments 78-81, 86, or 88-101, wherein the anode case consists essentially of
an anode inner conductive layer, and
an anode deactivating layer comprising the deactivating metal, wherein the anode inner conductive layer and the anode deactivating layer are in electrical contact.

Embodiment 104 is the battery of any one of embodiments 78-81, 86, or 88-101, wherein the anode case consists of
an anode inner conductive layer, and
an anode deactivating layer comprising the deactivating metal, wherein the anode inner conductive layer and the anode deactivating layer are in electrical contact.

Embodiment 105 is the battery of any one of embodiments 101 to 104, wherein the anode deactivating layer has a uniform or varying thickness of 50 μm to 100 μm.

Embodiment 106 is the battery of any one of embodiments 101 to 105, wherein the anode inner conductive layer has a uniform or varying thickness of 100 μm to 350 μm.

Embodiment 107 is the battery of any one of embodiments 1 to 106, further comprising at least one binding layer disposed between a cathode inner conductive layer and a cathode deactivating layer, an anode inner conductive layer and an anode deactivating layer, or both, wherein the inner conductive layer and the deactivating layer remain in electrical contact.

Embodiment 108 is the battery of any one of embodiments 1 to 107, further comprising at least one binding layer disposed between a cathode inner conductive layer and a cathode deactivating layer, an anode inner conductive layer and an anode deactivating layer, or both, wherein the inner conductive layer and the deactivating layer remain in electrical contact, wherein the at least one binding layer comprises a conductive material.

Embodiment 109 is the battery of any one of embodiments 1 to 108, further comprising at least one binding layer disposed between a cathode inner conductive layer and a cathode deactivating layer, an anode inner conductive layer and an anode deactivating layer, or both, wherein the inner conductive layer and the deactivating layer remain in electrical contact, wherein the at least one binding layer comprises a metal.

Embodiment 110 is the battery of any one of embodiments 1 to 109, further comprising at least one binding layer disposed between a cathode inner conductive layer and a cathode deactivating layer, an anode inner conductive layer and an anode deactivating layer, or both, wherein the inner conductive layer and the deactivating layer remain in electrical contact, wherein the at least one binding layer comprises an adhesive.

Embodiment 111 is the battery of any one of embodiments 1 to 110, further comprising at least one binding layer disposed between a cathode inner conductive layer and a cathode deactivating layer, an anode inner conductive layer and an anode deactivating layer, or both, wherein the inner conductive layer and the deactivating layer remain in electrical contact, wherein the at least one binding layer comprises an adhesive, wherein the adhesive comprises a pressure-sensitive adhesive, a rubber-based adhesive, an epoxy, a polyurethane, a silicone adhesive, a phenolic resin, a UV curable adhesive, an acrylate adhesive, a laminating adhesive, a fluoropolymer, or any combination of two or more thereof.

Embodiment 112 is the battery of embodiment 111, wherein the laminating adhesive comprises a low or a high-density polyethylene, a polyolefin, a polyolefin derivative, an acid-containing adhesive, an ionomer, a terpolymer of ethylene, an acrylate, or an ethylene-vinyl acetate.

Embodiment 113 is the battery of embodiment 112, wherein the acid-containing adhesive comprises EAA, EMAA, an ionomer, a terpolymer of ethylene, an acid, or an acrylate.

Embodiment 114 is the battery of any one of embodiments 107-113, wherein the at least one binding layer has a uniform or varying thickness of 100 nm to 400 µm, 100 nm to 350 µm, 1 µm to 350 µm, 200 µm to 350 µm, 1 µm to 50 µm, 5 µm to 50 µm, 50 µm to 250 µm, or 5 µm to 200 µm.

Embodiment 115 is the battery of any one of embodiments 1 to 114, wherein an anode inner conductive layer and/or a cathode inner conductive layer comprises aluminum, stainless steel, chromium, gold, vanadium, nickel, silver, copper, magnesium, zinc, an alloy thereof, or a combination of any two or more thereof.

Embodiment 116 is the battery of any one of embodiments 1 to 115, wherein an anode inner conductive layer and/or a cathode inner conductive layer comprises stainless steel.

Embodiment 117 is the battery of any one of embodiments 1 to 116, wherein the stainless steel comprises SS304, SS316, SS430, duplex 2205, duplex 2304, duplex 2507, or one or more other steel with a chromium content equal to or greater than 10% by weight and/or a nickel content equal to or greater than 0.1% by weight.

Embodiment 118 is the battery of any of embodiments 1 to 117, comprising the deactivating metal in a deactivating layer.

Embodiment 119 is the battery of any of embodiments 1 to 118, comprising the deactivating metal in a deactivating layer, wherein the deactivating layer comprises a first layer comprising a first deactivating metal, and a second layer comprising a second deactivating metal.

Embodiment 120 is the battery of any of embodiments 1 to 119, wherein the deactivating metal is a substantially pure metal.

Embodiment 121 is the battery of any of embodiments 1 to 120, wherein the deactivating metal is an alloy.

Embodiment 122 is the battery of any of embodiments 1 to 121, wherein the deactivating metal comprises an alloy of at least two deactivating metals.

Embodiment 123 is the battery of any one of embodiments 1 to 122, wherein the anode case has a uniform or varying thickness of 50 µm to 400 µm.

Embodiment 124 is the battery of any one of embodiments 1 to 123, wherein the cathode case has a uniform or varying thickness of 50 µm to 400 µm, or 200 µm to 250 µm.

Embodiment 125 is the battery of any of the embodiments 1 to 124, further comprising a water impermeable coating disposed on and covering a rim of the cathode case and optionally on a portion of an outer surface of the anode case and/or a portion of an outer surface of the cathode case.

Embodiment 126 is the battery of any of embodiments 1 to 125, further comprising a water impermeable coating disposed on a portion of an outer surface of the anode case and/or a portion of an outer surface of the cathode case and covering a rim of the cathode case, wherein the water impermeable coating is chosen from natural rubber, TFE, Exxon Butyl, chloroprene, epichlorohydrin, ethylene-propylene, flurosilicone, hydrogenated nitrile, liquid silicone rubber, medical ethylene propylene, silicone, nitrile, perfluoroelastomer, polyacrylate, polyurethane, styrene butadiene, Teflon, Vamac, PTFE, and Viton.

Embodiment 127 is the battery of any of embodiments 1 to 126, further comprising a water impermeable coating disposed on and covering a rim of the cathode case and optionally on a portion of an outer surface of the anode case and/or a portion of an outer surface of the cathode case, wherein the water impermeable coating is the same material as the gasket.

Embodiment 128 is the battery of any one of embodiments 1 to 127, comprising a cathode inner conductive layer comprising an outer bottom surface, an outer annular surface, and a rim surface, wherein the outer bottom surface is encased by a cathode deactivating layer, and the outer annular surface and the rim surface are encased by the cathode deactivating layer, the gasket, a water impermeable coating, or any combination of any two or more thereof.

Embodiment 129 is the battery of any one of embodiments 1 to 128, wherein the gasket comprises an elastomeric material or a plastic such as nylon, polytetrafluoroethylene, fluorinated ethylene-propylene, chlorotrifluoroethylene, perfluoroalkoxy polymer, polyvinyls, polyethylene, polyethylene terephthalate, polypropylene, polystyrene, polysulfone, polyacrylicates, polyurethanes, silicone rubbers, and any combination of any two or more thereof.

Embodiment 130 is the battery of any one of embodiments 125-129, wherein the water impermeable coating comprises a rubber, a buna, a silicone, silicone rubbers, a PTFE, a viton or an elastomeric material or a plastic such as nylon, polytetrafluoroethylene, fluorinated ethylene-propylene, chlorotrifluoroethylene, perfluoroalkoxy polymer, polyvinyls, polyethylene, polyethylene terephthalate, polypropylene, polystyrene, polysulfone, polyacrylicates, polyurethanes, and any combination of any two or more thereof.

Embodiment 131 is a coin cell or a cylindrical battery comprising a battery case, wherein the battery case comprises a sealing cup and a bottom can and a gasket, wherein an outer diameter of the sealing cup is smaller than an inner diameter of the bottom can and at least a portion of the sealing cup is positioned inside the bottom can with the gasket between the sealing cup and the bottom can, and wherein an annular wall of the bottom can is crimped towards an annular wall of the sealing cup, and further wherein the battery case comprises a deactivating metal.

Embodiment 132 is the battery of embodiment 131, wherein the sealing cup is an anode case and the bottom can is a cathode case, and further wherein the bottom can comprises a deactivating metal.

Embodiment 133 is the battery of embodiment 131, wherein the sealing cup is a cathode case and the bottom can is an anode case, and further wherein both the bottom can and the sealing cup comprise a deactivating metal.

Embodiment 134 is the battery of any one of embodiments 1 to 130, wherein the battery is a button or a coin cell-type battery.

Embodiment 135 is the battery of any one of embodiments 1 to 134, wherein the electrochemical cell has a voltage of 10 V or less, 5 V or less, 3 V or less, or 1 V or less.

Embodiment 136 is the battery of any one of embodiments 1 to 135, wherein the battery is a 3 volt or a 1.5 volt button or coin cell battery.

Embodiment 137 is the battery of any one of embodiments 1 to 136, wherein the battery is a CR927, CR1025, CR1130, CR1216, CR1220, CR1225, CR1616, CR1620, CR1625, CR1632, CR2012, CR2016, CR2025, CR2032, CR2320, BR2335, CR2354, CR2412, CR2430, CR2450, CR2477, CR2507, CR3032, or CR11108 lithium coin cell battery or a SR41, SR43, SR44, SR45, SR48, SR54, SR55, SR57, SR58, SR59, SR60, SR63, SR64, SR65, SR66, SR67, SR68, SR69, S516, SR416, SR731, SR512, SR714, SR712 silver oxide coin cell battery or LR41, LR44, LR54, or LR66 alkaline coin cell battery.

Embodiment 138 is the battery of any one of embodiments 1 to 137, wherein the battery is a CR2032, CR2016, or CR2025 lithium coin cell battery.

Embodiment 139 is the battery of any one of embodiments 1 to 138, wherein the battery is a AAAA, AAA, AA, A, B, C, D, E 90/N, 4001, 810, 910A, AM5, LR1, MN9100, or UM-5 cylindrical battery.

Embodiment 140 is the battery of any one of embodiments 1 to 139, wherein a conductive pathway is formed between the anode and the cathode when at least a portion of the anode case and a portion of the cathode case are in electrical contact through a conductive aqueous medium.

Embodiment 141 is the battery of any one of embodiments 1 to 140, wherein a conductive pathway is formed between the anode and the cathode through a conductive aqueous medium when at least a portion of the anode case and a portion of the cathode case contact a conductive aqueous medium, and further wherein the conductive pathway is reduced or suppressed on continued contact with the conductive aqueous medium.

Embodiment 142 is the battery of any one of embodiments 1 to 141, wherein a conductive pathway is formed between the anode and the cathode through a conductive aqueous medium when at least a portion of the anode case and a portion of the cathode case contact a conductive aqueous medium, and further wherein the conductive pathway is reduced or suppressed in less than 2 hours, or less than 1 hour, or less than 30 minutes after initial contact with the conductive aqueous medium.

Embodiment 143 is the battery of any one of embodiments 1 to 142, wherein the anode deactivating layer and/or the cathode deactivating layer oxidizes when at least a portion of the anode case and a portion of the cathode case contact a conductive aqueous medium.

Embodiment 144 is the battery of any one of embodiments 1 to 143, wherein the anode deactivating layer and/or the cathode deactivating layer oxidizes forming an oxide layer when at least a portion of the anode case and a portion of the cathode case contact a conductive aqueous medium, and wherein the battery provides a current of less than 1.5 mA, or of less than 1 mA, or of less than 0.5 mA, or of less than 0.3 mA after the oxide layer is formed.

Embodiment 145 is the battery of any one of embodiments 1 to 144, wherein the anode deactivating layer and/or the cathode deactivating layer oxidizes forming an oxide layer when at least a portion of the anode case and a portion of the cathode case contact a conductive aqueous medium, and wherein the battery provides a current of less than 1.5 mA, or of less than 1 mA, or of less than 0.5 mA, or of less than 0.3 mA after the oxide layer is formed and further wherein the oxide layer is formed in less than 2 hours, or less than 1 hour, or less than 30 minutes after initial contact with the conductive aqueous medium.

Embodiment 146 is the battery of any one of embodiments 1 to 145, wherein an electrolysis reaction occurs when at least a portion of the anode case and a portion of the cathode case contact a conductive aqueous medium, which the electrolysis reaction is suppressed or reduced in less than two hours, or less than 1 hour, or less than 30 minutes, after initial contact with the conductive aqueous medium.

Embodiment 147 is the battery of any one of embodiments 140 to 146, wherein the contact with the conductive aqueous medium comprises placement of the battery on a hydrated tissue such that the hydrated tissue contacts both at least a part of the anode case and a part of the cathode case to form a conductive pathway.

Embodiment 148 is the battery of embodiment 147, wherein the hydrated tissue is hydrated pig esophageal tissue.

Embodiment 149 is the battery of any one of embodiments 140 to 146 wherein the contact with the conductive aqueous medium comprises immersion in 25% Ringer's solution.

Embodiment 150 is the battery of embodiment 149, wherein after immersion for 120 minutes, or for 60 minutes, or for 20 minutes, or for 10 min in 25% Ringer's solution, the pH of the 25% Ringer's solution is less than 9, or less than 8, or less than 7.

Embodiment 151 is the battery of embodiment 149 or 150, wherein 25% Ringer's solution has a starting pH of 5 to 7.5, and after immersion of the battery in the 25% Ringer's solution, the average pH of the 25% Ringer's solution, sampled at 5-minute intervals, over a 60-minute time period, does not exceed an average pH of 10, 9.5, 9, 8.5, or 8.

Embodiment 152 is a cathode case comprising
a cathode inner conductive layer,
a cathode deactivating layer comprising a deactivating metal comprising Ta, Nb, W, Ti, alloys thereof, or any combinations thereof;
wherein the cathode deactivating layer has a uniform or varying thickness of 1 µm to 400 µm.

Embodiment 153 is the cathode case of embodiment 152, further comprising an external coating on an outer surface of the cathode case, wherein the external coating comprises Ni, Al, Cu, Cr, Zn, an alloy thereof, or any combination of two or more thereof.

Embodiment 154 is the cathode case of embodiment 153, wherein the external coating has a uniform or varying thickness of 100 nm to 7 µm or 100 nm to 5 µm.

Embodiment 155 is the cathode case of embodiment 153 or 154, wherein the external coating has a uniform or varying thickness of 100 nm to 200 nm.

Embodiment 156 is the cathode case of any one of embodiments 153 to 155, wherein the external coating comprises Ni.

Embodiment 157 is the cathode case of any one of embodiments 152-156, wherein the cathode deactivating layer has a uniform or varying thickness of 14 µm to 200 µm.

Embodiment 158 is the cathode case of any one of embodiments 152-157, wherein deactivating metal comprises Nb, or an alloy thereof.

Embodiment 159 is the cathode case of any one of embodiments 152-157, wherein deactivating metal comprises Ta, or an alloy thereof.

Embodiment 160 is the cathode case of any one of embodiments 152-157, wherein deactivating metal comprises W, or an alloy thereof.

Embodiment 161 is the cathode case of any one of embodiments 152-157, wherein deactivating metal comprises Ti, or an alloy thereof.

Embodiment 162 is the cathode case of any one of embodiments 152-157, wherein deactivating metal comprises Re, or an alloy thereof.

Embodiment 163 is the cathode case of any one of embodiments 152-1162, wherein the cathode inner conductive layer has a uniform or varying thickness of 100 µm to 350 µm.

Embodiment 164 is the cathode case of any one of embodiments 152-163, wherein the cathode inner conductive layer comprises aluminum, stainless steel, chromium, gold, vanadium, nickel, silver, copper, magnesium, zinc, an alloy thereof, or a combination of any two or more thereof.

Embodiment 165 is the cathode case of any one of embodiments 152-164, wherein the cathode inner conductive layer comprises stainless steel.

Embodiment 166 is the cathode case of any one of embodiments 152-165, wherein the ratio of thickness of the cathode deactivating layer to the thickness of the inner conductive layer is from 8:1 to 1:5, or 8:1 to 1:3, or 8:1 to 1:2, or 8:1 to 1:1.1, or 8:1 to 1:1, or 6:1 to 1:5, or 6:1 to 1:3, or 6:1 to 1:2, or 6:1 to 1:1.1, or 6:1 to 1:1, 3:1 to 1:5, or 3:1 to 1:3, or 3:1 to 1:2, or 3:1 to 1:1.1, or 3:1 to 1:1, or 2:1 to 1:5, or 2:1 to 1:3, or 2:1 to 1:2, or 2:1 to 1:1.1, or 2:1 to 1:1, or from 8:1 to 1:2.5, or from 8:1 to 1:3, or 8:1 to 1:2, or 8:1 to 1:1.1, or 8:1 to 1:1, or 6:1 to 1:2, or 3:1 to 1:2; for example at least at a point in a bottom portion of the cathode case.

Embodiment 167 is the cathode case of any one of embodiments 152-166, wherein the cathode deactivating layer oxidizes forming an oxide layer when at least a portion of the anode case and a portion of the cathode case contact a conductive aqueous medium, and wherein the battery provides a current of less than 1.5 mA, or of less than 1 mA, or of less than 0.5 mA, or of less than 0.3 mA after the oxide layer is formed and further wherein the oxide layer is formed in less than 2 hours, or less than 1 hour, or less than 30 minutes after initial contact with the conductive aqueous medium.

Embodiment 168 is the cathode case of any one of embodiments 152-167, (i) wherein the surface of the cathode inner conductive layer that is in electrical contact with the cathode deactivating layer is not exposed to an ambient environment after manufacture; or (ii) wherein less than 0.01 mm$^2$, or less than 0.05 mm$^2$, or less than 0.1 mm$^2$, or less than 0.5 mm$^2$, or less than 1.0 mm$^2$, or less than 1.5 mm$^2$ of the surface of the cathode inner conductive layer that is in electrical contact with the cathode deactivating layer is exposed to an ambient environment after manufacture.

Embodiment 169 is the cathode case of any one of embodiments 1 to 168, wherein the cathode case comprises a hem fold structure.

Embodiment 170 is the cathode case of any one of embodiments 152-169, wherein the cathode inner conductive layer and the cathode deactivating layer together comprise a clad laminate.

Embodiment 171 is the cathode case of any one of embodiments 152-170, wherein the cathode case is prepared from a clad laminate comprising a deactivating layer having a uniform or varying thickness of 60 µm to 200 µm and a conductive layer having a uniform or varying thickness of 50 µm to 190 µm; and
wherein the cathode case has a uniform or varying thickness of 200 µm to 250 µm; and
wherein the cathode case comprises a hem fold and wherein the hem fold comprises a first side and a second side, and further wherein each of the first and second sides have a deactivating layer with uniform or varying thickness of 14 µm to 75 µm and the hem fold has a total thickness of 200 µm to 250 µm where the first side of the hem fold contacts the second side of the hem fold.

Embodiment 172 is the cathode case of any one of embodiments 152-170, wherein the cathode case is interchangeable with the cathode case of a commercially manufactured button cell battery or a coin cell battery.

Embodiment 173 is a laminate comprising:
a conductive layer, wherein the conductive layer has a uniform or varying thickness of 10 µm to 400 µm, and
a deactivating layer comprising a deactivating metal chosen from Ta, Nb, W, Ti, alloys thereof, and combinations thereof, wherein the deactivating layer has a uniform or varying thickness of 10 µm to 400 µm, and
wherein the laminate is for use in an anode case or a cathode case.

Embodiment 174 is the laminate of embodiment 173, further comprising an external coating.

Embodiment 175 is the laminate of embodiment 173 or 174, wherein the conductive layer has a uniform or varying thickness of 175 µm to 300 µm.

Embodiment 176 is the laminate of any one of embodiments 173 to 175, wherein the deactivating layer has a uniform or varying thickness of 1 µm to 100 µm.

Embodiment 177 is the laminate of any one of embodiments 174 to 176, wherein the external coating has a uniform or varying thickness of 100 nm to 7 µm, 100 nm to 5 µm, or from 100 nm to 200 nm.

Embodiment 178 is the laminate of any one of embodiments 173 to 177, wherein the laminate has a uniform or varying thickness of 50 µm to 330 µm.

Embodiment 179 is a method of manufacturing a laminate for use in an anode case or a cathode case, wherein the laminate comprises:
a conductive layer, and
a deactivating layer, comprising a deactivating metal chosen from Ta, Nb, W, Ti, alloys thereof, and combinations thereof, wherein the method comprises:
laminating the conductive layer and the deactivating layer.

Embodiment 180 is a method of manufacturing a laminate for use in an anode case or a cathode case, wherein the laminate comprises:
a conductive layer, wherein the conductive layer has a uniform or varying thickness of 10 µm to 400 µm, and
a deactivating layer, comprising a deactivating metal chosen from Ta, Nb, W, Ti, alloys thereof, and combinations thereof, wherein the deactivating layer has a uniform or varying thickness of 10 µm to 400 µm, and,
wherein the method comprises:
cladding the conductive layer and the deactivating layer.

Embodiment 181 is the method of manufacturing of embodiment 179 or 180, wherein the conductive layer has a uniform or varying thickness of 50 µm to 100 µm, or 75 µm to 200 µm, or 175 µm to 300 µm.

Embodiment 182 is the method of manufacturing of any one of embodiments 179 to 181, wherein the deactivating layer has a uniform or varying thickness of 1 µm to 75 µm, or 50 µm to 100 µm, or 75 µm to 200 µm, or 175 µm to 300 µm.

Embodiment 183 is the method of manufacturing of any one of embodiments 179 to 182, wherein the laminate thickness has a uniform or varying thickness of 75 µm to 400 µm.

Embodiment 184 is the method of manufacturing of any one of embodiments 179 to 183, wherein the method further comprises laminating an external coating to the deactivating layer of the laminate.

Embodiment 185 is the method of manufacturing of any one of embodiments 179 to 183, wherein the method further comprises cladding the external coating to the deactivating layer of the laminate.

Embodiment 186 is the method of manufacturing of any one of embodiments 179 to 183, wherein the method further comprises vapor depositing the external coating onto the deactivating layer of the laminate.

Embodiment 187 is a method of manufacturing a laminate for use in the anode case or the cathode case of the battery of any one of embodiments 1 to 171, wherein the laminate comprises:
a conductive layer,
a deactivating layer,
wherein the method comprises:
laminating the conductive layer and the deactivating layer; and
wherein the method optionally comprises laminating an external coating to the deactivating layer, wherein the deactivating layer is disposed between the conductive layer and the external coating.

Embodiment 188 is a method of manufacturing a laminate for use in the anode case or the cathode case of the battery of any one of embodiments 1 to 171, wherein the laminate comprises:
a conductive layer,
a deactivating layer,
wherein the method comprises:
cladding the conductive layer and the deactivating layer; and
wherein the method optionally comprises cladding an external coating to the deactivating layer, wherein the deactivating layer is disposed between the conductive layer and the external coating.

Embodiment 189 is a laminate manufactured by the method of any one of embodiments 179 to 188.

Embodiment 190 is the laminate of any one of the embodiments 173 to 178 or 189, wherein the conductive layer comprises stainless steel.

Embodiment 191 is a method of manufacturing a cathode case comprising: stamping the laminate of any one of embodiments 173 to 178 or 189 to form a cathode case comprising a bottom, an annular side, and a rim; and wherein the conductive layer forms an interior surface of the cathode case, and the deactivating layer forms an outer surface of the cathode case.

Embodiment 192 is a method of manufacturing a cathode case comprising: stamping the laminate of any one of embodiments 173 to 178 or 189 to form a cathode case comprising a bottom, an annular side, and a rim; and wherein the conductive layer forms an interior surface of the cathode case, and
the external coating forms an outer surface of the cathode case, and wherein a deactivating layer is between the conductive layer and the external coating, and wherein the deactivating layer is in electrical contact with both the conductive layer and the external coating.

Embodiment 193 is the method of embodiment 191 or 192 further comprising:
drawing the annular side of the cathode case to form an extension annular side of the cathode case and a lower annular side of the cathode case wherein the extension annular side has a narrower thickness than the lower annular side; and
folding the extension annular side towards the center of the cathode case to form a hem fold.

Embodiment 194 is a method of manufacturing a cathode case comprising: providing an internal support member comprising a bottom, an annular side, a rim, an inner surface, and an outer surface;
depositing a deactivating layer on the outer surface of the internal support; and
depositing a first conductive material on the inner surface of the internal support and optionally the rim to form an inner conductive layer.

Embodiment 195 is a method of manufacturing a cathode case comprising: providing an internal support member comprising a bottom, an annular side, a rim, an inner surface, and an outer surface;
depositing a deactivating layer on the outer surface of the internal support;
depositing a first conductive material on the inner surface of the internal support and optionally the rim to form an inner conductive layer; and
depositing a second conductive material on the deactivating layer and optionally the rim to form an external coating.

Embodiment 196 is a method of manufacturing a cathode case comprising:
a) forming a deactivating metal into a deactivating cup having a bottom, an annular side, a rim, and each of the bottom, annular side, and rim having an interior surface, and an exterior surface;
b) forming an inner conductive metal into an inner conductive cup having a bottom, an annular side, and a rim, and each of the bottom, annular side, and rim having an interior surface, and an exterior surface;
c) placing the inner conductive cup into the deactivating cup, wherein the exterior surfaces of the inner conductive cup are in electrical contact with the inner surfaces of the deactivating cup, thereby forming the cathode case.

Embodiment 197 is the method of embodiment 196, wherein the annular side of the deactivating cup extends beyond the annular side of the inner conductive cup; and further comprising the step of folding the rim of the deactivating cup over the rim of the inner conductive cup to form a hem fold.

Embodiment 198 is the method of embodiment 196, wherein the rim of the deactivating cup partially covers the rim of the inner conductive cup, or wherein the rim of the deactivating cup covers the rim of the inner conductive cup.

Embodiment 199 is the method of any one of embodiments 196 to 198, wherein the forming of the deactivating cup and/or the inner conductive cup comprises a process chosen from stamping, wire forming, metal casting or metal injection molding.

Embodiment 200 is a cathode case manufactured by the method of any one of embodiments 191 to 199.

Embodiment 201 is a battery comprising the cathode case of embodiment 200.

Embodiment 202 is a battery comprising the cathode case and/or the anode case of any one of FIGS. 2, 3, 4, 5A-N, 6A-D, 7A-B, 8, 10, 13, 14A-D, 15, 16A-B, 17 and 30.

Embodiment 203 is a battery comprising:
a) an anode case;
b) a cathode case comprising:
 i) a cathode inner conductive layer comprising aluminum (Al), stainless steel, chromium (Cr), gold (Au), vanadium (V), nickel (Ni), silver (Ag), copper (Cu), magnesium (Mg), zinc (Zn), an alloy thereof, or a combination of any two or more thereof, and
 ii) a cathode deactivating layer comprising a deactivating metal comprising niobium (Nb), tantalum (Ta), an alloy thereof, or any combination thereof, wherein the cathode deactivating layer has a uniform or varying thickness of 1 µm to 400 µm
 iii) wherein the ratio of thickness of the cathode deactivating layer to the thickness of the inner conductive layer is from 8:1 to 1:2.5, for example at least within a portion of a bottom of the cathode case,
 iv) wherein the cathode case has a uniform or varying thickness of 50 µm to 400 µm, v) wherein the cathode case comprises a hem fold structure, vi) and further wherein the cathode inner conductive layer and the cathode deactivating layer are in electrical contact, c) an electrochemical cell comprising an anode, a cathode, and a separator positioned between the anode and the cathode; and e) a gasket between the anode case and the cathode case.

Embodiment 204 is the battery of embodiment 203, wherein the deactivating metal is present in a layer that has a uniform or varying thickness of 14 µm to 200 µm.

Embodiment 205 is the battery of embodiment 203, wherein the battery further comprises an external coating on an outer surface of the anode case, or an outer surface of the cathode case, or both, wherein the external coating comprises Ni, Al, Cu, Cr, Zn, an alloy thereof, or any combination of two or more thereof, wherein the external coating has a uniform or varying thickness of 100 nm to 7 µm or 100 nm to 5 µm, Embodiment 206 is the battery of embodiment 203, wherein the ratio of thickness of the cathode deactivating layer to the thickness of the inner conductive layer is 8:1 to 1:3, or 8:1 to 1:2, or 8:1 to 1:1.1, or 8:1 to 1:1 or 6:1 to 1:2, or 3:1 to 1:2, or 2:1 to 1:2; for example at least at a point in a bottom portion of the cathode case.

Embodiment 207 is the battery of embodiment 203, wherein the external coating comprises Ni and has a uniform or varying thickness of 100 nm to 200 nm.

Embodiment 208 is the battery of embodiment 203, wherein the surface of the cathode inner conductive layer that is in electrical contact with the cathode deactivating layer is not exposed to an ambient environment after manufacture.

Embodiment 209 is the battery of embodiment 203, wherein less than 0.01 mm$^2$, or less than 0.05 mm$^2$, or less than 0.1 mm$^2$, or less than 0.5 mm$^2$, or less than 1.0 mm$^2$, or less than 1.5 mm$^2$ of the surface of the inner conductive layer that is in electrical contact with the deactivating layer is exposed to an ambient environment after manufacture.

Embodiment 210 is the battery of embodiment 203, wherein the cathode case is prepared from a clad laminate comprising a deactivating layer having a uniform or varying thickness of 60 µm to 200 µm and a conductive layer having a uniform or varying thickness of 50 µm to 190 µm; and wherein the cathode case has a uniform or varying thickness of 200 µm to 250 µm; and
wherein the cathode case comprises a hem fold having a deactivating layer having a uniform or varying thickness of 14 µm to 75 µm on each side of the hem fold and a total inner conductive layer thickness of 222 µm to 50 µm; and
wherein the cathode case comprises an annular side wall comprising a deactivating layer having a uniform or varying thickness of 60 µm to 200 µm and an inner conductive layer thickness of 190 µm to 50 µm.

Embodiment 210a is the battery of embodiment 203, wherein the cathode case is prepared from a clad laminate comprising a deactivating layer having a uniform or varying thickness of 60 µm to 200 µm and a conductive layer having a uniform or varying thickness of 50 µm to 190 µm; and wherein the cathode case has a uniform or varying thickness of 200 µm to 250 µm; and
wherein the cathode case comprises a hem fold and wherein the hem fold comprises a first side and a second side, and further wherein each of the first and second sides have a deactivating layer with uniform or varying thickness of 14 µm to 75 µm and the hem fold has a total thickness of 200 µm to 250 µm where the first side of the hem fold contacts the second side of the hem fold.

Embodiment 211 is the battery of embodiment 203, wherein the cathode inner conductive layer has a uniform or varying thickness of 100 µm to 350.

Embodiment 212 is the battery of embodiment 203, wherein the cathode inner conductive layer comprises stainless steel.

Embodiment 213 is the battery of embodiment 203, wherein the cathode case has a uniform or varying thickness of 50 µm to 400 µm, or 200 µm to 250 µm.

Embodiment 214 is the battery of embodiment 203, wherein the battery is a button or a coin cell-type battery.

Embodiment 215 is the battery of embodiment 203, wherein a conductive pathway is formed between the anode and the cathode through a conductive aqueous medium when at least a portion of the anode case and a portion of the cathode case contact a conductive aqueous medium, and further wherein the conductive pathway is reduced or suppressed in less than 2 hours, or less than 1 hour, or less than 30 minutes after initial contact with the conductive aqueous medium.

Embodiment 216 is the battery of embodiment 203, wherein the cathode deactivating layer oxidizes forming an oxide layer when at least a portion of the anode case and a portion of the cathode case contact a conductive aqueous medium, and wherein the battery provides a current of less than 1.5 mA, or of less than 1 mA, or of less than 0.5 mA, or of less than 0.3 mA after the oxide layer is formed.

Embodiment 217 is the battery of embodiment 203, wherein the cathode deactivating layer oxidizes forming an oxide layer when at least a portion of the anode case and a portion of the cathode case contact a conductive aqueous medium, and wherein the battery provides a current of less than 1.5 mA, or of less than 1 mA, or of less than 0.5 mA, or of less than 0.3 mA after the oxide layer is formed and further wherein the oxide layer is formed in less than 2 hours, or less than 1 hour, or less than 30 minutes after initial contact with the conductive aqueous medium.

Embodiment 218 is the battery of embodiment 203, wherein an electrolysis reaction occurs when at least a portion of the anode case and a portion of the cathode case contact a conductive aqueous medium, which the electrolysis reaction is suppressed or reduced in less than two hours, or less than 1 hour, or less than 30 minutes, after initial contact with the conductive aqueous medium.

Embodiment 219 is the battery of embodiment 215, wherein the contact with the conductive aqueous medium comprises placement of the battery on a hydrated tissue such that the hydrated tissue contacts both at least a part of the anode case and a part of the cathode case to form a conductive pathway, wherein the hydrated tissue is hydrated pig esophageal tissue.

Embodiment 220 is the battery of embodiment 215, wherein the contact with the conductive aqueous medium comprises immersion in 25% Ringer's solution, and i) wherein after immersion for 120 minutes, or for 60 minutes, or for 20 minutes, or for 10 min in 25% Ringer's solution, the pH of the 25% Ringer's solution is less than 9, or less than 8, or less than 7; and/or ii) wherein 25% Ringer's solution has a starting pH of 5 to 7.5, and after immersion of the battery in the 25% Ringer's solution, the average pH of the 25% Ringer's solution, sampled at 5-minute intervals, over a 60-minute time period, does not exceed an average pH of 9.5, 9, 8.5, or 8.

Embodiment 221 is a cathode case comprising
a) a cathode inner conductive layer comprising aluminum (Al), stainless steel, chromium (Cr), gold (Au), vanadium (V), nickel (Ni), silver (Ag), copper (Cu), magnesium (Mg), zinc (Zn), an alloy thereof, or a combination of any two or more thereof,
b) a cathode deactivating layer comprising a deactivating metal comprising Ta, Nb, an alloy thereof, or any combination thereof, wherein the cathode deactivating layer has a uniform or varying thickness of 1 μm to 400 μm;
c) wherein the ratio of thickness of the cathode deactivating layer to the thickness of the inner conductive layer is from 8:1 to 1:2.5 at least at a point in a bottom portion of the cathode case,
d) wherein the cathode case has a uniform or varying thickness of 50 μm to 400 μm, and
e) further wherein the cathode case comprises a hem fold structure.

Embodiment 222 is the cathode case of embodiment 221, further comprising an external coating on an outer surface of the cathode case, wherein the external coating comprises Ni, Al, Cu, Cr, Zn, an alloy thereof, or any combination of two or more thereof, wherein the external coating has a uniform or varying thickness of 100 nm to 7 μm or 100 nm to 5 μm.

Embodiment 223 is the cathode case of embodiment 222, wherein the external coating comprises Ni and has a uniform or varying thickness of 100 nm to 200 nm.

Embodiment 224 is the cathode case of embodiment 221, wherein the cathode deactivating layer has a uniform or varying thickness of 14 μm to 200 μm.

Embodiment 225 is the cathode case of embodiment 221, wherein deactivating metal comprises Nb, or an alloy thereof.

Embodiment 226 is the cathode case of embodiment 221, wherein deactivating metal comprises Ta, or an alloy thereof.

Embodiment 227 is the cathode case of embodiment 221, wherein the cathode inner conductive layer has a uniform or varying thickness of 100 μm to 350 μm.

Embodiment 228 is the cathode case of embodiment 221, wherein the cathode inner conductive layer comprises stainless steel.

Embodiment 229 is the cathode case of embodiment 221, wherein the ratio of thickness of the cathode deactivating layer to the thickness of the inner conductive layer is 8:1 to 1:3, or 8:1 to 1:2, or 8:1 to 1:1.1, or 8:1 to 1:1 or 6:1 to 1:2, or 3:1 to 1:2, or 2:1 to 1:2; for example at least at a point in a bottom portion of the cathode case.

Embodiment 230 is the cathode case of embodiment 221, wherein
(i) the surface of the cathode inner conductive layer that is in electrical contact with the cathode deactivating layer is not exposed to an ambient environment after manufacture; or
(ii) less than 0.01 mm$^2$, or less than 0.05 mm$^2$, or less than 0.1 mm$^2$, or less than 0.5 mm$^2$, or less than 1.0 mm$^2$, or less than 1.5 mm$^2$ of the surface of the cathode inner conductive layer that is in electrical contact with the cathode deactivating layer is exposed to an ambient environment after manufacture.

Embodiment 231 is the cathode case of embodiment 221, wherein the cathode case is prepared from a clad laminate comprising a deactivating layer having a uniform or varying thickness of 60 μm to 200 μm and a conductive layer having a uniform or varying thickness of 50 μm to 190 μm; and wherein the cathode case has a uniform or varying thickness of 200 μm to 250 μm; and wherein the cathode case comprises a hem fold having a deactivating layer having a uniform or varying thickness of 14 μm to 75 μm on each side of the hem fold and a total inner conductive layer thickness of 222 μm to 50 μm; and
wherein the cathode case comprises an annular side wall comprising a deactivating layer having a uniform or varying thickness of 60 μm to 200 μm and an inner conductive layer thickness of 190 μm to 50 μm.

Embodiment 231a is the cathode case of embodiment 221, wherein the cathode case is prepared from a clad laminate comprising a deactivating layer having a uniform or varying thickness of 60 μm to 200 μm and a conductive layer having a uniform or varying thickness of 50 μm to 190 μm; and
wherein the cathode case comprises a hem fold and wherein the hem fold comprises a first side and a second side, and further wherein each of the first and second sides have a deactivating layer with uniform or varying thickness of 14 μm to 75 μm and the hem fold has a total thickness of 200 μm to 250 μm where the first side of the hem fold contacts the second side of the hem fold.

Embodiment 232 is the cathode case of embodiment 221, wherein the cathode case is interchangeable with the cathode case of a commercially manufactured button cell battery or a coin cell battery.

BRIEF DESCRIPTION OF THE DRAWINGS

FIG. 4 shows a cross-sectional schematic of an exemplary cathode case in accordance with an embodiment of the present disclosure.

FIGS. 5A-N show cross-sectional schematics of exemplary cathode cases in accordance with embodiments of the present disclosure.

FIGS. 6A, 6B, and 6C show cross-sectional schematics of exemplary cathode cases in accordance with embodiments of the present disclosure illustrating the placement of the deactivating layer after crimping. FIG. 6D is an SEM image of a cathode case in accordance with embodiments of the present disclosure illustrating the placement of the deactivating layer after crimping.

FIGS. 16A and 16B show schematics depicting more exemplary methods of manufacturing a cathode case.

FIG. 17 shows a schematic depicting yet another exemplary method of manufacturing a cathode case.

DESCRIPTION OF CERTAIN EMBODIMENTS

Figure 1:
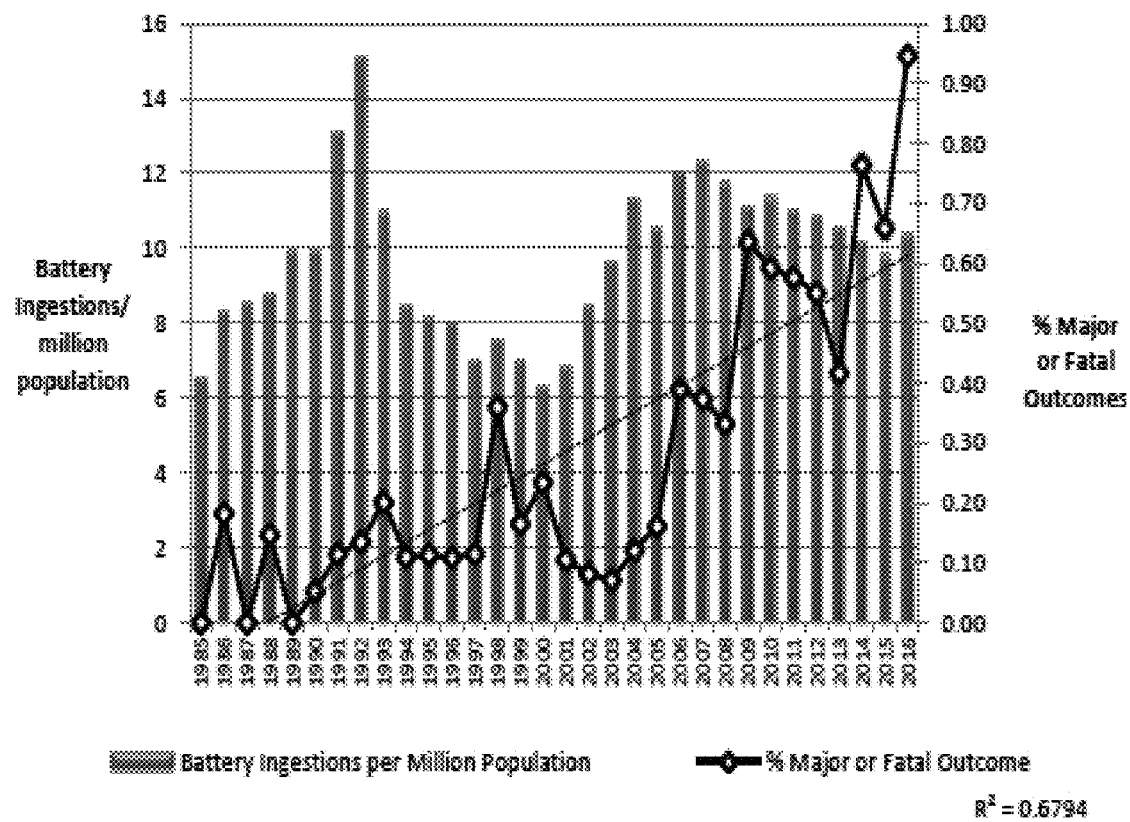
FIG. 1 shows a chart from the National Poison Data System (NPDS) depicting the frequency and severity of battery ingestion (major and fatal outcomes).

As used herein, the term "about" refers to a numeric value, including, for example, whole numbers, fractions, and percentages, whether or not explicitly indicated. Unless otherwise stated, or unless made clear from the context where the value is used, all numeric values, whether or not preceded by the term about, are approximate and generally refer to a range of numerical values (e.g., +/−5-10% of the recited range) that one of ordinary skill in the art would consider equivalent to the recited value (e.g., having the same function or result). When terms such as at least and about precede a list of numerical values or ranges, the terms modify all of the values or ranges provided in the list. In some instances, the term about may include numerical values that are rounded to the nearest significant figure.

As used here, "a" or "an" means "at least one" or "one or more" unless otherwise specified. As used herein, the term "or" means "and/or" unless specified otherwise. In the context of a multiple dependent claim, the use of "or" when referring back to other claims refers to those claims in the alternative only.

In this specification, unless explicitly stated otherwise or indicated to the contrary by the context of usage, where an aspect or embodiment of the subject matter hereof is stated or described as comprising, including, containing, having, being composed of, or being constituted by or of certain features or elements, one or more features or elements in addition to those explicitly stated or described may be present in the embodiment. Any alternative aspect or embodiment of the subject matter hereof, however, may be stated or described as consisting essentially of certain features or elements, in which aspect or embodiment features or elements that would materially alter the principle of operation or the distinguishing characteristics of the aspect or embodiment are not present therein. Further, any aspect or embodiment of the subject matter hereof may be stated or described as consisting of certain features or elements, in which for the aspect or the embodiment, or for insubstantial variations thereof, only the features or elements specifically stated or described as relating to that aspect or embodiment are present. Additionally, the term "comprising" is intended to include aspects, embodiments, features, or elements encompassed by the terms "consisting essentially of" and "consisting of." Similarly, the term "consisting essentially of" is intended to include aspects, embodiments, features, or elements encompassed by the term "consisting of."

As used herein, "deactivating metal" refers to a metal that, when present on an outer surface of a cathode case, or both an anode case and a cathode case, of a battery, reduces or suppresses the electrolysis of water when the battery is immersed in a conductive aqueous medium. When a deactivating metal is present on an outer surface of a cathode case, or both an anode case and a cathode case, of a battery and the battery is not in contact with an aqueous conductive medium, the metal retains electrical conductivity. The deactivating metal may be, for example, Ta, Nb, W, Re or Ti.

In some embodiments, the deactivating metal is a substantially pure metal. In some embodiments two or more deactivating metals may be present. In another embodiment, the deactivating metal is an alloy. In other embodiments, the deactivating metal comprises an alloy of at least two deactivating metals.

As used herein, "deactivating layer," refers to at least one layer of a cathode case, or at least one layer of both an anode case and a cathode case that comprises a deactivating metal.

As used herein, "deactivation," includes without limitation the inability of a battery to cause significant injury in a biological environment. The reduction of electrolysis of water is one indicator a battery has been deactivated. One indicator of reduction of electrolysis of water may be the reduction of bubbling from the anode when a battery is in contact with a conductive aqueous medium. Alternatively, a stable pH below 8 near the anode terminal may indicate the reduction of electrolysis. Another indicator of deactivation is the electrolytic current draw of a battery immersed in a conductive aqueous medium is reduced to less than 1 mA, less than 100 µA, less than 10 µA, or less than 1 µA.

"Rapid deactivation," or "rapidly deactivate," as used herein, without limitation means deactivation occurs while immersed in a conductive aqueous medium in less than 2 hours, in less than 30 minutes, in less than 15 minutes, in less than 10 minutes, in less than 5 minutes, in less than 1 minute, or in less than 15 seconds.

As used herein, "electrical contact," refers to contact between two or more components, which contact allows an electrical current. with a certain resistance to flow between the two or more components. Current may flow between the two or more components when a potential is applied. Current may, but is not required, to continuously flow through materials that are in electrical contact. Electrical current flow through an electrical contact can be determined by measuring the electrical resistance, current, and/or voltage. The terms current, resistance and/or voltage can be uses interchangeably with the terms electrical current, electrical resistance and or electrical voltage.

In one embodiment, an electrical contact may be measured by determining the electrical resistance between an inner conductive layer and a deactivating layer. In one embodiment, the electrical resistance between two materials (e.g., between two layers) is less than 1 Ohm, from 0.01 Ohms to 1 Ohm, from 1 Ohm to 10 Ohms, or from 10 Ohms to 100 Ohms.

In some embodiments, an electrical contact comprises at least two conductive surfaces (e.g., an inner conductive layer and a deactivating layer) in physical contact through coating, pressing, cladding, crimping, stamping, pinching, soldering, welding, and/or the use of adhesives. In other embodiments, electrical contact comprises at least two conductive surfaces in close proximity allowing for quantum tunneling between surfaces. In another embodiment, a quantum tunneling composite is used to make an electrical contact.

Figure 2:
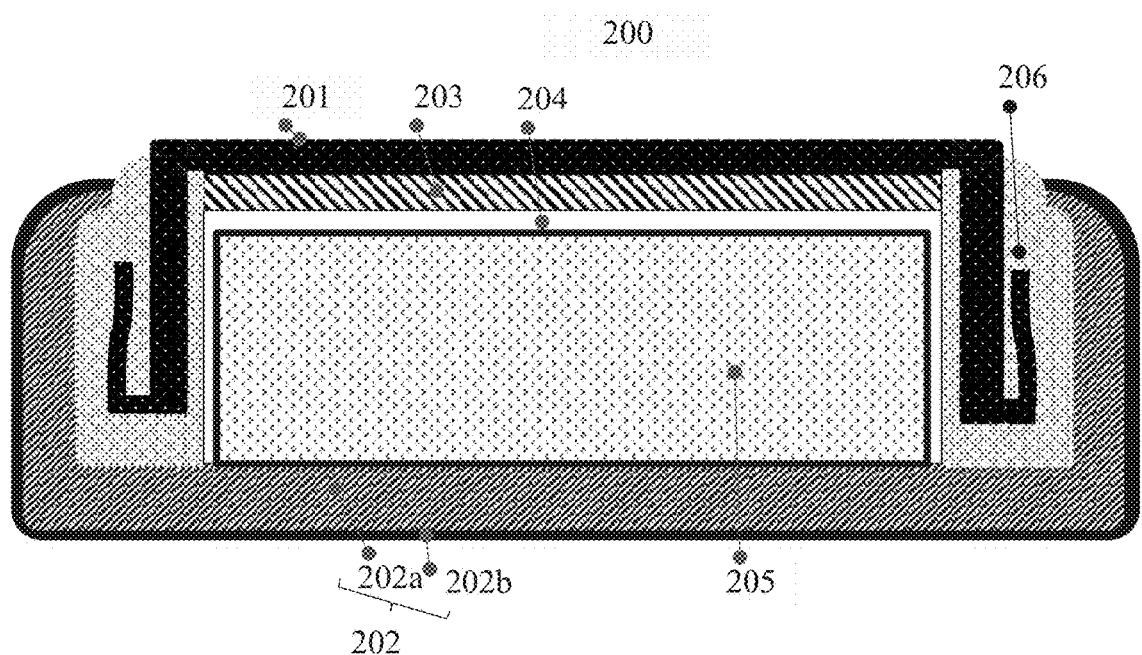
FIG. 2 shows a cross-sectional schematic of an exemplary coin or button cell-type battery in accordance with an embodiment of the disclosure.

A "conductive pathway," as used herein, includes without limitation a path where charge can flow to complete a circuit between the anode, negative terminal, and cathode, positive terminal, of a battery. The anode case 201 and cathode case 202 of a battery, for example as depicted in FIG. 2, can form a conductive pathway when both are in contact with a conductive aqueous medium. Electrolysis of water is one indicator of the presence of a conductive pathway. One indicator of electrolysis of water may be the presence of bubbling from the anode when the battery is in contact with the conductive aqueous medium. Alternatively, an increase in pH near the anode terminal may indicate the presence of a conductive pathway.

In tests performed on dry batteries as described herein, a battery is considered "dry" if it has not been in contact with an aqueous medium, or, if having been in contact with an aqueous medium, it is removed from the medium and allowed to dry for at least about 24 hours, for example by placing it in a desiccator.

"Increased" means an increase relative to a reference. In some embodiments, by "increased" is meant an increase of 5% or more, of 10% or more, of 20% or more, of 30% or more, of 40% or more, of 50% or more, of 60% or more, of 70% or more, of 80% or more, of 90% or more, of 100% or more, of 200% or more, of 1000% or more, of 10,000%, and/or of 100,000% relative to a reference value. In some embodiments, by "increased" is meant an increase of 5% to 100%, of 100% to 10,000%, of 10,000% to 1,000,000%.

In some embodiments, the increase may be in reference to the resistance between an inner conductive layer and a deactivating layer prior to, during, or after contact with a conductive aqueous medium. In some embodiments, the increase may be in reference to the resistance of a similar battery that does not have a deactivating metal that is subject to the same conditions as a battery comprising a deactivating metal.

"Reduced" means a reduction relative to a reference. In some embodiments, by "reduced" is meant the reduction of 5% or more, of 10% or more, of 20% or more, of 30% or more, of 40% or more, of 50% or more, of 60% or more, of 70% or more, of 80% or more, of 90% or more, of 99% or more, of 100% relative to a reference value. In some embodiments, by "reduced" is meant the reduction of 5% to 50%, of 10% to 20%, of 50% to 100%.

In some embodiments, the reduction may be in reference to the electrical contact, current, or voltage of the battery prior to contact with a conductive aqueous medium. In some embodiments, the reduction may be in reference to the electrical contact, rate of an electrochemical reaction, current, or voltage of a similar battery that does not have a deactivating metal.

"Suppressed" means preventing an action from taking place compared to a reference. In some embodiments, the suppression may be in reference to an electrochemical reaction, or electrolytic current, of the battery prior to contact with a conductive aqueous medium.

A "conductive aqueous medium" as used herein includes without limitation conductive water-containing solutions, such as aqueous salt solutions and aqueous buffered solutions; bodily fluids, such as digestive fluids, saliva, mucous, chyme, bile, wet tissue, and blood; aqueous gels; and the like. The resistivity of a conductive aqueous medium is 1 MOhm-cm or less. The pH of a conductive aqueous medium may range from 1-9 pH, 1-3 pH, 4-7 pH, and 7-9 pH to model different biological solutions.

A "non-conductive aqueous medium" as used here in refers to purified or deionized water or to solutions of water including nonionic cleaning detergents where the solution has a resistivity of more than 1 MOhm-cm.

As used herein a layer, or material, or component with a "uniform" thickness has a consistent thickness that does not vary, for example, by more than 0 to 0.5%, or 0 to 1%, or 0 to 5%, or 0 to 10%, or 0 to 12%, or 0 to 15% within the layer. If a thickness range or value is specified, then the layer does not vary, for example, by more than 0 to 0.5%, or 0 to 1%, or 0 to 5%, or 0 to 10%, or 0 to 12%, or 0 to 15% within the specified range, or from the specified value.

As used herein a layer, or material, or component with a "varying" thickness is a layer that varies by, for example, 15% to 500%, or 15% to 300%, or 15% to 200%, or 15% to 100%, or 15% to 50%, or 15% to 25%, or 15% to 20% within the layer. If a thickness range or value is specified, then the layer may vary by, for example, 15% to 500%, or 15% to 300%, or 15% to 200%, or 15% to 100%, or 15% to 50%, or 15% to 25%, or 15% to 20% within the specified range (or from the specified value) where the range includes the recited endpoints, unless otherwise indicated.

For purposes of this disclosure, a layer with a uniform or varying thickness of a specified range is a layer that has at least some portion of that layer within the specified range, where that range includes the recited endpoints, unless otherwise indicated. A layer with a uniform or varying thickness of a specified range or value may also have some portion of the layer that is not within the specified range. A layer may have up to 30%, or from 0.1% to 20%, or from 0.1% to 10% of the layer that falls outside of the recited thickness range or value. For example, a cathode case comprising a hem fold structure (See FIG. 15B and FIG. 15C) may have areas at the bend of the hem fold, or at terminal ends where at least a portion of that layer is outside of a specified range or value.

I. Exemplary Batteries

The present disclosure provides batteries that are safer than existing batteries and are less likely to damage tissue when ingested, for example when a child or pet accidentally swallows the battery. In some embodiments, the batteries rapidly deactivate in electrically conductive aqueous environments, such as in contact with biological tissues, in the presence of a potential difference supplied by the battery. The present disclosure pertains to any battery, and in particular embodiments, the present disclosure provides a coin or button cell-type battery, such as a nominally 3 volt or a nominally 1.5 volt button cell-type battery.

In some embodiments disclosed herein, a battery comprises Ta. In other embodiments, a battery comprises Nb. In some embodiments, a battery comprises Ti. In some embodiments, a battery comprises W. In some embodiments, a battery comprises Re. In some embodiments, a battery comprises alloys of Re, Ta, Nb, W, and/or Ti. In some embodiments, a battery comprises any combination of Re, Ta, Nb, W, and/or Ti. In some embodiments disclosed herein, a cathode case or an anode case and a cathode case comprises Re, or Ta, or Nb, or W, or Ti or any combination of two or more thereof. In some embodiments, the cathode case or anode case and cathode case comprises an alloy of Re, Ta, Nb, W, and/or Ti or any combination of two or more thereof.

In some embodiments disclosed herein, a battery comprises a deactivating metal. In some embodiments disclosed herein, a battery comprises a deactivating metal in a deactivating layer.

In some embodiments disclosed herein, a battery comprises an inner conductive layer. In some embodiments, the inner conductive layer is disposed between the deactivating layer and the anode or cathode of the electrochemical cell. In some embodiments, the inner conductive layer is in electrical contact with the deactivating layer and is in electrical contact with the anode or cathode of the electrochemical cell.

In some embodiments, the battery comprises a deactivating metal wherein the deactivating metal is present in a layer that has a uniform or varying thickness of 100 nm to 400 μm. In some embodiments, the deactivating metal is present in a layer that has a uniform or varying thickness of 100 nm to 1 μm, 100 nm to 3 μm, 100 nm to 5 μm, 100 nm to 10 μm, 1 μm to 400 μm, 3 μm to 100 μm, 3 μm to 50 μm, 15 μm to 300 μm, 14 μm to 200 μm, 25 μm to 50 μm, 50 μm to 400 μm, 50 μm to 300 μm, 50 μm to 200 μm, 50 μm to 175 μm, 55 μm to 400 μm, 55 μm to 300 μm, 55 μm to 200 μm, 60 μm to 400 μm, 60 μm to 300 μm, 60 μm to 200 μm, 200 μm to 300 μm, or 300 μm to 400 μm. Additional exemplary ranges are disclosed throughout this application.

Provided herein is a cathode case comprising a cathode inner conductive layer, and a cathode deactivating layer comprising the deactivating metal, wherein the cathode inner conductive layer and the cathode deactivating layer are in electrical contact. In some embodiments, the batteries of this disclosure comprise a cathode case comprising a cathode inner conductive layer, and a cathode deactivating layer comprising the deactivating metal, wherein the cathode inner conductive layer and the cathode deactivating layer are in electrical contact.

In some embodiments, the inner conductive layer has a uniform or varying thickness of 1 nm to 400 μm, or of 175 μm to 300 μm, or of 75 to 300 μm. Other examples of inner conductive layer thicknesses are provided throughout.

In some embodiments, the thickness of the deactivating layer relative to the inner conductive layer is chosen to minimize or prevent exposure of the surface of the inner conductive layer that is in electrical contact with the deactivating layer, when the battery or the cathode case is exposed to or immersed in a conductive aqueous medium. In some embodiments, the thickness of the deactivating layer relative to the inner conductive layer is chosen to minimize or prevent cracking of the deactivating layer during manufacturing, for example, during crimping, rolling, or folding processes, (e.g., processes for making hem folds). Hem folding is a process used to fold an annular side wall toward the inner surface of the cathode case. This facilitates the presentation of the deactivating layer at the cathode case rim. Hem folds are demonstrated at least in FIGS. 14A, 14D and 15A, 15B, and 15C. The thickness of the deactivating layer that minimizes or prevents cracking varies based on the selection of deactivating layer, inner conductive layer, and form of the cathode and/or anode case.

In some embodiments, the thickness of the deactivating layer is from 1% to 10000% of the thickness of the inner conductive layer. In some embodiments, the thickness of the deactivating layer is from 10% to 1000% of the thickness of the inner conductive layer. In some embodiments, the thickness of the deactivating layer is from 100% to 10000% of the thickness of the inner conductive layer. In some embodiments, the thickness of the deactivating layer is from 100% to 1000% of the thickness of the inner conductive layer. In some embodiments, the thickness of the deactivating layer is from 100% to 500% of the thickness of the inner conductive layer.

In some embodiments the inner conductive layer and the deactivating layer (of either the anode or the cathode) have uniform or varying thicknesses in a ratio (deactivating layer:inner conductive layer) of from 1:1 to 5, or, 1:1.1 to 4.5, or 1:1.5 to 4, or 1:2 to 3, or 1:1, or 1:1.2, or 1:1.5, or 1:2, or 1:2.5, or 1:3, or 1:3.5, or 1:4, or 1:4.5, or 1:5. In some embodiments the inner conductive layer and the deactivating layer (of either the anode or the cathode) have uniform or varying thicknesses in a ratio (deactivating layer:inner conductive layer) of from 1:1 to 20, or, 1:1 to 10, or 1:10, or 1:20. In other embodiments the conductive layer and deactivating layer in the laminate have uniform or varying thicknesses in a ratio (deactivating layer:inner conductive layer) of from 1 to 20; 1, or 1 to 10:1, or 10:1, or 20:1. In other embodiments the conductive layer and deactivating layer in the laminate have uniform or varying thicknesses in a ratio (deactivating layer:inner conductive layer) of from 1 to 5:1, or, 1.1 to 4.5:1, or 1.5 to 4; 1, or 2 to 3:1, or 1:1, or 1.2:1, or 1.5:1, or 2:1, or 2.5:1, or 3:1, or 3.5:1, or 4:1, or 4.5:1, or 5:1. For clarity, ranges in ratio from 1:1 to X means from 1:1 to 1:X, and 1 to X:1 means from 1:X to 1:1. In some embodiments, the inner conductive layer and the deactivating layer (of either the anode or the cathode) have uniform or varying thicknesses in a ratio (deactivating layer:inner conductive layer) of from 8:1 to 1:5, or 8:1 to 1:3, or 8:1 to 1:2, or 8:1 to 1:1.1, or 8:1 to 1:1, or 6:1 to 1:5, or 6:1 to 1:3, or 6:1 to 1:2, or 6:1 to 1:1.1, or 6:1 to 1:1, 3:1 to 1:5, or 3:1 to 1:3, or 3:1 to 1:2, or 3:1 to 1:1.1, or 3:1 to 1:1, or 2:1 to 1:5, or 2:1 to 1:3, or 2:1 to 1:2, or 2:1 to 1:1.1, or 2:1 to 1:1, or from 8:1 to 1:2.5, or from 8:1 to 1:3, or 8:1 to 1:2, or 8:1 to 1:1.1, or 8:1 to 1:1, or 6:1 to 1:2, or 3:1 to 1:2; for example at least at a point in a bottom portion (e.g., 413 in FIG. 4) of the cathode case.

In some embodiments, the deactivating metal is present in a layer that has a uniform or varying thickness which is sufficient to prevent exposure of the surface of the inner conductive layer that is in electrical contact with the deactivating layer to the ambient environment. In some embodiments, the uniform layer prevents exposure of less than 0.01 mm$^2$, or less than 0.05 mm$^2$, or less than 0.5 mm$^2$, or less than 1.0 mm$^2$, or less than 1.5 mm$^2$ of the inner conductive layer to the ambient environment. In some embodiments the deactivating metal is present in a layer that has a uniform or varying thickness that reduces or prevents cracking of the layer upon folding. In some embodiments, the uniform layer prevents exposure of less than 0.01 mm$^2$, or less than 0.05 mm$^2$, or less than 0.5 mm$^2$, or less than 1.0 mm$^2$, or less than 1.5 mm$^2$ of the inner conductive layer to the ambient environment upon folding, crimping, or any other manufacturing processes that causes a metal layer to stretch or become thinner in the final manufactured product compared to the metal layer thickness at the beginning of the manufacturing process. In some embodiments, the surface of the cathode inner conductive layer that is in electrical contact with the cathode deactivating layer is not exposed to an ambient environment after manufacture. In some embodiments, wherein less than 0.01 mm2, or less than 0.05 mm2, or less than 0.1 mm2, or less than 0.5 mm2, or less than 1.0 mm2, or less than 1.5 mm2 of the surface of the cathode inner conductive layer that is in electrical contact with the cathode deactivating layer is exposed to an ambient environment after manufacture. In some embodiments after manufacture means after the cathode case is formed into a can or case. In some embodiments after manufacture means after the cathode case is incorporated into a battery. In some embodiments after manufacture means after the cathode is incorporated into a battery that is ready for use.

In some embodiments, the combined thickness of inner conductive layer and the deactivating layer is less than or equal to 50 μm, 100 μm, 200 μm, 300 μm, or 400 μm. In some embodiments, the combined thickness of inner conductive layer and the deactivating layer is 25 μm to 400 μm, or 25 μm to 50 μm, or 50 μm to 100 μm, or 100 μm to 200 μm, or 200 μm to 300 μm, or 300 μm to 400 μm.

In an embodiment of a coin cell battery comprising an anode case and a cathode case the total cell has a height of 3.2 mm and an outside diameter 20 mm. The combination of the various layers of the anode cases and a cathode cases described herein are chosen to preserve the final total cell dimension.

FIG. 2 depicts a cross sectional view of an exemplary coin or button cell-type battery 200 in accordance with one embodiment of the disclosure.

Exemplary battery 200 comprises:
an anode case 201;
a cathode case 202 comprising a deactivating metal;
an electrochemical cell comprising an anode 203, a cathode 205, and a separator 204 positioned between the anode and the cathode; and a gasket 206 between the anode case and the cathode case.

The separator generally provides physical separation between the anode and the cathode and can be made from any materials known in the art. Additionally, an electrolyte may be included in the battery, as well understood in the art.

The gasket 206 is advantageously disposed between the anode case and the cathode case and may provide a seal between the anode case and cathode case. The gasket may comprise a non-conductive material, such as an elastomeric material or another polymer. As shown in FIG. 2, a cathode case 202, may comprise a cathode inner conductive layer 202a and a cathode deactivating layer 202b, wherein the cathode inner conductive layer and the cathode deactivating layer are in electrical contact.

In some embodiments, after contact of at least a portion of the deactivating layer with a conductive aqueous medium, electrolysis of the conductive aqueous medium is reduced or suppressed (e.g., compared to what would be observed from a battery without the deactivating layer). When the battery is immersed, or partially immersed, in a conductive aqueous medium, the deactivating metal undergoes at least partial electrochemical oxidation due to contact with the conductive aqueous medium. In some embodiments the oxide that is formed is an oxide of the deactivating metal. In one embodiment, a surface oxide develops or propagates on the portion of the deactivating metal that is exposed to the conductive aqueous medium. In some embodiments, the deactivating metal forms a native surface oxide comprising an oxide of the deactivating metal that is continuous over the surface that is exposed to the conductive aqueous medium. In some embodiments, the deactivating metal forms, grows and transforms into a continuous, solid, exterior oxide layer, especially, under an applied potential. In some embodiments, the oxide layer is formed in less than 2 hours upon exposure to an oxidative current created when the battery is submerged in a conductive aqueous medium, wherein, the battery electrodes are in electrical contact through the aqueous medium.

In some embodiments, batteries and/or cathode cases as described herein produce a current of less than 1.5 mA, or of less than 1 mA, or of less than 0.5 mA, or of less than 0.3 mA within 2 hours, or within 1 hour, or within 30 min, or within 10 min of initial contact with an aqueous conductive medium. In some embodiments, the oxide layer, once formed, sustains the oxidative current of less than 1.5 mA, or of less than 1 mA, or of less than 0.5 mA, or of less than 0.3 mA.

In some embodiments, the surface oxide may be resistant to further oxidation. Without wishing to be bound by theory, it is believed that the resistance to further oxidation may suppress the oxidative half-reaction of electrolysis at the cathode. Reduction or suppression of the oxidative half-reaction in turn may suppress the reductive half-reaction of electrolysis at the anode. Under these conditions, the production of hydroxide ions, which produces the basic environment that may cause tissue damage, is reduced or suppressed, improving safety in the event of ingestion.

In some embodiments, a battery comprising a deactivating metal (e.g., in a deactivating layer) may suppress or reduce electrolysis in a conductive aqueous medium (e.g., compared to what would be observed from a battery without the deactivating layer) when immersed in the medium for an extended period of time, for example less than 5 hours, less than 3 hours, less than 2 hours, less than 1 hour, from 1 to 2 hours, from 1 to 3 hours, from 1 to 5 hours, from 2 to 3 hours, from 2 to 5 hours, or from 3 to 5 hours.

In other embodiments, the deactivating layer includes a surface oxide before contact with an aqueous conductive medium. This surface oxide may be a native oxide that forms upon exposure to air. The surface oxide may also be formed by exposure to an acidic solution, exposure to a basic solution, exposure to an oxidizing solution with or without applying a potential to the deactivating layer. This surface oxide may also be formed by depositing a metal oxide using a deposition process, exposure of the deactivating layer to a furnace with an oxygen-rich atmosphere, or exposure of the deactivating layer to an oxygen plasma. The surface oxide may, as discussed above, provide a resistance to further oxidation of the deactivating metal, effectively limiting the resulting maximum current draw of the exemplary battery while immersed in a conductive aqueous environment.

Whether the surface oxide is a native oxide, is formed prior to the assembly of the battery, is formed after assembly of the battery but before contact with a conductive aqueous medium, or develops upon exposure to a conductive aqueous medium, the battery's resulting maximum electrolytic current draw may be limited to less than 1 mA, less than 100 µA, less than 10 µA, or less than 1 µA over a relatively short period of time, such as within two hours, one hour, 30 minutes, 20 minutes, 10 minutes, 5 minutes, or 1 minute.

In some embodiments, when immersed in an aqueous conductive medium, wherein the aqueous conductive medium is simulated saliva, gastric fluid or intestinal fluids, a battery or cathode case as described herein, will produce an oxidation current of no greater than 1 mA, or of no greater than 0.5 mA within 120 minutes, or within 30 minutes, or within 10 minutes, of initial contact with the aqueous conductive medium resulting in minimal damage in a ham test and/or a simulated porcine esophageal test each of which is described herein. In some embodiments, the battery or the cathode case exterior surface is wear-resistant and will keep the surface area of the stainless steel inner conductive layer exposed to an ambient environment to under 0.5 mm$^2$ In some embodiments, the battery is a button or a coin cell-type battery. In other embodiments, the electrochemical cell of the exemplary battery has a voltage of 10 V or less, 5 V or less, 3 V or less, or 1 V or less. In another embodiment, the exemplary battery is a 3 volt or a 1.5 volt button or coin cell battery.

In other embodiments, the exemplary battery is a CR927, CR1025, CR1130, CR1216, CR1220, CR1225, CR1616, CR1620, CR1625, CR1632, CR2012, CR2016, CR2025, CR2032, CR2320, BR2335, CR2354, CR2412, CR2430, CR2450, CR2477, CR2507, CR3032, or CR11108 lithium coin cell battery. In some embodiments, the exemplary battery is a SR41, SR43, SR44, SR45, SR48, SR54, SR55, SR57, SR58, SR59, SR60, SR63, SR64, SR65, SR66, SR67, SR68, SR69, S516, SR416, SR731, SR512, SR714, SR712 silver oxide coin cell battery. In other embodiments, the exemplary battery is a LR41, LR44, LR54, or LR66 alkaline coin cell battery. In more embodiments, the battery is a CR2032, CR2016, or CR2025 lithium coin cell battery. In other embodiments, the battery is an AAAA, AAA, AA, A, B, C, D, E 90/N, 4001, 810, 910A, AM5, LR1, MN9100, or UM-5 cylindrical battery.

In other embodiments, the exemplary battery is a secondary cell. In other embodiments, the exemplary battery is a rechargeable battery.

The batteries of this disclosure are manufactured within industry standard dimensions. As such the dimensions of the inner conductive layer and deactivating layer are selected to provide a complete and operative battery that complies with these standards. The current IEC standards for portable primary (non-rechargeable) batteries bear the 60086 number. The relevant US standards are the ANSI C18 series, which are developed by a committee of the US National Electrical Manufacturers Association (NEMA). Batteries disclosed herein can be made to any industry accepted standard size.

For example a CR2032 battery is 20 mm in outer diameter and 3.2 mm in height.

A. Exemplary Battery with a Ta or Nb Deactivating Layer

1. Exemplary Battery with a Ta or Nb Deactivating Layer on the Cathode Case

In some embodiments, the batteries disclosed herein comprise a cathode case comprising a deactivating metal wherein the deactivating metal comprises Nb, Ta, an alloy thereof, or any combination thereof. In other embodiments, the deactivating metal comprising Nb, Ta, an alloy thereof, or any combination thereof is present in a deactivating layer that has a uniform or varying thickness of 100 nm to 400 µm, 100 nm to 3 µm, 3 µm to 100 µm, 3 µm to 50 µm, 200 µm to 300 µm, or 300 µm to 400 µm.

In some embodiments, a battery comprising a cathode case comprising a deactivating metal comprising Nb, Ta, an alloy thereof, or any combination thereof further comprises an external coating on an outer surface of the anode case, or an outer surface of the cathode case, or both, wherein the external coating comprises Ni, Al, Cu, Cr, Zn or any combination of two or more thereof.

In some embodiments, the cathode case is the internal support member. In some embodiments, the cathode case does not comprise an inner conductive layer and the battery does not comprise an external coating. In another embodiment, the cathode case consists essentially of a layer comprising a deactivating metal, wherein the layer has a uniform or varying thickness of 200 µm to 300 µm. In yet another embodiment, the cathode case consists of a layer comprising a deactivating metal, wherein the layer has a uniform or varying thickness of 200 µm to 300 µm.

As used herein, an "external coating" is a metal layer on the outside of a cathode case, an anode case, or both that provides lower contact resistance than the deactivating metal and/or improves the aesthetics of the battery by providing a high shine or glossiness.

In further embodiments, a battery comprising a deactivating metal comprising Nb, Ta, an alloy thereof, or any combination thereof comprises an external coating on an outer surface of the anode case, or an outer surface of the cathode case, or both, wherein the external coating comprises Ni, Al, Cu, Cr, Zn or any combination of two or more thereof, and further wherein the external coating has a uniform or varying thickness of 100 nm to 7 µm, 100 nm to 5 µm, or from 100 nm to 200 nm.

In another embodiment, the cathode case comprises a cathode inner conductive layer, a cathode deactivating layer comprising Ta, Nb, an alloy thereof, or any combination thereof, wherein the cathode inner conductive layer and the cathode deactivating layer are in electrical contact; and wherein the battery further comprises an external coating on an outer surface of the anode case, or an outer surface of the cathode case, or both, wherein the external coating comprises Ni, Al, Cu, Cr, Zn or any combination of two or more thereof, and wherein the external coating and the cathode deactivating layer are in electrical contact.

In some embodiments, the battery comprising a cathode case comprising a deactivating layer comprising Nb, Ta, an alloy thereof, or any combination thereof, does not comprise an external coating. In other embodiments, the cathode case consists essentially of a cathode inner conductive layer, and a cathode deactivating layer comprising a deactivating metal, wherein the cathode inner conductive layer and the cathode deactivating layer are in electrical contact. In other embodiments, the cathode case consists of a cathode inner conductive layer, and a cathode deactivating layer comprising a deactivating metal, wherein the cathode inner conductive layer and the cathode deactivating layer are in electrical contact.

In another embodiment, the cathode deactivating layer comprising Nb, Ta, an alloy thereof, or any combination thereof has a uniform or varying thickness of 100 nm to 100 µm, 100 nm to 3 µm, 3 µm to 25 µm, or 25 µm to 50 µm. In some embodiments, the deactivating layer has a uniform or varying thickness of 15 µm to 300 µm, 14 µm to 200 µm, or greater than 50 µm to 300 µm, or greater than 50 µm to 200 µm. In some embodiments, the cathode inner conductive layer has a uniform or varying thickness of 175 µm to 300 µm.

In yet another embodiment, the cathode deactivating layer comprising Nb, Ta, an alloy thereof, or any combination thereof further comprises a first layer comprising a first deactivating metal and a second layer of a second deactivating metal. In some embodiments, the cathode deactivating layer comprises a first layer comprising Ta or an alloy thereof. In other embodiments, the cathode deactivating layer comprises a first layer comprising Ta or an alloy thereof, wherein the first layer has a uniform or varying thickness of 1 µm to 3 µm.

In another embodiment, the cathode deactivating layer comprises a second layer comprising Nb or an alloy thereof. In another embodiment, the cathode deactivating layer comprises a first layer comprising Nb or an alloy thereof, wherein the second layer has a uniform or varying thickness of 10 µm to 250 µm, or of 10 µm to 30 µm. In yet another embodiment, the cathode inner conductive layer has a uniform or varying thickness of 75 µm to 300 µm, or of 175 µm to 300 µm.

2. Exemplary Battery with a Ta and/or Nb Deactivating Layer on the Cathode Case and Anode Case In one embodiment, an exemplary battery 300 such as that exemplified in FIG. 3 comprises:

an anode case 301 comprising an anode inner conductive layer 301a, and an anode deactivating layer 301b comprising a deactivating metal which comprises Nb, Ta, an alloy thereof, or any combination thereof, wherein the anode inner conductive layer and the anode deactivating layer are in electrical contact;

a cathode case 302 comprising a cathode inner conductive layer 302a, and a cathode deactivating layer 302b comprising a deactivating metal, wherein the cathode inner conductive layer and the cathode deactivating layer are in electrical contact;

an electrochemical cell comprising an anode 303, a cathode 305, and a separator 304 positioned between the anode and the cathode; and a gasket 306 between the anode case and the cathode case.

The materials of the inner conductive layer of the anode and the inner conductive layer of the cathode case be chosen from any known in the battery art. The anode case provides a protective barrier for the anode, and generally comprises a conductive material.

In one embodiment of the batteries disclosed herein, wherein the cathode case comprises a deactivating metal comprising Nb or Ta, an alloy thereof, or any combination thereof, the battery also comprises an anode case comprising an anode inner conductive layer, an anode deactivating layer comprising a deactivating metal comprising Nb, Ta, an alloy thereof, or any combination thereof, wherein the anode inner conductive layer and the anode deactivating layer are in electrical contact; and wherein the battery further comprises an external coating on an outer surface of the anode case, or an outer surface of the cathode case, or both, wherein the external coating comprises Ni, Al, Cu, Cr, Zn or any combination of two or more thereof, and wherein the external coating and the anode deactivating layer are in electrical contact.

In another embodiment of a battery comprising an anode case comprising an anode inner conductive layer, an anode deactivating layer comprising a deactivating metal comprising Nb, Ta, an alloy thereof, or any combination thereof, wherein the anode inner conductive layer and the anode deactivating layer are in electrical contact, the battery does not comprise an external coating on an outer surface of the anode case, or an outer surface of the cathode case. In yet another embodiment, the anode case consists essentially of an anode inner conductive layer, and an anode deactivating layer comprising a deactivating metal comprising Nb, Ta, an alloy thereof, or any combination thereof, wherein the anode inner conductive layer and the anode deactivating layer are in electrical contact. In yet another embodiment, the anode case consists of an anode inner conductive layer, and an anode deactivating layer comprising a deactivating metal comprising Nb, Ta, an alloy thereof, or any combination thereof, wherein the anode inner conductive layer and the anode deactivating layer are in electrical contact.

In one embodiment, the anode deactivating layer comprising Nb, Ta, an alloy thereof, or any combination thereof has a uniform or varying thickness of 100 nm to 400 µm, 100 nm to 100 µm, 100 nm to 3 µm, 3 µm to 25 µm, or 25 µm to 50 µm. In another embodiment, the anode deactivating layer comprising Nb, Ta, an alloy thereof, or any combination thereof has a uniform or varying thickness of 100 nm to 100 µm, 100 nm to 3 µm, 3 µm to 25 µm, or 25 µm to 50 µm and the anode inner conductive layer has a uniform or varying thickness of 175 µm to 300 µm, or 200 µm to 300 µm.

In more embodiments, the anode deactivating layer comprising Nb, Ta, an alloy thereof, or any combination thereof further comprises a first layer comprising a first deactivating metal and a second layer of a second deactivating metal.

In some embodiments, the anode deactivating layer comprises a first layer comprising Ta or an alloy thereof. In some embodiments, the anode deactivating layer comprises a first layer comprising Ta or an alloy thereof, wherein the first layer has a uniform or varying thickness of 1 µm to 3 µm. In some embodiments, the anode deactivating layer comprises a second layer comprising Nb or an alloy thereof. In some embodiments, the anode deactivating layer comprises a second layer comprising Nb or an alloy thereof, wherein the second layer has a uniform or varying thickness of 10 µm to 250 µm, or of 10 µm to 30 µm. In some embodiments, the anode inner conductive layer has a uniform or varying thickness of 75 µm to 300 µm or of 200 µm to 300 µm.

B. Exemplary Battery with a W or Re Deactivating Layer

1. Exemplary Battery with a W or Re Deactivating Layer on the Cathode Case

In other embodiments of the batteries disclosed herein, the cathode case comprises a deactivating metal comprising W, Re, or alloys thereof. In other embodiments, the cathode case comprises a deactivating layer comprising W, Re, or alloys, wherein the deactivating layer that has a uniform or varying thickness of 100 nm to 400 µm, or 100 nm to 25 µm, 100 nm to 3 µm, or 3 µm to 25 µm. The thickness of the deactivating layer may be chosen to support the chosen manufacturing process.

In some embodiments, a battery comprising a cathode case comprising W, Re, or alloys thereof further comprises an external coating on an outer surface of the anode case, or an outer surface of the cathode case, or both, wherein the external coating comprises Ni, Al, Cu, Cr, Zn or any combination of two or more thereof.

In further embodiments, the battery comprising W, Re, or alloys thereof comprises an external coating on an outer surface of the anode case, or an outer surface of the cathode case, or both, wherein the external coating comprises Ni, Al, Cu, Cr, Zn or any combination of two or more thereof, and further wherein the external coating has a uniform or varying thickness of 100 nm to 7 µm, 100 nm to 5 µm, or from 100 nm to 200 nm.

In another embodiment, the cathode case comprises: a cathode inner conductive layer, a cathode deactivating layer comprising the W, Re, or alloys thereof, wherein the cathode inner conductive layer and the cathode deactivating layer are in electrical contact; and wherein the battery further comprises an external coating on an outer surface of the anode case, or an outer surface of the cathode case, or both, wherein the external coating comprises Ni, Al, Cu, Cr, Zn, an alloy thereof, or any combination of any two or more thereof, and wherein the external coating and the cathode deactivating layer are in electrical contact.

In another embodiment, the cathode deactivating layer comprising W, Re, or alloys thereof has a uniform or varying thickness of 100 nm to 25 µm, 3 µm to 25 µm, or 1 µm to 3 µm. In some embodiments, the cathode inner conductive layer has a uniform or varying thickness of 200 µm to 300 µm.

In some embodiments, the battery comprising a cathode case comprising W, Re, or alloys thereof does not comprise an external coating on an outer surface of the anode case, or an outer surface of the cathode case. In some embodiments, the battery comprises a cathode case that consists essentially of a cathode inner conductive layer, and a cathode deactivating layer comprising the deactivating metal, wherein the cathode inner conductive layer and the cathode deactivating layer are in electrical contact. In some embodiments, the battery comprises a cathode case that consists of a cathode inner conductive layer, and a cathode deactivating layer comprising the deactivating metal, wherein the cathode inner conductive layer and the cathode deactivating layer are in electrical contact.

In yet another embodiment, the cathode deactivating layer comprising W, Re, or alloys thereof further comprises a first layer comprising a first deactivating metal and a second layer of a second deactivating metal. In some embodiments, the cathode deactivating layer comprises a first layer comprising W, Re, or an alloy thereof. In other embodiments, the cathode deactivating layer comprises a first layer comprising W, Re, or an alloy thereof, wherein the first layer has a uniform or varying thickness of 1 µm to 25 µm. In another embodiment, the cathode deactivating layer comprises a second layer comprising Nb or an alloy thereof. In some embodiments, the cathode deactivating layer comprises a second layer comprising Nb or an alloy thereof, wherein the second layer has a uniform or varying thickness of 5 µm to 30 µm. In yet another embodiment, the cathode inner conductive layer has a uniform or varying thickness of 200 µm to 300 µm.

2. Exemplary Battery with a W or Re Deactivating Layer on the Cathode Case and Anode Case In one embodiment, also depicted in FIG. 3, an exemplary battery 300 comprises:

an anode case 301 comprising an anode inner conductive layer 301a, and an anode deactivating layer 301b comprising the deactivating metal which comprises W, Re, or alloys thereof, wherein the anode inner conductive layer and the anode deactivating metal layer are in electrical contact;

a cathode case 302 comprising a cathode inner conductive layer 302a, and a cathode deactivating layer 302b comprising the deactivating metal, wherein the cathode inner conductive layer and the cathode deactivating layer are in electrical contact;

an electrochemical cell comprising an anode 303, a cathode 305, and a separator 304 positioned between the anode and the cathode; and a gasket 306 between the anode case and the cathode case.

In one embodiment of the batteries disclosed herein, wherein the cathode case comprises a deactivating metal comprising W, Re, or alloys thereof, the battery also comprises an anode case comprising an anode inner conductive layer, an anode deactivating layer comprising the deactivating metal which comprises W, Re, or alloys thereof, wherein the anode inner conductive layer and the anode deactivating layer are in electrical contact; and wherein the battery further comprises an external coating on an outer surface of the anode case, or an outer surface of the cathode case, or both, wherein the external coating comprises Ni, Al, Cu, Cr, Zn or any combination of two or more thereof, and wherein the external coating and the anode deactivating layer are in electrical contact.

In another embodiment, the anode case comprises an anode inner conductive layer, an anode deactivating layer comprising a deactivating metal which comprises W, Re, or alloys thereof, wherein the anode inner conductive layer and the anode deactivating layer are in electrical contact; and wherein the battery does not comprise an external coating on an outer surface of the anode case, or an outer surface of the cathode case. In yet another embodiment, the anode case consists essentially of an anode inner conductive layer, and an anode deactivating layer comprising a deactivating metal which comprises W or Re, wherein the anode inner conductive layer and the anode deactivating layer are in electrical contact. In another embodiment, the anode case consists of an anode inner conductive layer, and an anode deactivating layer comprising a deactivating metal which comprises W or Re wherein the anode inner conductive layer and the anode deactivating layer are in electrical contact.

In one embodiment, the anode deactivating layer comprising W, Re, or alloys thereof has a uniform or varying thickness of 100 nm to 25 µm, 3 µm to 25 µm, or 1 µm to 3 µm. In another embodiment, the anode deactivating layer comprising W, Re, or alloys thereof has a uniform or varying thickness of 100 nm to 25 µm, 3 µm to 25 µm, or 1 µm to 3 µm and the anode inner conductive layer has a uniform or varying thickness of 75 µm to 300 µm or of 200 µm to 300 µm.

In more embodiments, the anode deactivating layer comprising W, Re, or alloys thereof further comprises a first layer comprising a first deactivating metal and a second layer of a second deactivating metal. In some embodiments, the anode deactivating layer further comprises a first layer comprising W, Re, or an alloy thereof. In some embodiments, the anode deactivating layer further comprises a first layer comprising W, Re, or an alloy thereof, wherein the first layer has a uniform or varying thickness of 1 µm to 3 µm. In some embodiments, the anode deactivating layer further comprises a second layer comprising Nb or an alloy thereof. In some embodiments, the anode deactivating layer further comprises a second layer comprising Nb or an alloy thereof, wherein the second layer has a uniform or varying thickness of 10 µm to 30 µm. In some embodiments, wherein the anode inner conductive layer has a uniform or varying thickness of 75 µm to 300 µm or of 200 µm to 300 µm.

C. Exemplary Battery with a Ti Deactivating Layer

1. Exemplary Battery with a Ti Deactivating Layer on the Cathode Case

In other embodiments of the batteries disclosed herein, the cathode case comprises a deactivating metal comprising Ti or alloys thereof, and the battery optionally comprises an external coating on an outer surface of the anode case, or an outer surface of the cathode case, or both, wherein the external coating comprises Al, Cu, Cr, Zn or any combination of two or more thereof. In another embodiment, a deactivating metal comprising Ti is present in a layer that has a uniform or varying thickness of 1 µm to 400 µm, of greater than 50 µm to 400 µm, of greater than 50 µm to 300 µm, of greater than 50 µm to 200 µm, 200 µm to 300 µm, or 300 µm to 400 µm. The thickness of the deactivating layer may be chosen to support the chosen manufacturing process.

In one embodiment, the battery does not comprise an external coating on an outer surface of the anode case or an outer surface of the cathode case. In one embodiment, the cathode case consists essentially of a layer comprising a deactivating metal comprising Ti, wherein the layer has a uniform or varying thickness of 200 µm to 300 µm. In another embodiment, the cathode case consists of a layer comprising a deactivating metal comprising Ti, wherein the layer has a uniform or varying thickness of 200 µm to 300 µm.

In other embodiments, an external coating comprising Al, Cu, Cr, Zn, or any combination of two or more thereof is present on both the outer surface of an anode case and the outer surface of a cathode case. In other embodiments of the batteries disclosed herein, where the cathode case comprises a deactivating metal comprising Ti, or alloys thereof, an external coating, if present, does not comprise Ni. In other embodiments, an external coating is present on the outer surface of an anode case. In other embodiments, an external coating is present on the outer surface of an cathode case. In some embodiments, the external coating has a uniform or varying thickness of 100 nm to 7 µm or of 100 nm to 5 µm.

In some embodiments, a cathode case comprises a cathode inner conductive layer, and a cathode deactivating layer comprising a deactivating metal comprising Ti, or alloys thereof, wherein the cathode inner conductive layer and the cathode deactivating layer are in electrical contact. In other embodiments, the cathode case comprises a cathode inner conductive layer, a cathode deactivating layer comprising a deactivating metal comprising Ti, or alloys thereof, wherein the cathode inner conductive layer and the cathode deactivating layer are in electrical contact; and wherein the battery further comprises an external coating on an outer surface of the anode case, or an outer surface of the cathode case, or both, wherein the external coating comprises Al, Cu, Cr, Zn or any combination of two or more thereof, and wherein the external coating and the cathode deactivating layer are in electrical contact.

In another embodiment, the cathode case consists essentially of a cathode inner conductive layer, and a cathode deactivating layer comprising the deactivating metal comprising Ti, or alloys thereof, wherein the cathode inner conductive layer and the cathode deactivating layer are in electrical contact.

In more embodiments, the cathode case consists of a cathode inner conductive layer, and a cathode deactivating layer comprising the deactivating metal comprising Ti, or alloys thereof, wherein the cathode inner conductive layer and the cathode deactivating layer are in electrical contact. In other embodiments, the cathode deactivating layer comprising Ti, or alloys thereof has a uniform or varying thickness of 50 µm to 100 µm. In more embodiments, the cathode deactivating layer comprising Ti, or alloys thereof has a uniform or varying thickness of 50 µm to 100 µm and the cathode inner conductive layer has a uniform or varying thickness of 175 µm to 300 µm.

2. Exemplary Battery with a Ti Deactivating Layer on the Cathode Case and Anode Case In one embodiment of the batteries disclosed herein, wherein the cathode case comprises a deactivating metal comprising Ti or alloys thereof, the battery also comprises an anode case comprising an anode inner conductive layer, and an anode deactivating layer comprising a deactivating metal comprising Ti, or alloys thereof, wherein the anode inner conductive layer and the anode deactivating layer are in electrical contact. In some embodiments, the anode case comprises a deactivating metal.

In some embodiments, the anode case comprises a deactivating metal comprising Ti or an alloy thereof, and the battery optionally comprises an external coating on an outer surface of the anode case, or an outer surface of the cathode case, or both, wherein the external coating comprises Al, Cu, Cr, or Zn, an alloy thereof, or any combination of two or more thereof.

In a similar embodiment, the anode case comprises an anode inner conductive layer, an anode deactivating layer comprising a deactivating metal comprising Ti, or alloys thereof, wherein the anode inner conductive layer and the anode deactivating layer are in electrical contact; and wherein the battery further comprises an external coating on an outer surface of the anode case, or an outer surface of the cathode case, or both, wherein the external coating comprises Al, Cu, Cr, Zn or any combination of two or more thereof, and wherein the external coating and the anode deactivating layer are in electrical contact.

In another embodiment, the anode case comprises an anode inner conductive layer, an anode deactivating layer comprising a deactivating metal comprising Ti, or alloys thereof, wherein the anode inner conductive layer and the anode deactivating layer are in electrical contact; and wherein the battery further comprises an external coating on an outer surface of the anode case, or an outer surface of the cathode case.

In another embodiment, the anode case consists essentially of an anode inner conductive layer, and an anode deactivating layer comprising a deactivating metal comprising Ti, or alloys thereof, wherein the anode inner conductive layer and the anode deactivating layer are in electrical contact.

In yet another embodiment, the anode case consists of an anode inner conductive layer, and an anode deactivating layer comprising a deactivating metal comprising Ti, or alloys thereof, wherein the anode inner conductive layer and the anode deactivating layer are in electrical contact.

In some embodiments, the anode deactivating layer comprising Ti, or alloys thereof has a uniform or varying thickness of 50 µm to 100 µm. In other embodiments, the anode deactivating layer has a uniform or varying thickness of 50 µm to 100 µm and the anode inner conductive layer has a uniform or varying thickness of 75 µm to 350 µm, or of 125 µm to 350 µm, or 25 µm to 100 µm 175 µm to 300 µm, or of 200 µm to 300 µm.

II. Exemplary Cathode Case

A. Exemplary Cathode Case Structure

FIG. 4 depicts an exemplary cathode case useful in the batteries of the present disclosure. Cathode case 400 comprises a bottom 413, an annular side 412, and a rim 414. The case comprises an inner conductive layer 403 and a deactivating layer 404. The deactivating layer covers the outer surface 415 of the bottom and annular side, while the inner conductive layer covers at least a portion of the inner surface 416 of the cathode case which may be in physical contact with the electrochemical cell.

The exposed surface(s) of the layers is important for proper functioning of the exemplary batteries. FIGS. 5A-N show a cross-section view of several different embodiments of cathode cases which contain multiple layers in different orientations for use in an exemplary battery.

B. Exemplary Cathode Case Structure with Multiple Layers

In some embodiments, the deactivating layer 502 extends over the rim of the cathode case 500a as shown in FIG. 5A. In other embodiments, for example 500b (FIG. 5B), the deactivating layer 504 extends over the rim and down the inner wall 501 of the cathode case covering the inner conductive layer 503 except on the inside bottom surface of the cathode case.

Embodiment 500f (FIG. 5F) shows the deactivating layer 514 comprises greater than 50% of the overall thickness of the cathode case. The inner conductive layer 513 comprises less than 50% of the overall thickness of the cathode case. In some embodiments, inner conductive layer 513 may be absent. In that embodiment, the deactivating layer 514 is the cathode case.

In yet another embodiment, shown as cathode case 500c in FIG. 5C, the deactivating layer 506 is applied across the surface, with continuous coating from the outer surface of the case 506b to the inner surface of the case 506a. The outer surface of the case 506b and the inner surface of the case 506a may be the same or different materials and are in electrical contact. The internal support member 505 is completely encased by the deactivating layer. The internal support member can be comprised of any material, conductive or nonconductive, able to maintain the can shape as well as have the ability to be crimped to seal the battery.

In some examples, the cathode deactivating layer further comprises multiple layers. In one embodiment 500m, the cathode case comprises a first layer comprising a deactivating metal 534 and a second layer of deactivation metal 533, and a cathode inner conductive layer 532 (FIG. 5M).

In some embodiments, the thickness of the deactivating layer relative to the inner conductive layer is chosen to minimize or prevent exposure of the inner conductive layer to a conductive aqueous medium when a battery described herein is emersed in a conductive aqueous medium. In some embodiments, the thickness of the deactivating layer relative to the inner conductive layer is chosen to minimize or prevent cracking of the deactivating layer during manufacturing. The thickness of the deactivating layer that minimizes or prevents cracking varies based on the selection of deactivating metal, inner conductive layer material, and form of the cathode and/or anode case.

In some embodiments, the deactivating metal is present in a layer that has a uniform or varying thickness which is sufficient to prevent exposure of the inner conductive layer to the ambient environment. In some embodiments, the deactivating metal is present in a layer that has a uniform or varying thickness which is sufficient to prevent exposure of a surface area of the inner conductive layer that is less than 0.01 mm$^2$, or less than 0.05 mm$^2$, or less than 0.1 mm$^2$, or less than 0.5 mm$^2$, or less than 1.0 mm$^2$, or less than 1.5 mm$^2$ to the ambient environment. In some embodiments, the deactivating metal is present in a layer that has a uniform or varying thickness that reduces or prevents cracking of the layer upon folding. In some embodiments, the deactivating metal is present in a layer that has a uniform or varying thickness which is sufficient to prevent exposure of a surface area of less than 0.01 mm$^2$, or less than 0.05 mm$^2$, or less than 0.1 mm$^2$, or less than 0.5 mm$^2$, or less than 1.0 mm$^2$, or less than 1.5 mm$^2$ of the inner conductive layer to the ambient environment upon stamping, pressing, folding, crimping, or any other manufacturing processes that causes a metal layer to stretch or become thinner in the final manufactured product compared to the metal layer thickness at the beginning of the manufacturing process.

C. Exemplary Cathode Case Structure with a Binding Layer

In another embodiment 500e (FIG. 5E), the inner conductive layer 510 and the deactivating layer 512 are joined by a binding layer 511.

As used herein, a "binding layer" refers to a layer between an inner conductive layer and a deactivating layer that causes the layers to remain affixed together, and that does not hinder and may facilitate the electrical contact between the two layers.

In one such embodiment, an exemplary battery comprises at least one binding layer disposed between a cathode inner conductive layer and a cathode deactivating layer, an anode inner conductive layer and an anode deactivating layer, or both, wherein the inner conductive layer and the deactivating layer remain in electrical contact.

In other embodiments, an exemplary battery comprises at least one binding layer disposed between a cathode inner conductive layer and a cathode deactivating layer, an anode inner conductive layer and an anode deactivating layer, or both, wherein the inner conductive layer and the deactivating layer remain in electrical contact, wherein the at least one binding layer comprises a conductive material.

In some embodiments, an exemplary battery comprises at least one binding layer disposed between a cathode inner conductive layer and a cathode deactivating layer, an anode inner conductive layer and an anode deactivating layer, or both, wherein the inner conductive layer and the deactivating layer remain in electrical contact, wherein the at least one binding layer comprises a metal. For example, a metal such as Ni or Al can be used as a binding layer in a cladding process. In some embodiments, a binding layer comprises a metal sheet. In one particular embodiment, a binding layer comprises a nickel metal in a cladding process. In another embodiment, the binding metallurgically bonds the conductive layer and the deactivating layer.

In another embodiment, an exemplary battery comprises at least one binding layer disposed between a cathode inner conductive layer and a cathode deactivating layer, an anode inner conductive layer and an anode deactivating layer, or both, wherein the inner conductive layer and the deactivating layer remain in electrical contact, wherein the at least one binding layer comprises an adhesive. In further embodiments, the adhesive comprises a pressure-sensitive adhesive, a rubber-based adhesive, an epoxy, a polyurethane, a silicone adhesive, a phenolic resin, a UV curable adhesive, an acrylate adhesive, a laminating adhesive, a fluoropolymer, or any combination of two or more thereof.

In some embodiments, a binding layer comprises multiple layers or multiple components. In one embodiment, a binding layer is a multilayer construct comprising one or more laminating adhesives in contact with the inner conductive layer and the deactivating layer. In some embodiments, a laminating adhesive is thin, such as 0.1-10 µm. In some embodiments, the adhesive may reside within grooves and crevices on an inner conductive layer or a deactivating layer or both, that can be formed by increasing the surface roughness using abrasion techniques known in the art and described herein for laminates.

For example, a binding layer is a multiple component construct comprising an adhesive layer mixed with embedded conductive particles in contact with a deactivating layer, an adhesive layer mixed with embedded conductive particles in contact with an inner conductive layer, or both. In one embodiment, a binding layer is a multiple component construct comprising a layer (such as a 25-40 µm layer) of acrylic pressure sensitive adhesive embedded with conductive particles in contact with the deactivating layer and the inner conductive layer. More specifically, in some embodiments, a binding layer comprises a laminating adhesive comprising a low or a high density polyethylene, a polyolefin, a polyolefin derivative, an acid-containing adhesive, an ionomer, a terpolymer of ethylene, an acrylate, or an ethylene-vinyl acetate. In other embodiments, the acid-containing adhesive comprises EAA, EMAA, an ionomer, a terpolymer of ethylene, an acid, or an acrylate.

In some embodiments, a binding layer has a uniform or varying thickness of 100 nm to 400 µm, 100 nm to 350 µm, 1 µm to 350 µm, 200 µm to 350 µm, 1 µm to 50 µm, 5 µm to 50 µm, 50 µm to 250 µm, or 5 µm to 200 µm. This may lead to some embodiments with the anode case and/or the cathode case each having a uniform or varying overall thickness of 50 µm to 400 µm, or 200 µm to 400 µm.

D. Exemplary Cathode Case Structure with an External Coating

An external coating on a cathode case, an anode case, or both of a battery may be a highly conductive material, such as a metal, to reduce the contact resistance during normal operation of the battery or to improve the aesthetics of the battery case. When a battery comprising a deactivating layer and an external coating is immersed in an aqueous conductive medium, the external coating exposed on the outer surface oxidizes and may dissolve as part of the oxidation reaction on the positive electrode of the battery. Once the external coating is oxidized, the deactivating layer is exposed to the conductive aqueous medium, and the electrolysis reaction is reduced or suppressed. Possible material combinations as well as thickness ranges are described in the previous section.

For cathode case embodiment 500d depicted in FIG. 5D, the inner conductive layer 507 comprises the majority of the inner surface of the cathode case. The deactivating layer 508 covers the outer surface of the inner conductive layer and extends over the rim. The outer surface of the deactivating layer is coated with an external coating 509 while the inner surface of the cathode case is the exposed inner conductive layer.

In embodiment 500g depicted in FIG. 5G, a deactivating layer 516 which comprises a deactivating metal is applied across the inner, outer, and rim surfaces of internal support member 515, as a continuous coating. The internal support member is completely encased by the deactivating layer. The internal support member can be comprised of any material, conductive or nonconductive, able to maintain the can shape as well as have the ability to be crimped to seal the battery. The deactivating layer is coated with an external coating 517 so that the inner, outer, and rim surfaces of the cathode case are covered with the external coating.

In another embodiment 500h depicted in FIG. 5H, a deactivating layer 519 covers the outer surface of the inner conductive layer 518 and extends over the rim. The outer and rim surfaces of the deactivating layer and the inner surface of the inner conductive layer are coated with an external coating 520 so that the inner surface and outer surface of the cathode case are covered with the external coating.

In embodiment 500i depicted in FIG. 5I, a deactivating layer 522 covers the outer surface of the inner conductive layer 521 without extending over the rim. The outer surface of the deactivating layer and the inner and rim surfaces of the inner conductive layer are coated with an external coating 523 so that the inner surface and outer surface of the cathode case are covered with the external coating.

In embodiment 500j depicted in FIG. 5J, a deactivating layer 525 covers the outer surface of the inner conductive layer 524 and extends over the rim and down the inner surface of the cathode case covering the inner conductive layer except on the inside bottom surface of the cathode case. The surface of the deactivating layer and the surface of the inner conductive layer that is not covered by the deactivating layer are coated with an external coating 526 so that the inner surface and outer surface of the cathode case are covered with the external coating.

In embodiment 500k depicted in FIG. 5K, a deactivating layer 528 comprises greater than 50% of the overall thickness of the cathode case. The inner conductive layer 527 comprises less than 50% of the overall thickness of the cathode case. The outer surface of the deactivating layer is covered with an external coating 529. The inner surface of the cathode case is comprised of the inner conductive layer. The surface of the rim of the cathode case comprises the deactivating layer.

In 500l depicted in FIG. 5L, a deactivating layer 530 comprises greater than 90% of the overall thickness of the cathode case. All exposed surfaces, including the inner, rim, and outer surfaces of the deactivating layer are covered with an external coating 531.

In embodiment 500n depicted in FIG. 5N, the cathode case comprises a first layer comprising a deactivating metal 537, a second layer of a deactivation metal 536, an external coating 538, and a cathode inner conductive layer 535.

E. Exemplary Cathode Case Structure During Crimping

FIG. 6A depicts an expanded cross-sectional schematic of a section of a cathode case 600a according to one embodiment having a bottom 613, annular side, or an outer annular surface, 612 and rim 614. Gasket 606 is also depicted. FIGS. 6A, 6B, 6C, 7A, 7B, and 8 represent partial cross-sectional schematics of a complete battery, but do not show the anode case nor the internal components of the battery for clarity. FIG. 6D shows an SEM image of a cross-section of a prototype that correlates to the schematic in FIG. 6C without a gasket. In this embodiment, part of the annular side is crimped to form a crimp area 615 that includes the rim, or rim surface, 614. In some embodiments, for example 600a, as depicted in FIG. 6A, the deactivating layer 604 is extended over the rim and is partially covered by the gasket 606 during the crimping process. Once assembled into a battery, the inner conductive layer 603 has no exposed surfaces on the outer surface of the battery. In another embodiment, for example 600b, depicted in FIG. 6B, the deactivating layer 604 is extended over the rim and down the inner side wall and is covered by the gasket 606 during the crimping process. In some embodiments, (a section of the cathode case 600c is depicted in FIG. 6C) the deactivating layer 604 is extended and thinned from the initial wall thickness in a process such as a stamping process and is hem-folded over the inner conductive layer 603. A section of a manufactured cathode case 600d, is depicted in FIG. 6D, which shows an SEM image of the cross section of one exemplary prototype crimped cell with a hem fold. In this particular example in FIG. 6D, the thickness of the deactivating layer 604 starts at a thickness of approximately 200 µm with a varying thickness in the rim 614 due to the stamping method and the inner conductive layer (in some embodiments also referred to as the internal support member) in the thinned portion of the rim 614 has a varying thickness of 5 µm to 100 µm.

Figures 7A, 7B:
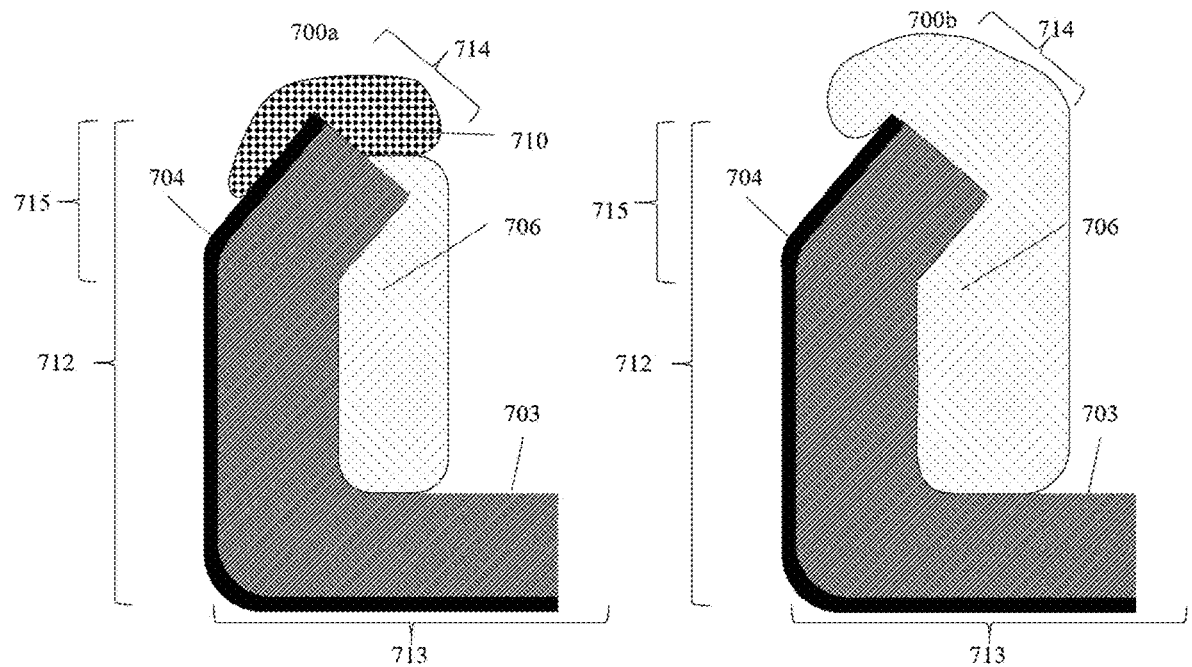
FIGS. 7A and 7B shows cross-sectional schematics of exemplary cathode cases in accordance with embodiments of the present disclosure illustrating the placement of a sealant layer or an extended gasket after crimping.

As seen in FIGS. 7A and 7B, in some embodiments, the interface between the inner conductive layer 703 and the deactivating layer 704 is exposed at the rim 714 of the cathode case. The cathode case 700a and 700b have a bottom, or outer bottom surface, 713, annular side 712, rim 714, and a crimp area 715. In some embodiments, for example 700a, the exposed interface is covered with a water impermeable coating 710 to prevent the inner conductive layer 703 from being exposed to an aqueous conductive medium during immersion. In other embodiments, for example 700b, the exposed interface is covered with an extended gasket 706 to prevent the inner conductive layer 703 from being exposed to an aqueous conductive medium during immersion.

Figure 8:
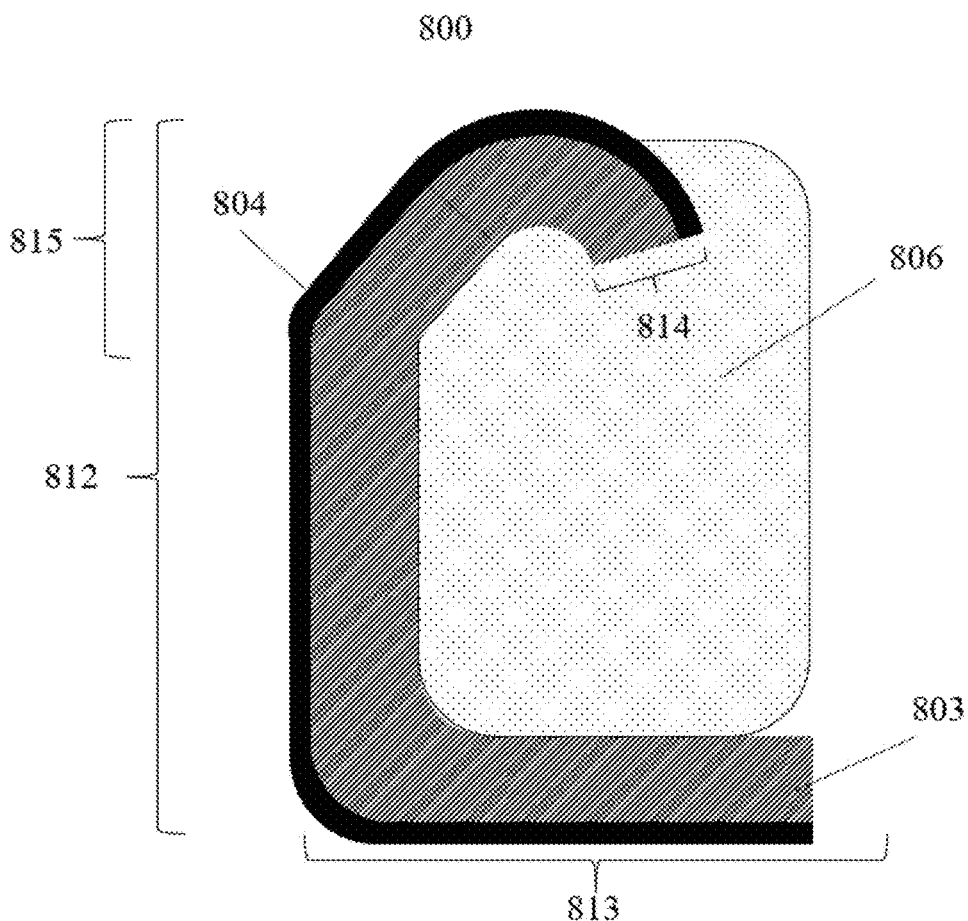
FIG. 8 shows a cross-sectional schematic of an exemplary cathode case in accordance with an embodiment of the present disclosure illustrating the placement of a rim after crimping.

FIG. 8 shows an expanded cross-sectional schematic of a section of a cathode case 800 according to one embodiment having a bottom 813, annular side 812 and rim 814. Gasket 806 is also depicted. In this embodiment, part of the annular side is crimped to form a crimp area 815 that includes the rim 814. In these embodiments, the crimp area has a fishhook shape where the rim is rotated towards the bottom of the cathode case and the rim surface is buried into the gasket. A portion of the deactivating layer 804 is covered by the gasket. The inner conductive layer 803 has no exposed surface to the outer surface of the battery and is therefore protected during immersion in a conductive aqueous medium.

F. Exemplary Anode and Cathode Case Materials

Anode and cathode case components may comprise a variety of materials known to those in the art. Suitable materials for the inner conductive layer include, without limitation, conductive metals. In certain embodiments, the inner conductive layer comprises aluminum, stainless steel, chromium, tungsten, gold, vanadium, nickel, niobium, titanium, tantalum, silver, an alloy thereof, or any combination thereof. In a particular embodiment, the anode inner conductive layer and/or the cathode inner conductive layer comprises stainless steel. In some embodiments, the inner conductive layer comprises aluminum, stainless steel, chromium, gold, vanadium, nickel, silver, copper, magnesium, zinc, an alloy thereof, or a combination of any two or more thereof.

In certain embodiments, a stainless-steel disc of varying thickness from 5 µm to 300 µm, maybe placed on a portion of the deactivating layer. The stainless-steel disc is in electrical contact with the deactivating layer and may be the inner conductive layer and/or internal support member.

Stainless steel is an alloy and is commercially available in a variety of forms. Stainless steel useful for the inner conductive layer includes, without limitation, SS304, SS316, SS430, duplex 2205, duplex 2304, duplex 2507, or one or more other stainless steels with a chromium content equal to or greater than 10% by weight and/or a nickel content equal to or greater than 0.1% by weight. The chromium content is to create oxide conditions favorable for electron transfer from the battery contents as with current commercial batteries.

In some embodiments, a layer comprising vanadium may be disposed between the inner conductive layer and the deactivating layer. In some embodiments, the layer comprising vanadium is from 1% to 95%, or from 25% to 80%, or is greater than 75% vanadium in combination with one or more of other binding materials, composite materials, inner conductive materials, or deactivating metals described herein.

In addition to conductive metals, an inner conductive layer and/or a deactivating layer may comprise conductive composites. In one embodiment, conductive particles are embedded in a non-conductive medium to form an overall conductive film that is coated onto a cathode case as an inner conductive layer and/or a deactivating layer. In another embodiment, silver, nickel, conductive carbon black, carbon nanotubes, graphene, graphite, and/or carbon fibers are used as the conductive particles in the conductive composite film.

In some embodiments, a cathode case comprises an internal support member. In some embodiments, the internal support member is the inner conductive layer. In some embodiments the internal support member comprises an insulating material. In some embodiments, the internal support member comprises a thermoset elastomer. Examples of thermoset elastomers include without limitation polydimethylsiloxane, crosslinked polyurethane coating, crosslinked acrylates, rubberized epoxy, or any combination thereof. Crosslinked acrylates may be crosslinked, in some embodiments, using an ultraviolet light source. After coating, molding or thermoforming to form an internal support member comprising an insulating material, the overall shrinkage of the insulating material, in some embodiments, is less than 30%, less than 15%, or less than 5%. After coating, molding or thermoforming to form an internal support member comprising an insulating material, the overall shrinkage of the insulating material, in some embodiments, is or 0 to 30%, or 0 to 15%, or 0 to 5%.

In some embodiments, the decomposition temperature of a thermoset polymer is greater than 85° C., greater than 100° C., greater than 125° C., greater than 150° C., greater than 175° C., or greater than 200° C. In some embodiments, the decomposition temperature of the thermoset polymer is a temperature from 85° C. to 100° C., or 100° C. to 125° C., 125° C. to 150° C., 150° C. to 175° C., or 175° C. to 200° C., or 200° C. to 500° C.

In some embodiments, exemplary batteries comprise a water impermeable coating disposed on and covering a rim surface of the cathode case, and optionally on a portion of an outer surface of the anode case, or optionally disposed on a portion of an outer surface of the cathode case, or optionally on disposed on both a portion of the outer surface of the anode case and a portion of the outer surface of the cathode case. The water impermeable coating may be selected from natural rubber, TFE, Exxon Butyl, chloroprene, epichlorohydrin, ethylene-propylene, flurosilicone, hydrogenated nitrile, liquid silicone rubber, medical ethylene propylene, silicone, nitrile, perfluoroelastomer, polyacrylate, polyurethane, styrene butadiene, Teflon, Vamac, PTFE, viton, or any combination of one or more thereof.

In other embodiments, exemplary batteries comprise a water impermeable coating disposed on and covering a rim of the cathode case and optionally disposed on a portion of an outer surface of the anode case, and optionally disposed on a portion of an outer surface of the cathode case, wherein the water impermeable coating is the same material as the gasket.

In further embodiments, a cathode inner conductive layer further comprises an outer bottom surface, an outer annular surface, and a rim surface, wherein the outer bottom surface is encased by the cathode deactivating layer, the outer annular surface and the rim surface are encased by the cathode deactivating layer, the gasket, a water impermeable coating, or any combination thereof.

In some embodiments, a water impermeable coating comprises a rubber, a buna, a silicone, a silicone rubber, a PTFE, a viton or an elastomeric material or a plastic such as nylon, polytetrafluoroethylene, fluorinated ethylene-propylene, chlorotrifluoroethylene, perfluoroalkoxy polymer, polyvinyls, polyethylene, polyethylene terephthalate, polypropylene, polystyrene, polysulfone, polyacrylicates, polyurethanes, and combinations thereof.

A gasket may be comprised of any material known in the art. In some embodiments, a gasket comprises an elastomeric material or a plastic such as nylon, polytetrafluoroethylene, fluorinated ethylene-propylene, chlorotrifluoroethylene, perfluoroalkoxy polymer, polyvinyls, polyethylene, polyethylene terephthalate, polypropylene, polystyrene, polysulfone, polyacrylicates, polyurethanes, silicone rubbers, or any combination of two or more thereof.

G. Exemplary Anode Case Structure

Figure 3:
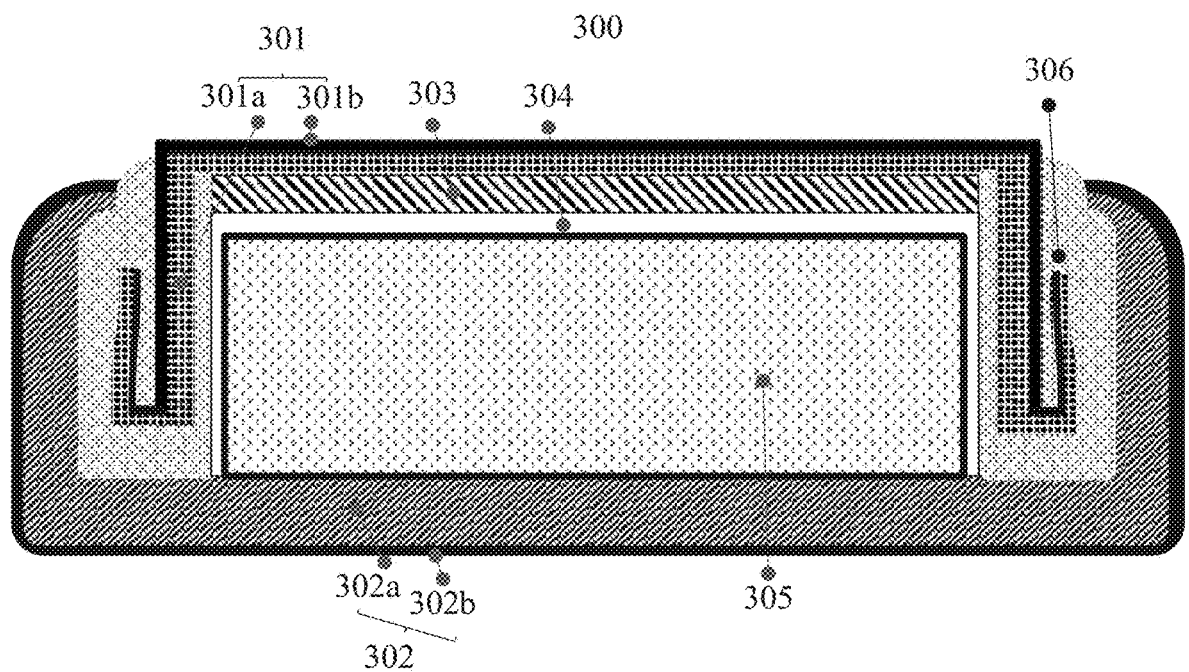
FIG. 3 shows a cross-sectional schematic of an exemplary coin or button cell-type battery in accordance with an embodiment of the disclosure.
Figure 10:
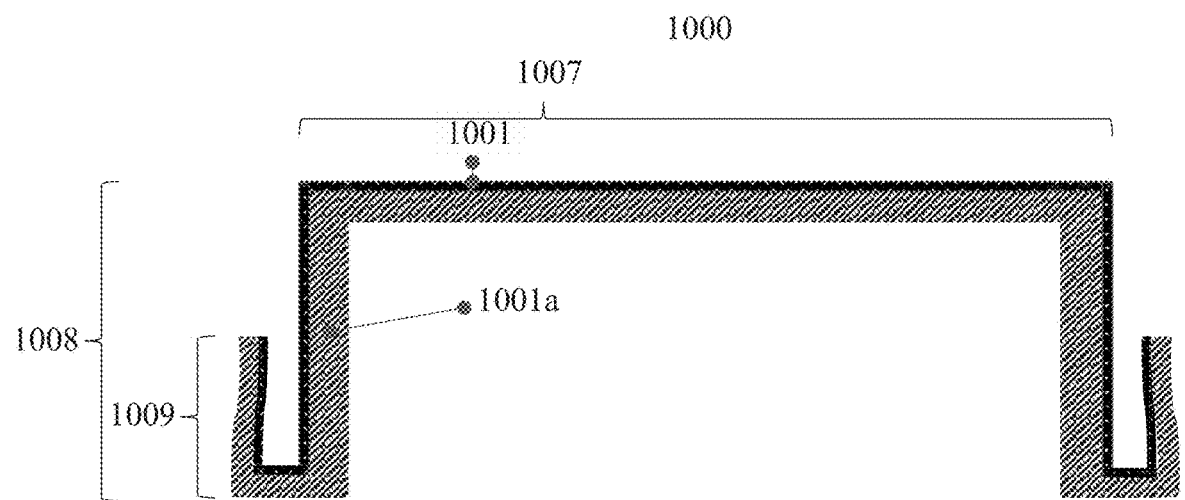
FIG. 10 shows a cross-sectional schematic of an exemplary anode case in accordance with an embodiment of the present disclosure.

FIG. 10 depicts an exemplary anode case useful in the batteries of the present disclosure. The anode case 1000 comprises a top 1007, an annular side 1008, and a hem fold 1009. The anode case comprises an inner conductive layer 1001a and a deactivating layer 1001b. In another embodiment, the hem fold is completely imbedded in the gasket when the battery is assembled as shown in FIG. 3.

Each of the exemplified cathode case structures, including the positioning of the layers, and the types of materials, described for the embodiments of FIG. 6 are applicable to the anode case.

In some embodiments, the deactivating layer extends over the hem fold 1009 of the anode case.

In yet another embodiment, the deactivating layer is applied across the entire surface, with the continuous coating from the outside surface of the anode case to the inside surface of the case. The outside surface of the anode case to the inside surface of the anode case may be the same or different materials. In another embodiment, the outside surface of the anode case is a deactivating metal and the inner surface of the anode case is stainless steel or aluminum. In another embodiment wherein the anode comprises and internal support member, the internal support member is completely encased by the deactivating layer so that the internal support member is not on the outer surface of the anode case. The internal support member can be comprised of any material, conductive or nonconductive, able to maintain the anode shape as well as have the ability to withstand the pressures from the crimp to seal the battery. In one embodiment, the internal support member is stainless steel.

In some embodiments, the inner conductive layer and the deactivating layer are joined by a binding layer. In some embodiments, the binding is an electrically conductive adhesive.

H. Cathode Case as the Sealing Cup

FIG. 2 shows an exemplary coin-cell battery. The "anode case" is defined as the battery case in direct contact with the anode of the electrochemical cell and the "cathode case" is defined as the battery case in direct contact with the cathode of the electrochemical cell. The shape and size of the cathode case and anode case can vary depending on the battery type. A typical coin-cell battery casing comprises a sealing cup and a bottom can. FIG. 2 shows an exemplary coin-cell battery where the sealing cup is the anode case 201 and the bottom can is the cathode case 202.

Figure 9:
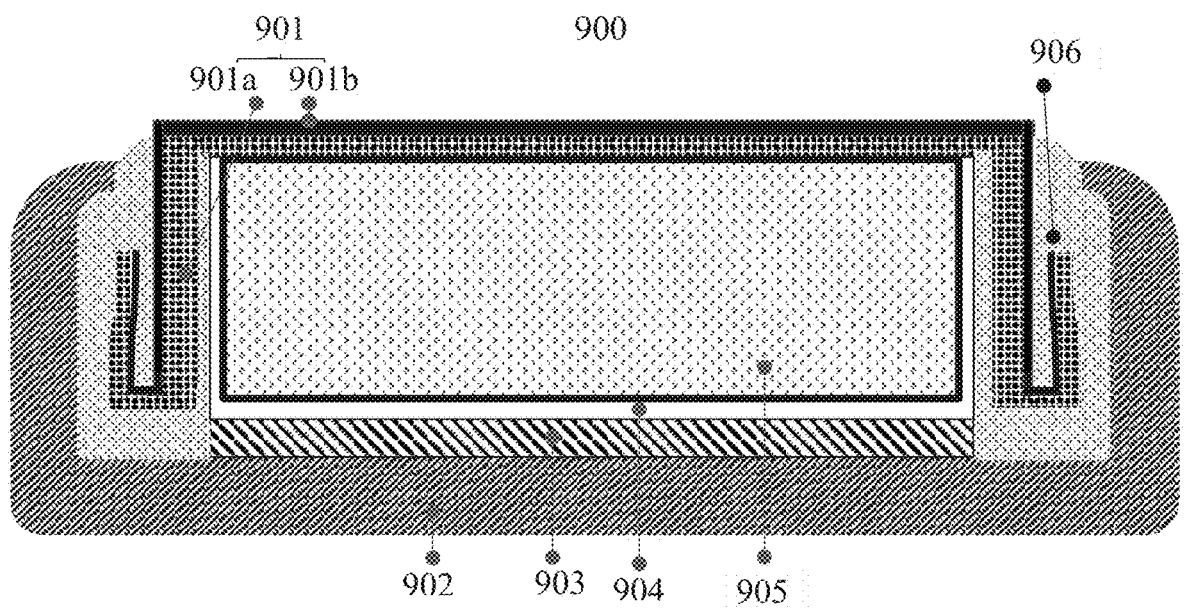
FIG. 9 shows a cross-sectional schematic of an exemplary coin or button cell-type battery in accordance with an embodiment of the disclosure.

Also contemplated in this disclosure are certain embodiments wherein the configuration is the opposite of that described above. In certain embodiments, the sealing cup is the cathode case and the bottom can is the anode case. In one embodiment, as shown in FIG. 9, the battery is a coin cell or a cylindrical battery comprising a battery case, wherein the battery case comprises a sealing cup 901 and a bottom can 902 and a gasket 906, wherein an outer diameter of the sealing cup is smaller than an inner diameter of the bottom can and at least a portion of the sealing cup is positioned inside the bottom can with the gasket between the sealing cup and the bottom can, and further wherein an annular wall of the bottom can is crimped towards an annular wall of the sealing cup. The battery further comprises an electrochemical cell comprising an anode 903, a cathode 905, and a separator 904 positioned between the anode 903 and the cathode 905. In this embodiment, the cathode case is the sealing cup and the anode case is the bottom can. In some embodiments, the rim surface of the sealing cup is advantageously embedded into the gasket after assembly, protecting the rim surface of the sealing cup from exposure to a conductive aqueous medium during immersion.

III. Exemplary Contact with a Conductive Aqueous Medium

Contact of a battery with a conductive aqueous medium includes immersing, or partially immersing, a battery in a conductive aqueous medium or contacting the battery with wet tissue, such as tissues of the mouth, throat, esophagus, or any other part of the GI tract of a mammal. In some embodiments, the contact with a conductive aqueous medium comprises placement of the battery on a hydrated tissue such that at least a part of the anode case is in contact with the hydrated tissue. In some embodiments, the hydrated tissue is hydrated ham, while in other embodiments, the tissue is hydrated pig esophageal tissue.

In another embodiment, the contact with a conductive aqueous medium comprises immersion of the battery, anode terminal facing up, in a conductive aqueous medium. Both the anode and the cathode are in contact with the conductive aqueous medium. A fully immersed battery has the entire anode and the entire cathode in contact with the conductive aqueous medium. Partial immersion includes embodiments where 1) all of the anode case, but only a portion of the cathode case, 2) all of the cathode case, but only a portion of the anode case, or 3) a portion of both the anode case and the cathode case are in contact with the conductive aqueous medium In one embodiment, the conductive aqueous medium is 20 mL of 25% Ringer's solution, or is a saline solution, with an initial pH of 5 to 7. In some embodiments, after the battery is immersed, the average pH of the solution over the first 60-minute time period does not exceed an average pH of 10 with a sampling interval of every 5 minutes. The pH should be measured directly in the solution container 3 cm above the center of the anode case with pH paper without mixing. In yet another embodiment, the pH of the solution does not exceed 9.5 for a time period of 10 to 60 minutes after immersion. In another embodiment, the pH of the solution does not exceed 9 for a time period of 10 to 60 minutes after immersion. In yet another embodiment, the pH of the solution does not exceed 8.5 for a time period of 10 to 60 minutes after immersion. In yet another embodiment, the pH of the solution does not exceed 8 for a time period of 10 to 60 minutes after immersion. In yet another embodiment, the pH of the solution does not exceed 7 for a time period of 10 to 60 minutes after immersion.

IV. Exemplary Laminates

Figure 11:
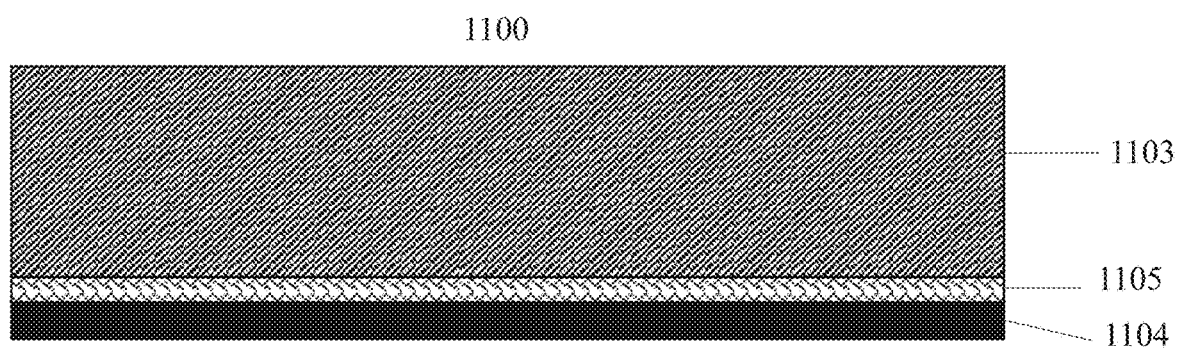
FIG. 11 shows a cross-sectional schematic of an exemplary multilayer laminate.

Next, the present disclosure provides multilayer laminates that are useful for forming either an anode case or a cathode case. Laminates are layered materials, made of 2 or more layers, where the layers are affixed, in any order, using heat, pressure, welding, gluing, or other techniques known in the art. An exemplary multilayer laminate 1100 is depicted in FIG. 11, where 1103 represents a conductive layer, 1104 represents a deactivating layer, and 1105 represents a binding layer. The binding layer is between the conductive and deactivating layers. The conductive and deactivating layers can be in electrical contact after lamination by exposure to pressure and temperature securing the conductive layer to deactivating layer.

The multilayer laminates described herein may advantageously be used to form an electrode case, such as a cathode case, an anode case, or both, for a battery as described herein.

In some embodiments, a binding layer comprises:
a) multiple layers;
b) an adhesive layer in contact with a deactivating layer;
c) an adhesive layer in contact with a conductive layer; or
d) a) b) and/or c).

In some embodiments, the conductive layer has a uniform or varying thickness of 100 nm to 400 µm, 100 nm to 350 µm, 1 µm to 350 µm, 200 µm to 350 µm, 1 µm to 50 µm, 50 µm to 200 µm, 25 µm to 300 µm, or 175 µm to 300 µm.

In another embodiment, the conductive layer is stainless steel and the surface in contact with the binding layer has a rough surface, which include peaks and valleys. Surface roughness can be created by chemical means, such as etching, or by physical means, such as scoring, stamping, abrasion, or sand blasting. The binding layer settles into the valleys during the lamination process and the peaks make direct electrical contact with the deactivating layer to create a metal-to-metal contact. This may reduce the resistance from the conductive layer to the deactivating layer. The binding layer may be insulating since the electrical contact may be made directly between the conductive and deactivating layers. In other embodiments, the deactivating layer has a rough surface. In other embodiments, the conductive layer and the deactivating layers both have a rough surface.

In some embodiments, the deactivating layer may have a uniform or varying thickness of 100 nm to 400 µm, 100 nm to 350 µm, 1 µm to 350 µm. In some embodiments, the deactivating layer has a uniform or varying thickness of 200 µm to 350 µm, 1 µm to 50 µm, 1 µm to 100 µm, 1 µm to 300 µm, 14 µm to 200 µm, or 50 µm to 200 µm.

In some embodiments, the binding has a uniform or varying thickness of 100 nm to 400 µm, 100 nm to 350 µm, 1 µm to 350 µm, 200 µm to 350 µm, 1 µm to 50 µm, or 50 µm to 200 µm.

Figure 12:
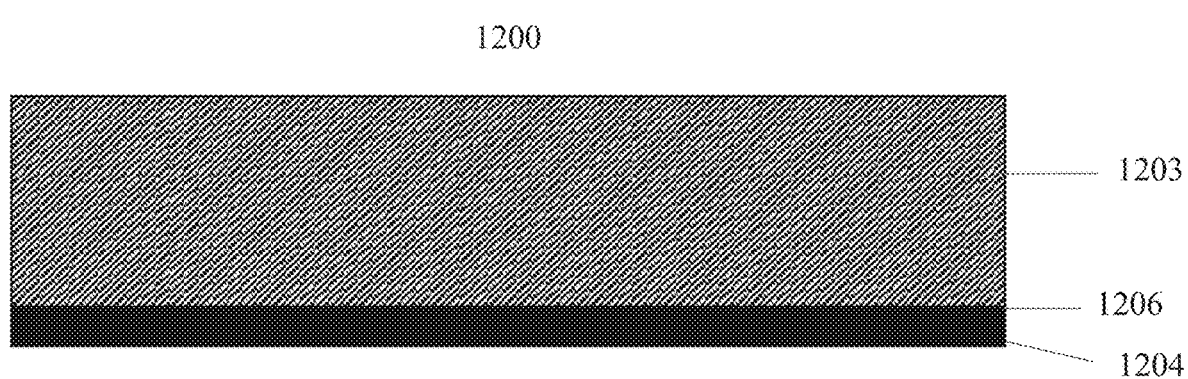
FIG. 12 shows a cross-sectional schematic of an exemplary multilayer laminate.

Another exemplary multilayer laminate 1200 is depicted in FIG. 12, where 1203 represents a conductive layer, 1204 represents a deactivating layer, and 1206 represents the interface between the conductive layer and deactivating layer. In some embodiments, the conductive and deactivating layers are directly joined together and are in electrical contact. The conductive and deactivating layers can be joined mechanically and electrically by methods know in the art. For example, physical vapor deposition and chemical vapor deposition is useful for forming layers having a thickness of 1 nm to 10 µm. Cladding, diffusion bonding, welding, pinching, stamping or otherwise mechanically affixing the layers are useful processes for forming layers having a thickness of 1 µm to 400 µm, 75 µm to 330 µm, or 200 µm to 330 µm.

Laminating the conductive layer to the deactivating layer is one method of manufacturing a laminate for use in an anode case or a cathode case for a battery of any one of the preceding embodiments wherein the laminate comprises a conductive layer and a deactivating layer. Cladding the conductive layer to the deactivating layer is another method of manufacturing a laminate for use in an anode case or a cathode case for a battery wherein the laminate comprises a conductive layer and a deactivating layer.

In one embodiment, the multilayer laminate is a clad, or is a clad laminate, or is a bi-clad material. The conductive layer is a stainless steel and the deactivating layer is niobium, tantalum, titanium, tungsten, or an alloy thereof. Cladding is a process that can metallurgically bond dissimilar metals. One cladding method may be achieved by a continuous roll bonding process that combines two or more strips of metal. First, the individual strips are either chemically or mechanically cleaned. The strips then pass through a rolling mill which is designed for cladding. As the layers pass through the mill, the rolls exert immense pressure that reduces strip thickness and creates a clad. Typically, the resultant clad is further heat-treated to facilitate future stamping into battery casings.

Furthermore, one can laminate an external coating to the deactivating layer of the laminate to produce a laminate comprising an external coating, a deactivating layer, and a conductive layer. For example, cladding may be used to attach the external coating to the deactivating layer of the laminate and then attach it to the conductive layer. In one laminating manufacturing embodiment, the deactivating layer is disposed between the conductive layer and the external coating, which method comprises laminating the conductive layer, the deactivating layer and the external coating. In another manufacturing embodiment, a laminate for use in an anode case or a cathode case for a battery of any one of the preceding embodiments is produced through cladding the conductive layer, the deactivating layer and the external coating. The resulting laminate comprises a conductive layer, a deactivating layer, and an external coating, wherein the deactivating layer is disposed between the conductive layer and the external coating.

In one embodiment, provided is a laminate comprising
a conductive layer, and
a deactivating layer, comprising a deactivating metal, wherein the laminate is for use in an anode case or a cathode case of a battery.

In another embodiment, a laminate comprises a deactivating layer, comprising a deactivating metal chosen from Ta, Nb, W, Re, Ti, alloys thereof, and combinations thereof.

In another embodiment, a laminate further comprises an exterior coating.

In some embodiments the laminates described herein are used to prepare a material to be used in the preparation of a wire or a blank, (as used herein a blank is a flat metal sheet put into a stamping press that becomes, for purposes of this application, a cathode or anode case or can). In some embodiments, the laminate is a blank. In some embodiments, the laminate is a wire. In some embodiments, the blank is stamped or otherwise formed into a case. In some embodiments a wire is formed into a case or a can using known wire form processes. In some embodiments, the conductive layer and deactivating layer in the laminate have uniform or varying thicknesses in a ratio (deactivating layer:conductive layer) of from 1:1 to 5, or, 1:1.1 to 4.5, or 1:1.5 to 4, or 1; 2 to 3, or 1:1, 1:1.1, or 1:1.2, or 1:1.5, or 1:2, or 1:2.5, or 1:3, or 1:3.5, or 1:4, or 1:4.5, or 1:5. In some embodiments, the conductive layer and deactivating layer in the laminate have uniform or varying thicknesses in a ratio (deactivating layer:conductive layer) of from 1:1 to 20, or, 1:1 to 10, or 1:10, or 1:20. In other embodiments, the conductive layer and deactivating layer in the laminate have uniform or varying thicknesses in a ratio (deactivating layer:conductive layer) of from 1 to 20:1, or 1 to 10:1, or 10:1, or 20:1. In other embodiments, the conductive layer and deactivating layer in the laminate have uniform or varying thicknesses in a ratio (deactivating layer:conductive layer) of from 1 to 5:1, or, 1.1 to 4.5:1, or 1.5 to 4:1, or 2 to 3:1, or 1:1, or 1.1:1, or 1.2:1, or 1.5:1, or 2:1, or 2.5:1, or 3:1, or 3.5:1, or 4:1, or 4.5:1, or 5:1. In some embodiments, the conductive layer and the deactivating layer of the laminate have uniform or varying thicknesses in a ratio (deactivating layer:inner conductive layer) of from 8:1 to 1:5, or 8:1 to 1:3, or 8:1 to 1:2, or 8:1 to 1:1.1, or 8:1 to 1:1, or 6:1 to 1:5, or 6:1 to 1:3, or 6:1 to 1:2, or 6:1 to 1:1.1, or 6:1 to 1:1, 3:1 to 1:5, or 3:1 to 1:3, or 3:1 to 1:2, or 3:1 to 1:1.1, or 3:1 to 1:1, or 2:1 to 1:5, or 2:1 to 1:3, or 2:1 to 1:2, or 2:1 to 1:1.1, or 2:1 to 1:1, or from 8:1 to 1:2.5, or from 8:1 to 1:3, or 8:1 to 1:2, or 8:1 to 1:1.1, or 8:1 to 1:1, or 6:1 to 1:2, or 3:1 to 1:2.

In some embodiments, the conductive layer and deactivating layer in the laminate have uniform or varying thicknesses of 1 μm to 400 μm, or 10 μm to 400 μm, or 50 μm to 400 μm, or 10 μm to 300 μm, or 50 μm to 300 μm, or 100 μm to 200 μm. The conductive layer and deactivating layer have uniform or varying thicknesses as described herein.

Figure 15A:
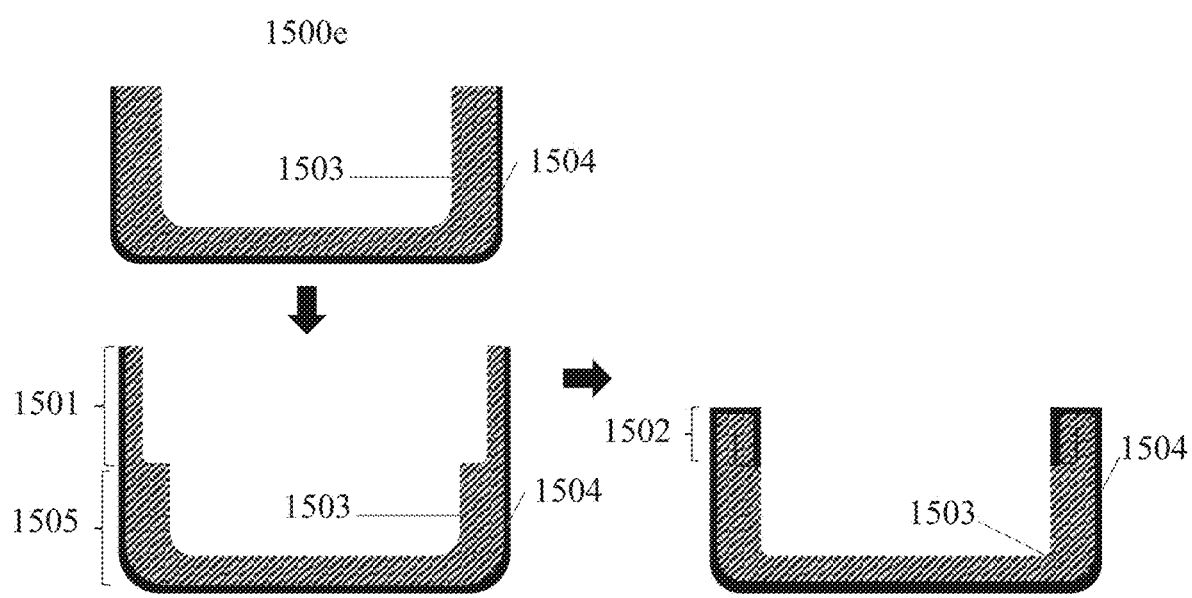
FIG. 15A shows a schematic depicting yet another exemplary method of manufacturing a cathode case.

Manufacturing processes may change the thicknesses of the conductive layer and deactivating layer. Stamping, rolling, pressing and other manufacturing steps cause thinning of the layers. In some embodiments, thinning occurs in one layer. In some embodiments thinning occurs in more than one layer. In some embodiments, the thinning processes are not uniform across the layers. For example, as seen in FIG. 15A the annular sides of the stamped cathode case may be stretched or elongated (1501) resulting in both the total layer thickness in that area being thinner than the rest of the cathode case and the layers within that region being thinner than areas of the cathode case that were not stretched. In some embodiments, a folding process is used to fold the elongated area (1501) to provide the area 1502, which has a total thickness that may be uniform or varying and is similar to the thickness of the side 1505 of the cathode case.

In one example, wherein the total laminate thickness is from 200-250 μm total thickness, the laminate deactivating layer has a uniform or varying thickness of 70 μm to 200 μm and laminate conductive layer has a uniform or varying thickness of 50 μm to 180 μm. Areas of the cathode case that experience bending and/or folding during manufacture have a deactivating layer of uniform or varying thickness of, for example, 14 μm to 40 μm. The cathode case annular walls, as shown in FIG. 15A, have a deactivating layer having a uniform or varying thickness of 70 μm to 200 μm and an inner conductive layer having a uniform or varying thickness of 50 μm to 180 μm.

In some embodiments the cathode cases herein may be prepared from a clad laminate comprising a deactivating layer having a uniform or varying thickness of 60 μm to 200 μm and a conductive layer having a uniform or varying thickness of 50 μm to 190 μm. In some embodiments, a cathode case has described herein has a uniform or varying thickness of 200 μm to 250 μm; and wherein the cathode case comprises a hem fold having a deactivating layer having a uniform or varying thickness of 14 μm to 75 μm on each side of the hem fold and a total inner conductive layer thickness of 222 μm to 50 μm; and wherein the cathode case comprises an annular side wall comprising a deactivating layer having a uniform or varying thickness of 60 μm to 200 μm and an inner conductive layer thickness of 190 μm to 50 μm.

In some embodiments the cathode cases herein may be prepared from a clad laminate comprising a deactivating layer having a uniform or varying thickness of 60 μm to 200 μm and a conductive layer having a uniform or varying thickness of 50 μm to 190 μm. In some embodiments, a cathode case has described herein has a uniform or varying thickness of 200 μm to 250 μm; and wherein the cathode case comprises a hem fold and wherein the hem fold comprises a first side and a second side, and further wherein each of the first and second sides have a deactivating layer with uniform or varying thickness of 14 μm to 75 μm and the hem fold has a total thickness of 200 μm to 250 μm where the first side of the hem fold contacts the second side of the hem fold. An example of a hem fold is seen in FIG. 15C. In section 1502, the first side of the hem fold has the deactivating layer facing the interior of the cathode case and the second side of the hem fold has the deactivating layer facing the exterior of the cathode case. The inner conductive layer of each side of the hem fold comes together as a result of the folding process.

In some embodiments the thickness of the layers of the laminate are chosen to allow for the finally manufactured cathode case or anode case to have a conductive layer with a uniform or varying thickness of 14 μm to 200 μm, or 25 μm to 300 μm, or 175 μm to 300 μm. In some embodiments the thickness of the layers of the laminate are chosen to allow for the finally manufactured cathode case or anode case to have a deactivating layer with a uniform or varying thickness of 1 μm to 75 μm, or of 1 μm to 300 μm, or 1 μm to 100 μm. In some embodiments the thickness of the layers of the laminate are chosen to allow for the finally manufactured cathode case or anode case to have an external coating with a uniform or varying thickness of 100 nm to 7 μm or 100 nm to 5 μm. In some embodiments, the laminate has a uniform or varying thickness of 50 μm to 400 μm, or 175 μm to 400 μm, or of 100 μm to 330 μm, 276 μm to 330 μm.

In some embodiments, prior to formation of the cathode case, the laminate has uniform or varying thicknesses of 1 μm to 400 μm, 50 μm to 400 μm, 100 μm to 400 μm, or 150 μm to 400 μm, or 100 μm to 300 μm, or 100 μm to 200 μm, or 200 μm to 300 μm, or 200 μm to 250 μm.

In some embodiments, the cathode case made from the laminates disclosed herein has a uniform or varying thickness that is the same as, or substantially the same as, the original laminate. In other embodiments, the manufacturing processes may change the thicknesses of the laminate, and the thicknesses of the conductive layer and deactivating layer of the laminate. Stamping, rolling, pressing and other manufacturing steps cause thinning of the laminate and the layers of the laminate. In some embodiments thinning occurs in one layer. In some embodiments thinning occurs in more than one layer. In some embodiments the thinning processes is not uniform across the layers. For example, as seen in FIG. 15A, the annular sides of the pressed cathode can may be stretched or elongated (1501) resulting in both the total layer thickness in that area to be thinner than the rest of the can and the layers within that region to be thinner than areas of the can that were not stretched. In some embodiments, a folding process is used to fold the elongated area (1501) to provide the area 1502, which has a total thickness similar to the rest of the can.

In one example wherein the total laminate thickness is from 200 to 250 μm, the laminate deactivating layer has a uniform or varying thicknesses of 70 μm to 200 μm and inner conductive layer has a uniform or varying thicknesses of 50 μm to 180 μm. Areas of the cathode case that experience bending and/or folding have a final deactivating layer of uniform or varying thickness of 14 μm to 40 μm. See for example 1502 in FIGS. 15A and 15C.

V. Exemplary Methods of Manufacture

Figure 13:
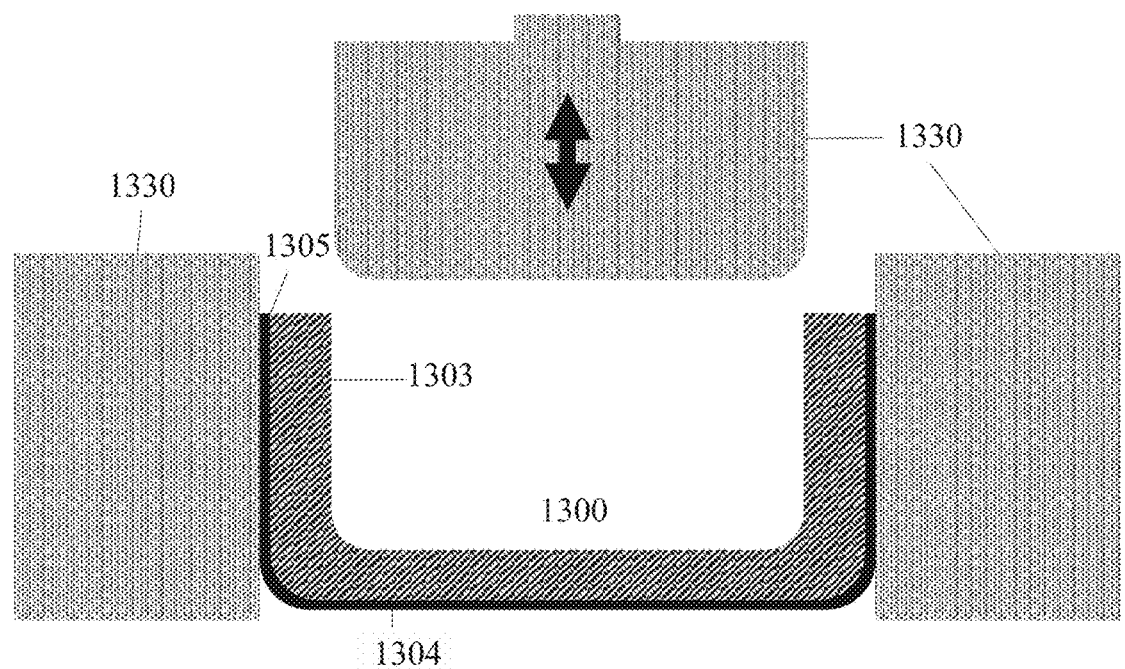
FIG. 13 shows a schematic depicting an exemplary method of manufacturing a cathode case.

The present disclosure further provides methods for manufacturing the aforementioned exemplary cathode cases, anode cases, and exemplary batteries. The specific examples herein use the cathode case as the example. These same manufacturing methods can also be applied to the anode case. Several methods are available, including the following non-limiting examples. In one embodiment depicted in FIG. 13, a method of manufacturing a cathode case comprises:

a) providing a laminate 1330 comprising a conductive layer 1303 and a deactivating layer 1304 with an interface between the conductive and deactivating layer 1305;

b) stamping the laminate 1330 to form a cathode case 1300 comprising a bottom, an annular side, and a rim; and c) forming a conductive pathway through the layers, wherein the conductive layer 1303 forms an inner surface of the cathode case, and the deactivating layer 1304 forms an outer surface of the cathode case.

In one method, an exemplary cathode case is stamped out of an exemplary laminate to form a cathode case comprising a bottom, an annular side, and a rim; and wherein the conductive layer forms an inner surface of the case, and the deactivating layer forms an outer surface of the case. In another method, an exemplary cathode case is stamped out of an exemplary laminate to form a cathode case comprising a bottom, an annular side, and a rim; and wherein the conductive layer forms an inner surface of the case, and the external coating forms an outer surface of the case. Other methods for forming a cathode case involve an exemplary laminate comprising a conductive layer and a deactivating layer where a deactivating layer is placed between the conductive and external coating and stamping the laminate into a cup shape having a bottom, an annular side wall, and a rim.

In another embodiment as depicted in FIG. 14, a method of manufacturing a cathode case 1400 comprises rolling the edge of the case to wrap the deactivating layer 1404 over the rim 1414 of the case towards from the center of the case 1401. In doing so, the outer surface of the cathode case after crimping will not comprise the inner conductive layer 1403. In some embodiments, the edge of the case is rolled by at least 270° or more as shown in the close-up cathode case rim schematic in FIG. 14B. In other embodiments, the edge of the case is rolled towards the center of the case to an angle X°, wherein X° is measured relative to 0° being parallel to the bottom of the case, 1401, wherein X° may range from 1° to 270°, 5° to 200°, 45° to 135°, 270° to 360°, or 360° to 720° (see e.g., FIGS. 14B and 14C).

Figure 14A:
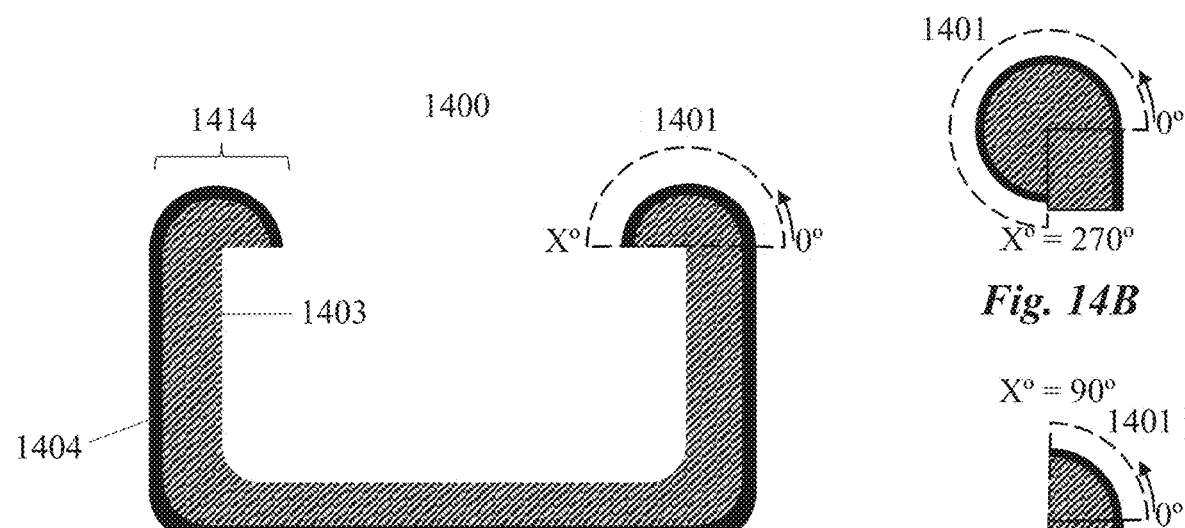
FIGS. 14A-D show schematics depicting more exemplary methods of manufacturing a cathode case.
Figure 14B:
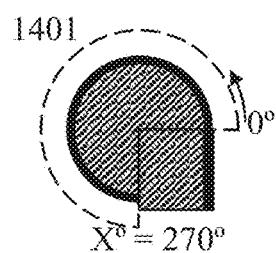
Figure 14C:
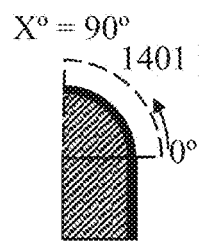
Figure 14D:
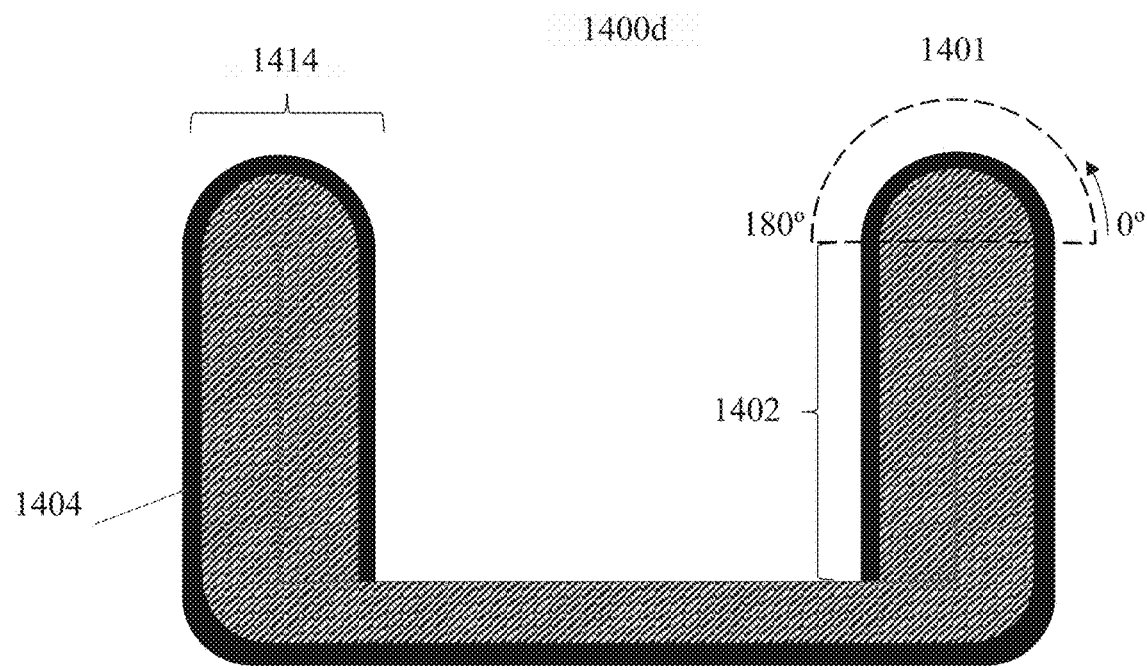

In other embodiments as depicted in FIG. 14D, the top portion of the case is folded 180° to wrap the deactivating layer 1404 over the rim 1414 of the case towards the center of the case 1401 and the fold over continues down the wall of the case 1402. In this embodiment, the deactivating layer covers the outer surface, the rim surface, and the surface of the inner wall of the cathode case. The inner conductive layer 1403 is the inner surface of the bottom of the cathode case.

Figure 15B:
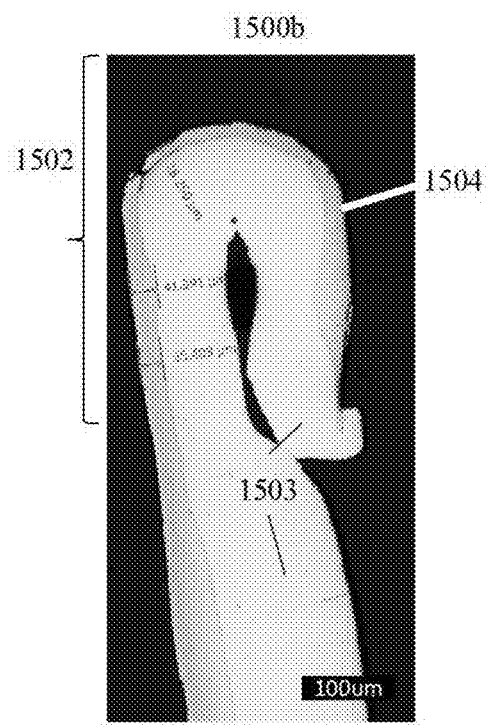
FIG. 15B shows an SEM image of a portion of a cathode case with cracking of the deactivating layer after hem folding.
Figure 15C:
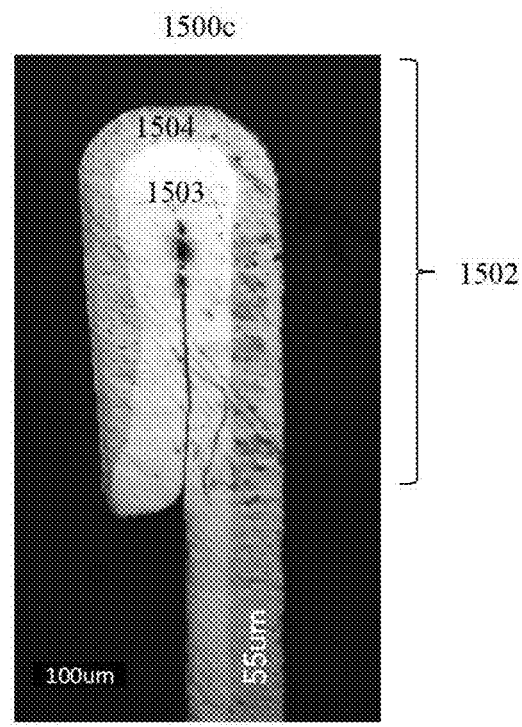
FIG. 15C shows an SEM image of a portion of a cathode case showing no cracking of a deactivating layer after hem folding.

Another method of manufacturing is shown in FIGS. 15A-C. First in FIG. 15A, an exemplary laminate 1500e comprising an inner conductive layer 1503 and a deactivating layer 1504 is stamped into the can shape. Next, the upper portion of the annular walls are drawn out to form an extension annular side 1501 and a lower annular side 1505 by either a stamping, ironing, or rolling process. Then the drawn out portion of the walls is folded over the rim towards the center of the case with progressive stamping steps. This results in a cathode case that has a varying thickness and with the deactivating layer extending over the surface of the rim 1502. Finishing steps such as additional rolling or polishing can be used to make the inner surface of the wall smoother and reduce the width and depth of the seam. In some embodiments, a drawn out portion of an extension annular side is folded over the rim to form a hem fold and is joined to itself by methods known in the art.

FIG. 15B shows an SEM image of an example of cracking at the bend in the hem fold in a deactivating layer that allows an inner conductive layer to be exposed to the ambient environment. FIG. 15C shows an SEM image of one example of a deactivating layer having a uniform or varying thickness that does not allow an inner conductive layer to be exposed, especially in the hem fold, to the ambient environment.

FIG. 16 depicts another method to manufacture an exemplary cathode case. The conductive layer 1603 is blanked out in a circular form, and the deactivating layer 1604 is also blanked with a larger diameter than the conductive layer. The layers are centered so the deactivating layer is on the bottom, to constitute the laminate 1600a. The laminate is stamped to the shape of a can with the conductive layer on the inside and with an annular height shorter than the deactivating layer annular height 1600b. Next, the deactivating layer is folded down to at least cover the top of the rim of the conductive layer 1600c. A similar process can be used to extend the deactivating layer 1604 down the inside annular wall side as shown in schematics 1601a-1601c to partially or fully cover the inner wall of the conductive layer can shape, thus producing a cathode case comprising of a two layer laminate.

In one exemplary cathode case, starting with an overall laminate 1500e thickness of 200 μm, comprising a deactivating layer 1504 thickness of 40 μm to 60 μm clad to an inner conductive layer 1503 thickness of 140 μm to 150 μm. On stamping, ironing and forming a folded portion of the wall, during the extension step there is a layer thickness reduction of 30% to 70% to around 12 μm to 45 μm on the annular side wall. On hem-folding the extended portion, the deactivating layer extending over the surface the rim 1502 under tensile extension reduces the deactivating layer 1504 thickness 15% to 50% further to 6 μm to 20 μm. At an initial deactivating layer 1504 thickness equal to or less than 60 μm, it may be possible to manufacture a cathode case with a deactivating layer thickness at the rim 1502 of 20 μm or less and assemble into a battery as disclosed herein. However, there are instances where this thickness is insufficient to prepare a fully functional battery as described herein under the stamping, ironing and folding steps, or in the process of handling and crimping the cathode case into the final functional battery. FIG. 15B shows a microscopy image of an exemplary cathode case 1500b, where the deactivating layer in the laminate has a 1504 thickness of 50 μm is stretched to less than 20 μm and displays cracking at the rim 1502, after the hem folding process thus compromising the continuity of the deactivating layer 1504 and exposing a portion of the inner conductive layer 1503. In order to produce a cathode case that maintains a robust continuous deactivating layer 1504 at the rim 1502 after hem-folding and further crimping steps, and not exposing the inner conductive layer 1503, in some embodiments, it is preferred to start with a laminate 1500e with a deactivating layer 1504 thickness of greater than 60 μm. FIG. 15C shows a microscopy image of an exemplary cathode case 1500c at the rim 1502 where the deactivating layer 1504 thickness at the rim 1502 varies between 20 μm to 60 μm and is continuous and intact without exposing the inner conductive layer 1503. The deactivating layer was 110 μm in the starting laminate.

In some embodiments, the thickness of the deactivating layer will be twice the thickness of the inner conductive layer. In some embodiments, the thickness of the deactivating layer will be three times the thickness of the inner conductive layer. In some embodiments, the thickness of the deactivating layer will be four times the thickness of the inner conductive layer. In some embodiments, the thickness of the deactivating layer will be chosen from 1.1 to 4 times the thickness of the inner conductive layer. In some embodiments, the deactivating later and the inner conductive layer are manufactured from a clad laminate of thicknesses sufficient to allow for the recited thicknesses after stamping or otherwise forming the laminate into a case or can. Tantalum, niobium and rhenium are relatively ductile, whereas tungsten alone is brittle and can lead to cracking and make it difficult to form. Titanium is known in the art to chatter or produce cracks in the cladded layer when directly clad to stainless steel. Adding rhenium to tungsten improves the ductility and aids in the forming of the alloy. Additionally, niobium or vanadium or copper can be used in between titanium and stainless steel to reduce the cracking issues associated with the cladding and stamping. Adding niobium to titanium improves the drawing and forming characteristics of the metal.

In one exemplary method, vapor deposition is used to deposit a deactivating metal onto the inner conductive layer wherein the anode case or the cathode case or both comprise an inner conductive layer, and a deactivating layer. FIG. 17 depicts a schematic of an exemplary method for assembling a cathode case 1700. In FIG. 17, the conductive layer 1703 is formed into a cup shape separately from the deactivating layer 1704 and placed on a fixture 1701 which holds the part and masks specific sections of the inner conductive layer during processing. The inner conductive layer is then coated with the deactivating layer 1704 which comprises a film on the inner walls 1704b, a film on the bottom of the case 1704a1, a film on the outer walls of the case 1704a2, and a film on the rim of the case 1704c where films 1704a1, 1704a2, 1704b, and 1704c are all in electrical contact to form the two layered cathode case 1700. The deactivating layer 1704 case be applied though a vapor deposition process such as chemical vapor deposition, physical vapor deposition, or electroplating. In some embodiments, the deactivating layer only covers the outer surface and the rim. In other embodiments, the deactivating layer covers all surfaces of the inner conductive layer.

In another exemplary method of manufacturing, a cathode case can be made by a process comprising a) forming a deactivating metal into a deactivating cup having a bottom, an annular side, a rim, and each of the bottom, annular side, and rim having an interior surface, and an exterior surface;

b) forming an inner conductive metal into an inner conductive cup having a bottom, an annular side, and a rim, and each of the bottom, annular side, and rim having an interior surface, and an exterior surface;

c) placing the inner conductive cup into the deactivating cup, wherein the exterior surfaces of the inner conductive cup are in electrical contact with the inner surfaces of the deactivating cup, thereby forming the cathode case.

In some embodiments, the annular side of the deactivating cup extends beyond the annular side of the inner conductive cup; and further comprising the step of folding the rim of the deactivating cup over the rim of the inner conductive cup.

In some embodiments, the rim of the deactivating cup partially covers the rim of the inner conductive cup. In some embodiments, the rim of the deactivating cup covers the rim of the inner conductive cup.

In some embodiments, the forming of the deactivating cup and/or the inner conductive cup comprises a process chosen from stamping, wire forming, metal casting or metal injection molding.

In yet another exemplary method, vapor deposition is used to deposit a conductive layer onto a deactivating metal case wherein the anode case or the cathode case or both comprise an inner conductive layer, and a deactivating layer. In this embodiment, the conductive layer would be deposited on the inner surfaces of the case. In further methods, an external coating is deposited onto the outer surface of the deactivating layer.

In some embodiments of the aforementioned manufacturing methods, the inner conductive layer can be formed by casting a conductive metal to form a cup. In some embodiments, the cast conductive metal cup can fit inside a cup-shaped deactivating layer. In one embodiment, aluminum or an aluminum alloy can be cast to form a cup having a uniform or variable thickness of 5 μm to 300 μm, or of 5 μm to 50 μm. Casting advantageously may prevent wrinkling that may happen during a stamping or forming process.

In other embodiments of the aforementioned manufacturing methods, an internal support layer comprising a bottom, an annular side, a rim, an inner surface, and an outer surface is provided. First a deactivating layer is deposited on the inner surface, the outer surface and the rim surface of the internal support. Next, a conductive material is deposited on the deactivating layer on the inner surface and optionally the rim thereby forming an inner conductive layer. Finally, optionally a second conductive material is deposited on the deactivating layer on the outer surface and optionally the rim thereby forming a second conductive layer.

In other embodiments, the battery is assembled with an anode case and cathode case comprising only the inner conductive layer. After assembling, the outer surface of the battery may be coated with a deactivating layer. For example, the battery may be coated by physical vapor deposition (PVD) or chemical vapor deposition (CVD) to form a layer having a uniform or varying thickness of from 1 nm to 100 μm, or from 1 nm to 10 μm. The deactivating layer may comprise of Nb, Ta, Ti, Re, W, an alloy thereof or any combination thereof. The gasket may be protected by a removable mask during the deposition process to prevent a short circuit between the anode case and cathode case.

In some embodiments, the cathode case (or cathode can) described herein is interchangeable with standard stainless steel cathode cases for manufacture and is made from a laminate, for example a clad, that is about 200 µm thick wherein the deactivating layer, (for example niobium that is 110 µm thick) is clad to the inner conductive layer (for example, stainless steel 430 that is 90 µm thick), and the deactivating layer clad to the inner conductive layer reduces or prevents cracking during elongation for a 90-degree bend, a 180-degree bend, or a zero-radius hem fold as the laminate is manufactured into a cathode case or cathode can as described herein.

VI. Exemplary Battery Functionality in a Device During and after Immersion

In further embodiments, oxide on the surface of a deactivating layer of a cathode case may retain conductivity while reducing or suppressing the electrolysis reaction at the terminals. The increase in dry internal resistance of the battery after immersion in a conductive aqueous medium for a short duration of time may increase as described herein. The measurement of internal resistance of the battery is known in the art and an example is described in Section VII. Testing Procedures.

This continued operation under these conditions may be useful in transformers, computers, and high performance batteries that need fluid cooling systems. Typical fluid cooling systems use a dielectric fluid, such as propylene glycol, so the fluid will not react with the terminals. If the battery terminal and the exposed contacts are made of a deactivating metal, the battery and device should still be operational if a conductive aqueous medium is in direct contact with it.

In additional embodiments, the disclosed batteries may also remain electrically functional during exposure to a conductive aqueous medium. In other embodiments, the disclosed batteries may return to functionality after being removed from a conductive aqueous medium and dried.

VII. Testing Procedures

Figure 18C:
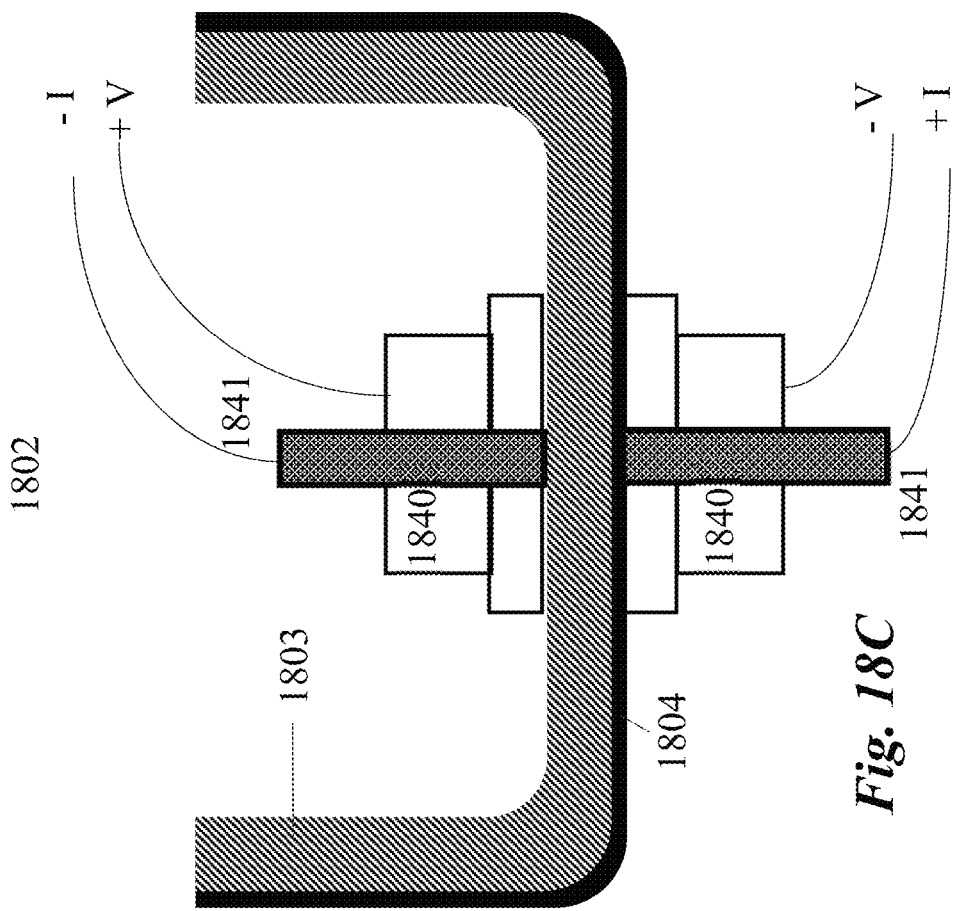
FIG. 18C shows a schematic depicting the measurement of resistance of a cathode case of the present disclosure.
Figure 18A:
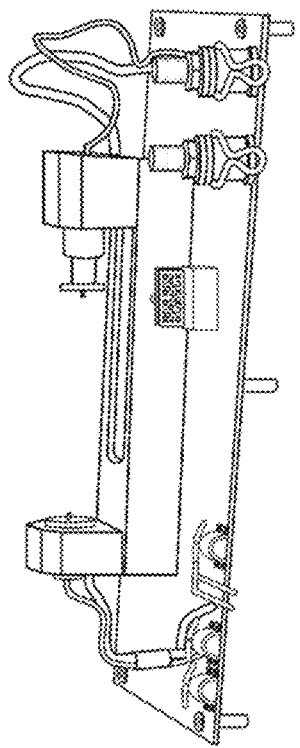
FIG. 18A and FIG. 18B show photographs of a four probe milliohm meter (Extech Model #380580), which is useful for measuring the resistance of cathode cases of the present disclosure.
Figure 18B:
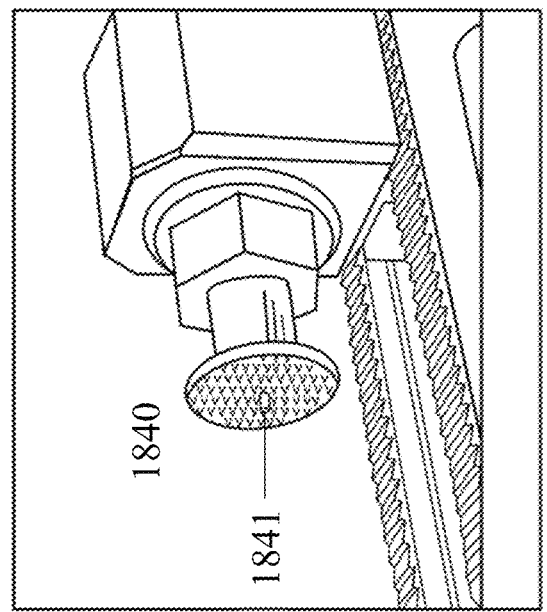

The resistance of a cathode case can be measured using a four probe milliohm meter (Extech Model #380580) for quality control. As depicted in FIGS. 18A, 18B, and 18C, an exemplary cathode case 1802 comprising the inner conductive layer 1803 and the deactivating layer 1804 is placed between two sets of radial probes 1840 and 1841. One example of a 4 probe radial fixture is a Gamry Universal Battery holder (FIG. 18A). The resistance is measured from the inside of the inner conductive layer 1803 to the deactivating layer 1804 as described in FIG. 18C.

The measurement of internal resistance of the battery is known in the art. One method for measuring internal resistance is measuring the AC impedance at 1 kHz using a Gamry potentiostat.

The operating conditions of a battery immersed in a conductive aqueous medium may be modeled by applying a potential difference to a cathode case of greater than 1.2 V, immersing the deactivating layer in a conductive aqueous medium, and preventing the inner conductive layer from making physical contact with the conductive aqueous medium. With an external power source applying the potential difference, it may be possible to measure the current and applied voltage under different simulated conditions.

In other embodiments, a conductive pathway is formed between the anode and the cathode when at least a portion of the anode case and a portion of the cathode case contact a conductive aqueous medium.

In other embodiments, a conductive pathway is formed between the anode and the cathode through a conductive aqueous medium when at least a portion of the anode case and a portion of the cathode case contact a conductive aqueous medium, which conductive pathway is reduced or suppressed on continued contact with the conductive aqueous medium.

In other embodiments, the anode deactivating layer and/or the cathode deactivating layer oxidizes when at least a portion of the anode case and a portion of the cathode case contact a conductive aqueous medium. In other embodiments, the deactivating metal in the deactivating layer oxidizes when at least a portion of the anode case and a portion of the cathode case contact a conductive aqueous medium. In some embodiments, the oxidation of the deactivating metal, or of the deactivating layer occurs within 2 hours, or within 1 hour or within 30 min or within 15 min of initial contact with an aqueous conductive medium.

In other embodiments, an electrolysis reaction occurs when at least a portion of the anode case and a portion of the cathode case contact a conductive aqueous medium, which electrolysis reaction is suppressed or eliminated in less than two hours after initial contact with the conductive aqueous medium.

In further embodiments, the contact with the conductive aqueous medium comprises placement of a battery on a hydrated tissue such that the hydrated tissue contacts both at least one part of the anode case and at least one part of the cathode case to form a conductive pathway. In other embodiments, the hydrated tissue is hydrated pig esophageal tissue. In embodiments, the contact with the conductive aqueous medium comprises immersion in 0.85% saline solution or in 25% Ringer's solution. 25% Ringer's solution contains 36.75 mM sodium chloride, 1.00 mM potassium chloride, and 0.75 mM calcium chloride in water.

In other embodiments, after immersion for 120 minutes, or 60 minutes, or for 20 minutes, or for 10 min in 0.85% saline solution or in 25% Ringer's solution, the pH of the conductive aqueous medium is less than 9, or less than 8 or less than 7. In other embodiments, the conductive aqueous medium has a starting pH of 5 to 7.5, and after immersion of the battery in the saline solution, the average pH of the conductive aqueous medium, sampled at 5-minute intervals, over a 60-minute time period, does not exceed an average pH of 10, 9.5, 9, 8.5, or 8.

In other embodiments, a test may be performed to simulate the suitability of the cathode case. For example a cathode case is crimped with an empty anode cup, with a 5 mm hole in the center and gasket. This sample battery case may then be immersed only covering the bottom, annular outer side and the rim of the cathode case bridging over the gasket to the anode case with a grommet sealing the hole in the anode. The anode case and cathode case are connected to a source monitor unit to provide the desired potential and to measure the resulting current in the circuit. Using this sample battery case allows the measurement of the current output of the cathode case in a simulated cell.

In some embodiments, a sample battery case comprises a cathode case and an anode case as described herein, wherein at least the cathode case comprises a deactivating layer and an inner conductive layer.

In some embodiments, a sample battery case is immersed in a conductive aqueous medium and a potential difference is applied to a cathode case of greater than 1.2 V. The sample battery case is immersed so that the deactivating layer contacts the conductive aqueous medium, but the inner conductive layer does not contact the conductive aqueous medium. Using an external power source to apply a potential difference, the current and applied voltage across the cathode case can be measured under different conditions.

In other embodiments, a conductive pathway is formed between the anode case and the cathode case of the sample battery case when at least a portion of the anode case and a portion of the cathode case contact a conductive aqueous medium.

In other embodiments, a conductive pathway is formed between the anode case and the cathode case of the sample battery case through a conductive aqueous medium when at least a portion of the anode case and a portion of the cathode case contact a conductive aqueous medium, which conductive pathway is reduced or suppressed on continued contact with the conductive aqueous medium.

In other embodiments, the deactivating metal in the deactivating layer oxidizes when at least a portion of the anode case and a portion of the cathode case contact a conductive aqueous medium. In other embodiments, the deactivating layer oxidizes when at least a portion of the anode case and a portion of the cathode case contact a conductive aqueous medium. In some embodiments, the oxidation of the deactivating metal, or of the deactivating layer occurs within 2 hours, or within 1 hour or within 30 min or within 15 min of initial contact with an aqueous conductive medium.

In other embodiments, an electrolysis reaction occurs when at least a portion of the anode case and a portion of the cathode case of the sample battery case contact a conductive aqueous medium, wherein the electrolysis reaction is suppressed or eliminated in less than two hours after initial contact with the conductive aqueous medium.

In further embodiments, the contact with the conductive aqueous medium comprises placement of the sample battery case on a hydrated tissue such that the hydrated tissue contacts both at least one part of the anode case and at least one part of the cathode case to form a conductive pathway. In other embodiments, the hydrated tissue is hydrated pig esophageal tissue. In embodiments, the contact with the conductive aqueous medium comprises immersion in 0.85% saline solution or in 25% Ringer's solution. 25% Ringer's solution contains 36.75 mM sodium chloride, 1.00 mM potassium chloride, and 0.75 mM calcium chloride in water.

In other embodiments, after immersion for 120 minutes, or 60 minutes, or for 20 minutes, or for 10 min in 0.85% saline solution or in 25% Ringer's solution, the pH of the conductive aqueous medium is less than 9, or less than 8 or less than 7. In other embodiments, the conductive aqueous medium has a starting pH of 5 to 7.5, and after immersion of the battery in the saline solution, the average pH of the conductive aqueous medium, sampled at 5-minute intervals, over a 60-minute time period, does not exceed an average pH of 10, 9.5, 9, 8.5, or 8.

EXAMPLES

Example 1

A. Comparative Tests of Control Metals and Example Battery Case Materials

The results of exposing control metals and example battery materials to conductive aqueous mediums and hydrated ham are reported below. These tests simulate the activity of the batteries under biologic conditions (e.g., after being swallowed and reacting with living tissue).

i) Immersion of Exemplary Cathode Case Deactivating Layer Materials in 25% Ringer's Solution and Simulated Gastric Fluid Solution while Under a Potential In this experiment, different candidate metal foils for the deactivating layer of the cathode case were subjected to a potential of 1.5V and 3.3V, the voltages of nominally 1.5V and 3V batteries respectively, as the positive electrode and immersed in 25% Ringer's solution and simulated gastric fluid. In this experimental set up, the current was measured over time which correlated to the rate of electrolysis of water. As current decreases, the reaction rate decreases to produce less hydroxide ions over a given period of time. Therefore, a lower current is suggestive of lower likelihood of damage to biological tissue.

Figure 19:
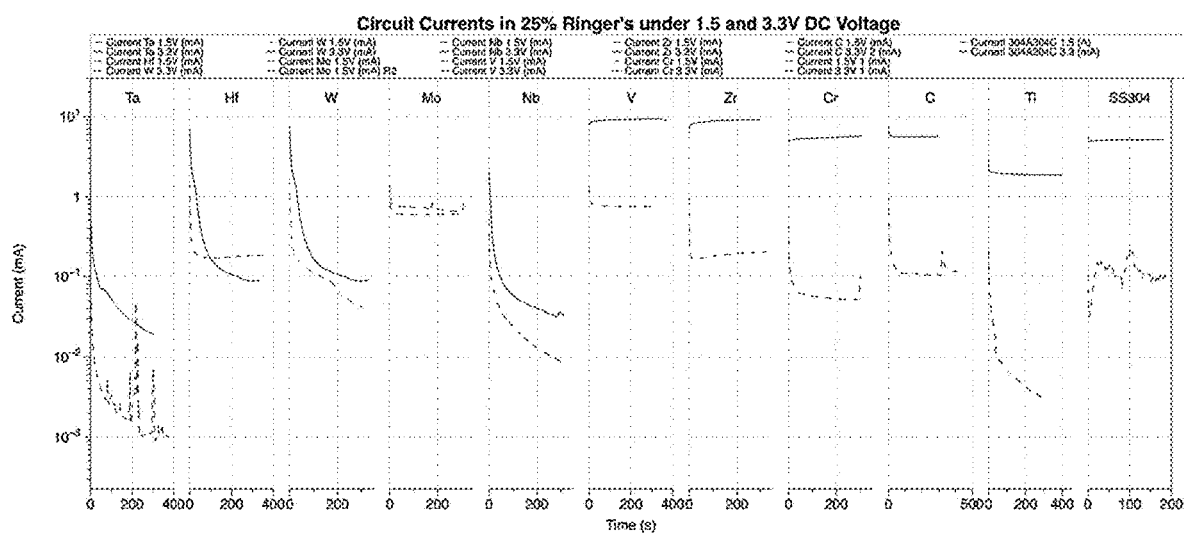
FIG. 19 shows a graph of circuit currents across different refractory metal types when immersed in 25% Ringer's solution when subjected to constant 1.5V and 3.3V DC voltages.

FIG. 19 is a plot of the current vs. time for each metal after immersion in 25% Ringer's solution. Ringer's solution contains 147 mM sodium chloride, 4 mM potassium chloride, and 3 mM calcium chloride, initial pH 5.5 to 6, and simulates the type of environment that would be present in the mouth or esophagus. The metals tested on the positive electrode were tantalum (Ta), hafnium (Hf), tungsten (W), molybdenum (Mo) niobium (Nb), vanadium (V), zirconium (Zr), chromium (Cr), graphite (C), titanium (Ti), and stainless steel 304 (SS304). Mo was only tested at 1.5V while all other samples were tested at 1.5V and 3.3V. The metals were cut into rectangular shims of about 5 mm wide and 10 mm long, with exception of chromium which was tested as a shard of similar size off an ingot. In all cases, except tantalum and chromium, the thickness of the metal was about 0.25 mm. The tantalum shim was about 0.127 mm thick. The metal for the negative electrode was a 0.25 mm thick by 5 mm wide by 10 mm long stainless steel 304 (SS304) shim, and the same SS304 was used in all of the runs for the negative electrode. A DC voltage was applied across two metal shims with the negative electrode simulating the battery's anode case and the positive electrode simulating the battery's cathode case. The two electrodes were spaced about 10 mm apart when immersed in 25% Ringer's solution. The experiment was run for about 5 to 10 minutes duration. Additionally, pH was measured at the beginning and at the end of the run close to the specified electrode as shown in Table 1.

TABLE 1 pH of solution near the positive electrode of tested metals at different voltages and durations.

| Voltage | Time | pH of Solution near positive electrode of tested metals | | | | | | | | | | |
| --- | --- | --- | --- | --- | --- | --- | --- | --- | --- | --- | --- | --- |
| (V) | (min) | Ta | Hf | W | Mo | Nb | V | Zr | Cr | C | Ti | SS304 |
| 1.5 | 0 | 5.5 | 5.5 | 5.5 | 5.5 | 5.5 | 5.5 | 6.0 | 6.0 | 5.5 | 5.5 | 5.5 |
| 1.5 | 5 | 5.5 | 5.5 | 5.5 | 6.0 | 5.5 | 5.5 | 6.0 | 6.0 | 5.5 | 5.5 | 5.5 |

TABLE 1-continued pH of solution near the positive electrode of tested metals at different voltages and durations.

| Voltage | Time | pH of Solution near positive electrode of tested metals | | | | | | | | | | |
|---|---|---|---|---|---|---|---|---|---|---|---|---|
| (V) | (min) | Ta | Hf | W | Mo | Nb | V | Zr | Cr | C | Ti | SS304 |
| 3.3 | 0 | 6.0 | 5.5 | 5.5 | — | 5.5 | 5.5 | 5.5 | 5.5 | 5.5 | 5.5 | 5.5 |
| 3.3 | 5 | 6.0 | 8.5 | 5.5 | — | 5.5 | 9.5 | 8.0 | 10.5 | 10.0 | 8.0 | 9.0 |

As shown in FIG. 19, changing the metal on the positive electrode showed differences in the amount of current flow through the system. The tantalum (Ta) shim had the lowest current at both the 1.5V (dashed black line) and 3.3V potentials (solid black line) of all of the metals tested. Hafnium (Hf), tungsten (W), titanium (Ti) and niobium (Nb) also showed significantly reduced currents at 1.5V and 3.3V compared to stainless steel 304 (SS304). Vanadium (V), zirconium (Zr), and chromium (Cr) had maintained currents around 5-10 mA at a 3.3V potential which is not a significant reduction of current compared to the control stainless steel shims. In fact, the Zr and V shims maintained higher currents at 3.3V than SS304. Graphite (C) maintained a current at 1.5V and 3.3V similar to Cr and SS304 with a current of about 5 mA. Molybdenum (Mo) maintained a current at 1.5V below 1 mA (two runs at 1.5V shown). At 1.5V, Mo performs similar to V and SS430 with some of the highest currents at an applied voltage of 1.5V in the experiment.

In cases where current was greater than 1 mA, the pH of the solution near the negative terminal increased from 6 to a minimum of 8 or greater suggesting the production of higher concentrations of hydroxyl ions in agreement with current output. The severity of hydrogen gas evolution, observed as bubbling, at the negative terminal was also markedly greater for the samples that displayed higher currents.

Figure 20:
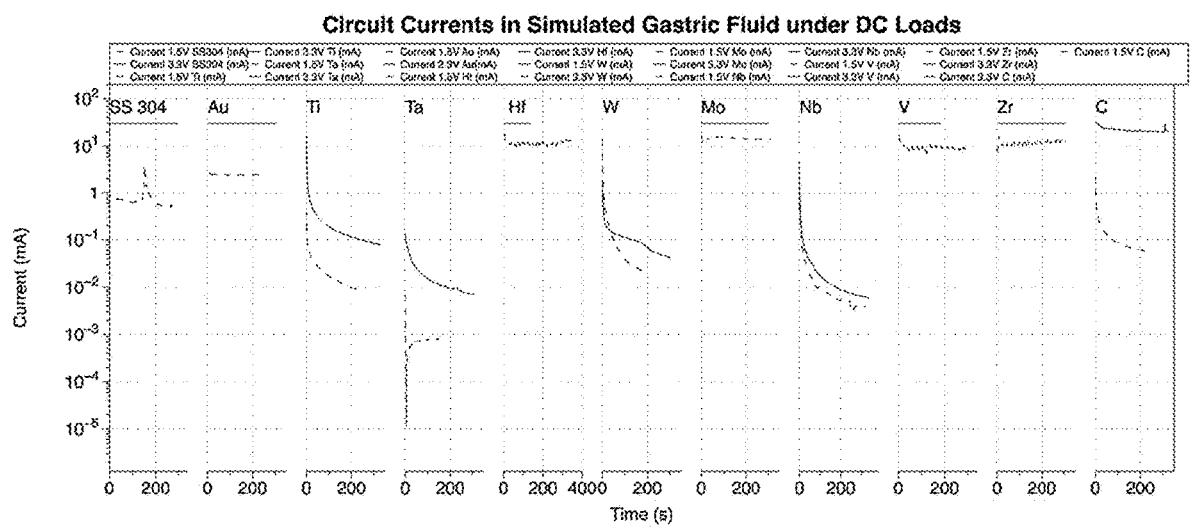
FIG. 20 shows a graph of circuit currents across different refractory metal types when immersed in simulated gastric fluid solution when subjected to constant 1.5V and 3.3V DC voltages.

The experiment described above was repeated with simulated gastric fluid (SGF) and a modified series of metals, which includes gold (Au), Ti, Ta, Hf, W, Mo, Nb, V, Zr, and C, for the positive electrode. The negative electrode was also SS304 for all runs. Each electrode metal was run as the positive electrode at 1.5V and again at 3.3V for up to 5 minutes. The current vs. time data was plotted and is shown in FIG. 20. The SGF solution comprised of 2.0 g/L sodium chloride and ~2.917 g/L HCl with a pH of about 1.1-1.3. This experiment was designed to simulate the response of the battery in the stomach. The pH, measured at the beginning and end of run, remained under 3 for all of the runs.

Under these acidic conditions, the currents of SS304, Hf, Mo, and V increased compared to the currents when immersed in 25% Ringer's solution (compare FIG. 20 and FIG. 19). At 3.3V under these acidic conditions, the current reached the maximum allowed current, 30 mA of the power supply for the SS304, Hf, Mo, Au, and V runs suggesting a very rapid reaction rate for electrolysis. Even under the lower potential of 1.5V, the shims of Au, Hf, Mo, V, and Zr had a maintained current above 1 mA under these acidic conditions.

The runs with Ti, Ta, W, and Nb maintained lower currents which dropped below 0.1 mA within 400 seconds at 3.3V. Ta displayed the most significant reduction in current at 1.5V and 3.3V with the Nb performing similarly at 3.3V.

Overall, this experiment demonstrates that Ta and Nb metals are well suited to reduce or suppress the oxidation half reaction on the positive terminal of a battery as the deactivating layer. Ti and W may also be suitable to reduce the oxidation half reaction.

Figure 30:
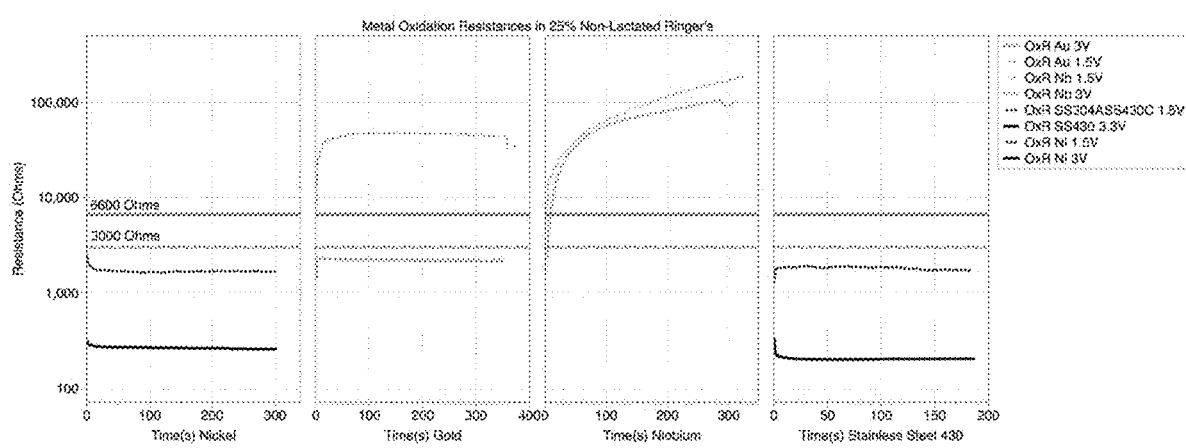
FIG. 30 shows the change in metal oxidation resistances in 25% non-lactated Ringer's solution for nickel, gold, niobium and stainless steel.

The graphs in FIG. 30 show the change in current output in a circuit under 1.5V, 3 and 3.3V applied potentials, with nickel (Ni), gold (Au), niobium (Nb) and stainless steel 430 (SS430) as the cathode electrodes and stainless 430 as the anode, immersed in 25% Ringer's solution. The lines designating 3000 ohm and 6600 ohm represent the resistances at 3.3V and 1.5V, respectively. The current generated at these conditions (0.5 mA) is considered tolerable for GI tissues because it is a current at which hydroxyl production, and hence damage to tissue, was determined to be minimal.

The corresponding output electrolysis current was measured while measuring the potential difference. Each metal started from a certain oxidation resistance, determined as a ratio of the potential difference to the current measured (V=IR), at 1.5V, 3 or 3.3V. Over time the resistance dropped for both nickel and stainless steel 430 resulting from their continuous oxidation. These two metals produced and on-going, or unabated electrolysis reaction which allows current to continue to flow, and causes an increase in hydroxyl ion concentration (pH) at the anode. For gold, some oxidation resistance was seen at 1.5V; however, no oxidation resistance was seen at a 3V applied potential. This metal will also produce an on-going, or unabated electrolysis reaction which allows current to continue to flow which ultimately will lead to an unsafe increase in of pH. Niobium, in contrast, at both 1.5V and 3V showed an increase in oxidation resistance. The continued increase in resistance over time is consistent with an oxide layer growing at the surface. The oxide layer ultimately creates an oxidative resistance sufficient to slow the rate of hydroxyl ion formation at the anode. This example demonstrates that batteries comprising niobium in, or on, the surfaces that contact GI tissues (or a conductive aqueous environment), are less likely to create conditions that would be dangerous to those GI tissues than batteries with gold, nickel or stainless steel in, or on, those surfaces. Similar on-going and destructive electrolysis reactions will occur when portions of the battery surface have cracks or worn areas that expose underlying stainless steel (or other conductive metals that do not form electrolysis suppressing oxide layers) allowing contact GI tissues (or a conductive aqueous environment).

ii) Scratched Tantalum Cathode Case in 25% Ringer's Solution

Figure 21:
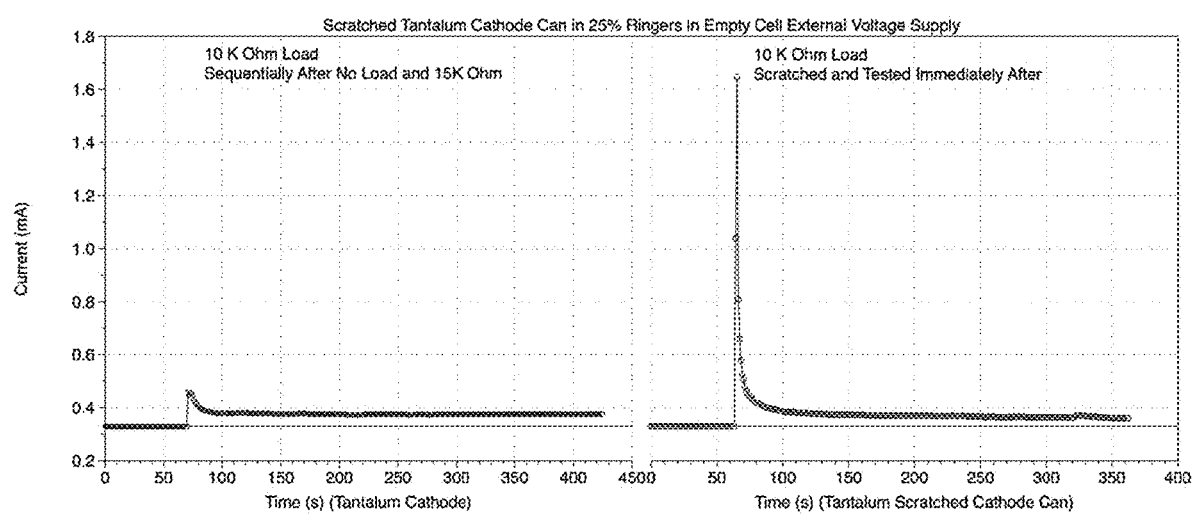
FIG. 21 shows a graph comparing DC circuit currents with the same cathode can before (left) and after scratching (right) made from tantalum cathode cases using an external voltage supply at 3.3V at 10 kOhm parallel resistance load when partially immersed in 25% Ringer's solution.

An empty battery casing was crimped from a tantalum cathode case with a stainless steel 430 (SS430) anode case. The casing was then connected in a circuit using one tantalum strip pressed against the top of the anode case and another tantalum strip pressed against the bottom of the cathode case. Then a 3.3V DC voltage was applied across them forming a capacitor-like circuit. The results are shown in FIG. 21.

For each measurement, the empty battery casing was mounted vertically in a clip holding the battery sideways with the bottom of the cathode facing left and the top of the anode facing right. The empty battery casing was lowered into 25% Ringer's solution to be about 25% immersed, covering roughly the lower 3-5 mm portion of the empty battery case.

Figure 22:
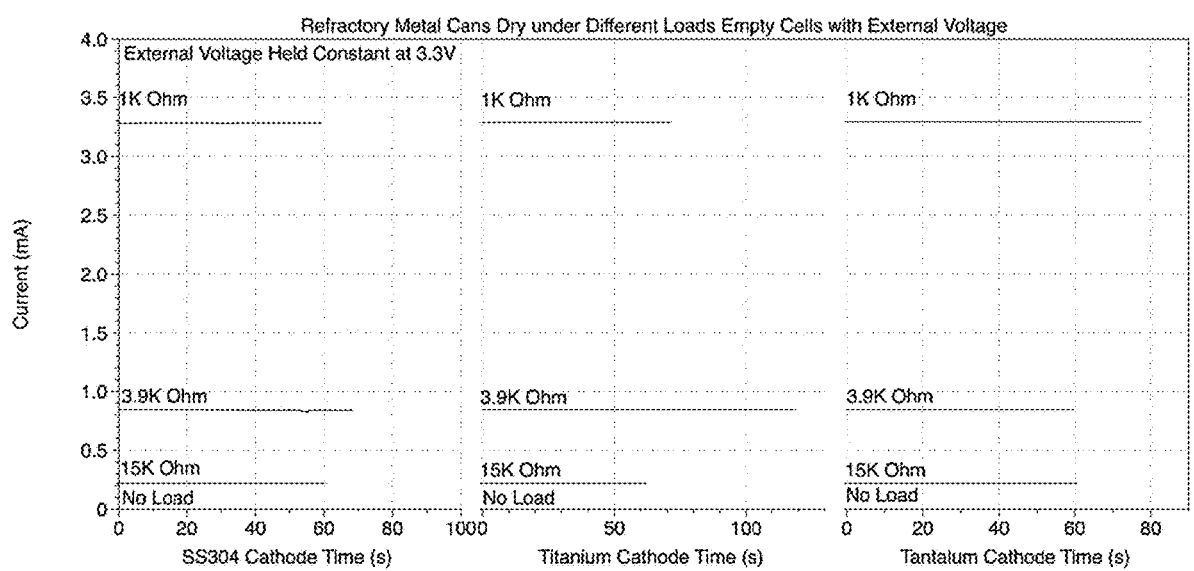
FIG. 22 shows a graph comparing DC circuit currents with batteries made from stainless steel 304 and refractory metal cathode cans such using an external voltage supply at 3.3V at different resistance loads.
Figure 23:
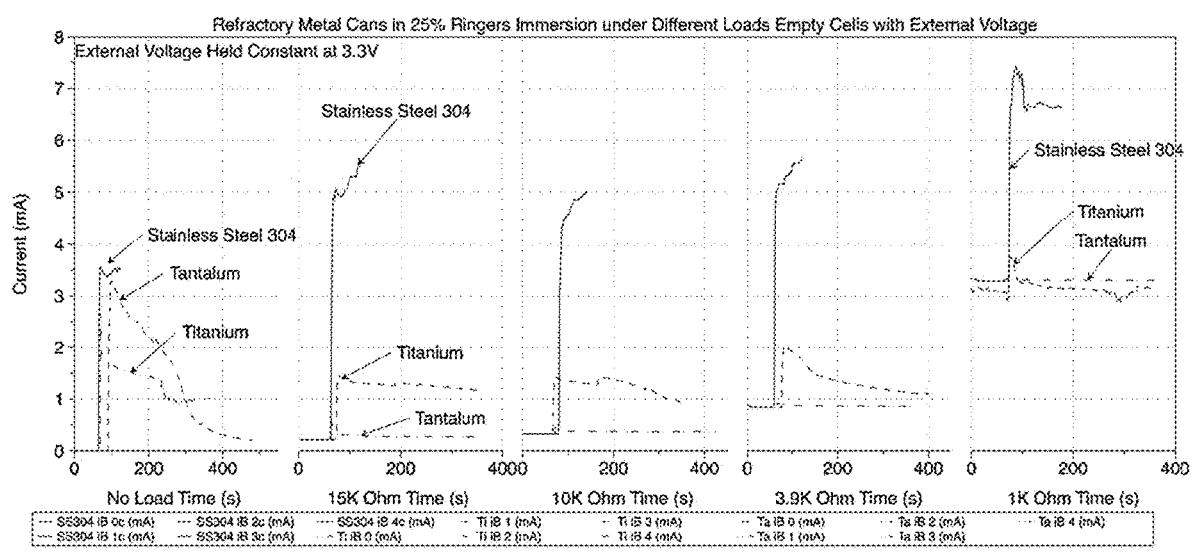
FIG. 23 shows a graph comparing DC circuit currents with batteries made from stainless steel 304 and refractory metal cans such using an external voltage supply at 3.3V at different resistance loads when partially immersed in 25% Ringer's solution.

The resulting circuit current was measured with a 10 kOhm resistor and immersed in 25% Ringer's solution as previously described. The sample was pre-oxidized at 3.3V in Ringer's and the spike in current was no more than 0.5 mA and the fell back to baseline of 0.4 mA current very quickly, under 30 seconds. The same empty battery casing was dried then scratched with steel wool and the experiment was repeated. This resulted in a noticeably larger spike in the current of about 1.2 mA which then fell back to the baseline parallel load current within 30 seconds. This result suggests that when, or if, a fresh layer of tantalum is exposed the amount of hydroxyl ion production is significantly reduced within about 30 seconds, and hence the change of pH of a solution is minimized.

iii) Immersion of Empty Crimped Exemplary Batteries Under a Potential and Working Loads FIGS. 22 and 23 shows the performance of control and treatment batteries made and exposed to different parallel load resistance of 1 kOhm, 3.9 kOhm, 10 kOhm, 15 kOhm with and without making a conductive path between cathode case and anode case by partially immersing in solution.

FIG. 22 shows results of the following experiment. Three empty battery cases were crimped from stainless steel 304 (SS304), titanium, and tantalum cathode cases with stainless steel 430 (SS430) anode cases. They were then connected to a circuit using tantalum leads to connect the anode case and the cathode case to an external power supply providing 3.3V DC. The resulting circuit current was measured. Before crimping, the metal cases were measured for the overall resistance from the inside bottom surface of the case to the outside bottom surface with a 4 point probe milli-Ohm (mOhm) meter. The resistances were under 1 mOhm. In the control run, the current was measured for the circuit without a parallel resistor and the baseline current was extremely low ranging $10^{-3}$ to $10^{-4}$ mA. As a parallel resistor was added and the resistance was sequentially decreased from 15 kOhm, to 10 kOhm, to 3.9 kOhm, to 1 kOhm, the currents changed correspondingly. The values at each resistance were consistent across all three circuits.

The experiment continued with same circuit set up with the addition of partial immersion in 25% Ringer's solution. For each measurement, the empty battery casing was partially immersed into 25% Ringer's solution, covering roughly 3 mm portion of the anode and cathode case, essentially forming a resistive load through the Ringer's solution. The resulting circuit current was measured testing without a parallel resistor and then decreasing the parallel resistance sequentially from 15 kOhm, to 10 kOhm, to 3.9 kOhm, and to 1 kOhm as before. Before immersion, the current was measured at the baseline for all samples. After partial immersion of the stainless steel cathode case condition, the measured current jumped to nearly 3.5 mA and remained at this approximate level for the duration of the test. For the titanium cathode case condition, the current spiked to 3.3 mA and dropped to approximately 1 mA within 6 minutes. Whereas, for the tantalum cathode case the current fell to under 0.5 mA in about the same time. The external voltage was turned off between resistance changes. With each added load starting at 15 kOhm this pattern repeats itself, essentially the current for the stainless steel 304 case shifted by the parallel loading current then jumped on partial immersion and stayed high. For titanium there was a spike followed by a drop to the baseline parallel load current after about 2 to 4 minutes. Whereas, for tantalum the spike dropped more quickly after about 10 to 30 seconds. It is possible this may be due to the formation of an oxide. There was visible color change on the titanium and tantalum cases that was exposed to Ringer's after experiment. However, the resistance of the exposed Ti and Ta metal did not appear to change significantly when tested with a 2 probe resistance measurement before and after the experiment.

iv) Tantalum Shims Exposure to Hydrated Ham Using an External Power Supply

Figure 24A:
FIG. 24A and FIG. 24B show photographs of ham after 120 minutes and ham after 30 minutes for tantalum shims exposed to hydrated ham powered by an external power supply.
Figure 24B:
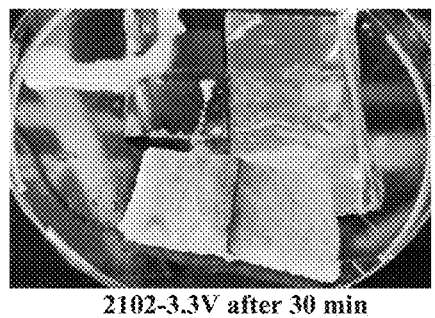

In this experiment, a tantalum metal shim was used to model for the deactivating layer of the anode case or the cathode case. The counter electrode was SS430. The electrodes were placed parallel to each other with a gap of about 1 mm as shown in FIGS. 24A and 24B. While the Ta foil was the positive electrode, it was subjected to 3.3V (run 2401—3.3V), and 10V (run 2407—10V) using an external power supply and the current was measured. While the Ta foil was the negative electrode, it was subjected to 3.3V (run 2402—3.3V). The ham samples were initially cut to about 2 cm×4 cm rectangles and hydrated with 20 mL of 25% Ringer's solution in a shallow petri dish for 30 minutes before testing. The slice of ham was placed across the two electrodes. The pH of the surface of the ham under the positive and negative electrodes was measured after the duration of the experiment ranging from 30-120 minutes. The results are shown in Table 2.

TABLE 2

| Exp | Applied Voltage (V) | Positive electrode (simulated cathode case) Shim | Negative electrode (simulated Anode case) Shim | Duration | Visible Ham Damage | Negative electrode (simulated Anode case) pH | Positive electrode (simulated Cathode case) pH |
|---|---|---|---|---|---|---|---|
| 2401 | 3.3 | Ta | SS430 | 120 min | None | 5.5 | 5.5 |
| 2402 | 3.3 | SS430 | Ta | 30 min | Severe | 11 | 2.5 |
| 2407 | 10 | Ta | SS430 | 60 min | None | 5 | 6 |

Figure 24C:
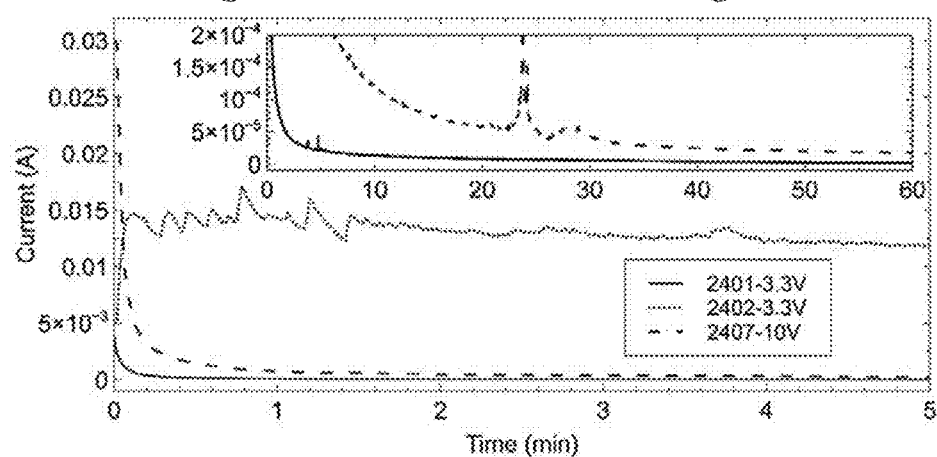
FIG. 24C shows a graph of current vs. time for tantalum shims exposed to hydrated ham using an external power supply.

When the Ta shim was the positive electrode, simulating the deactivating layer of the cathode case, it did not show any signs of damage of the ham at 3.3V for 120 minutes (run 2401—3.3V) (FIG. 24A), or at 10V for 60 minutes (run 2407—10V). The pH data shown in Table 2 and the low currents shown in FIG. 24C suggest that the Ta shim as the positive electrode reduces or suppresses the reaction rate of the electrolysis of water.

Figure 25:
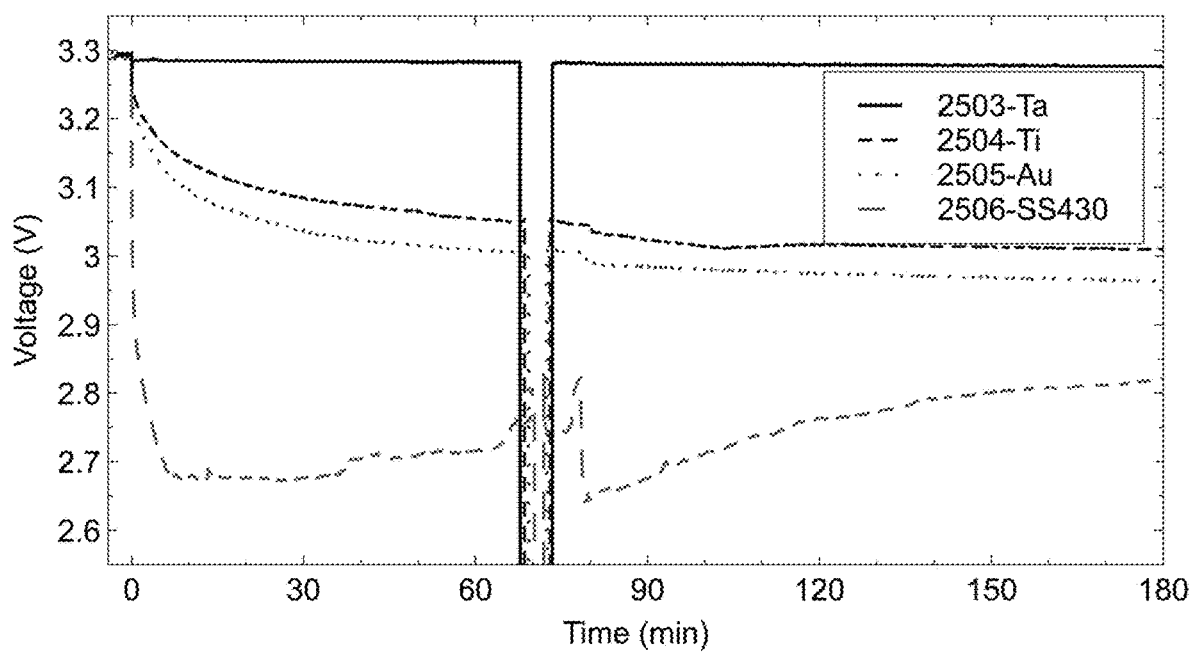
FIG. 25 shows a graph of voltage vs. time for tantalum, titanium, gold, and SS430 shims exposed to hydrated ham using CR2032 batteries as a power supply.

When the Ta shim was the negative electrode, simulating the deactivating layer of the anode case, it showed signs of damage of the ham at 3.3V for 30 minutes (run 2402—3.3V) (FIG. 24B). The pH data shown in Table 1 and the higher currents shown in FIG. 24C support that the Ta shim as the negative electrode only does not reduce the reaction rate of the electrolysis of water as much as the Ta shim as the positive electrode.

v) Tantalum, Titanium, Gold, and SS430 Shims Exposure to Ham Using an CR2032 Commercial Batteries as the Power Supply In this experiment, a tantalum, titanium, gold, and SS430 metal shims were used as the positive electrode to model for the deactivating layer of the cathode case. The negative electrode was SS430. Each positive electrode was placed parallel to a SS430 shim with a gap of about 1 mm to form four pairs of shims. The shim pairs were put under a potential using a commercial 3.3V CR2032 Li metal coin cell battery and the voltage was monitored using a Graphtec 10 channel data logger (FIG. 25). The ham samples were initially cut to about 2 cm×4 cm rectangles and hydrated with 20 mL of 25% Ringer's solution in a shallow petri dish for at least 30 min before testing. The starting pH of the ham was about 5. The slice of ham was placed across each electrode pair. The pH of the surface of the ham under the positive and negative electrodes was measured during and after the duration of the experiment at 70 and 180 minutes respectively. The drop in voltage at 70 min for each sample was due to removing the ham to measure the pH and damage at this time point. The results are shown in Table 3.

TABLE 3

|  |  | 70 minutes | | | 180 minutes | | |
| --- | --- | --- | --- | --- | --- | --- | --- |
| Exp | Positive Electrode Shim | Visible Ham Damage | Positive electrode pH | Negative electrode pH | Visible Ham Damage | Cathode pH | Anode pH |
| 2503 | Ta | None | 5 | 5 | None | 5 | 5 |
| 2504 | Ti | None | 2.5 | 8 | None | 2.5 | 8 |
| 2505 | Au | Yellowing of Cathode side | 2 | 8 | Yellowing of Cathode side | 2.5 | 7.5 |
| 2506 | SS430 | Severe | 2 | 12 | Severe *dried out | 3* | 11* |

The Ta (run 2503) and the Ti (run 2504) samples did not show any signs of visual damage on the ham. However, the pH of the Ti sample decreased on the positive electrode side of the ham and increased on the negative electrode side of the ham similar to the gold sample (run 2505). The pH of the Ta sample did not change from the initial reading of 5 even after 180 minutes.

The Au, Ta, and Ti treatments all reduce the current compared to the SS430 control. These results suggest that during extended exposure to moist tissue, a Ta deactivating layer on the cathode case will reduce the current more than a coating of Au or Ti and therefore cause less damage.

vi) Tantalum and Titanium Cathode Case Exposure to Hydrated Ham Using an CR1616

Test batteries were made using CR2032 cathode cases made with stainless steel 304, titanium and tantalum and CR2032 anode cases made of stainless steel 430. The test batteries were powered by inserting a commercial CR1616 coin-cell battery into the casing and using nickel foil to fill any void and to provide current path from anode to anode. The cases were crimped using an MTI hand crimper with a CR2032 crimp die.

A few thick slices of frozen Boar's head ham were thawed and cut in six 2 inches by 2.5 inches pieces. Following this, 10 mL of 25% Ringer's solution was added on to hydrate the ham for 1 hour before beginning the experiment.

The test batteries were then placed anode side down onto a piece of ham and covered with an additional slice of ham to cover the cathode side. A 200 g weight was added on top of the layers to ensure good contact of the test battery with the ham.

Figure 26:
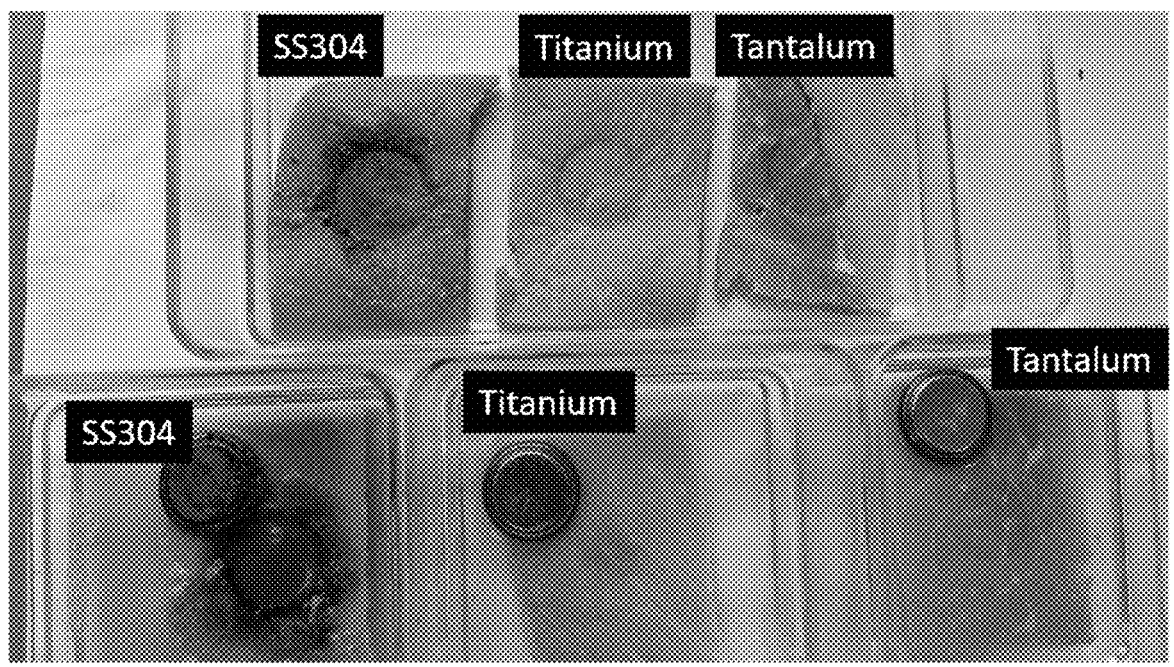
FIG. 26 shows a photographic comparison of deli ham in contact with batteries made with stainless steel, titanium and tantalum cases after 24 hours of exposure. Top row shows ham which was in contact with the cathode side and the bottom row shows the anode side of the coin-cell battery and the part of ham that was in contact with the anode side of the battery.

After being in contact for over 24 hours (FIG. 26), the control battery with stainless steel 304 as the cathode case showed significant damage to ham both on anode and cathode sides. Whereas, neither the batteries with titanium or tantalum cathode cases caused significant damage. The test battery with the titanium cathode case showed minimal signs of damage on the ham in direct contact with the cathode case, but did show apparent discoloration of the tissue in contact direct contact with anode case, an indicator of damage.

Figure 27:
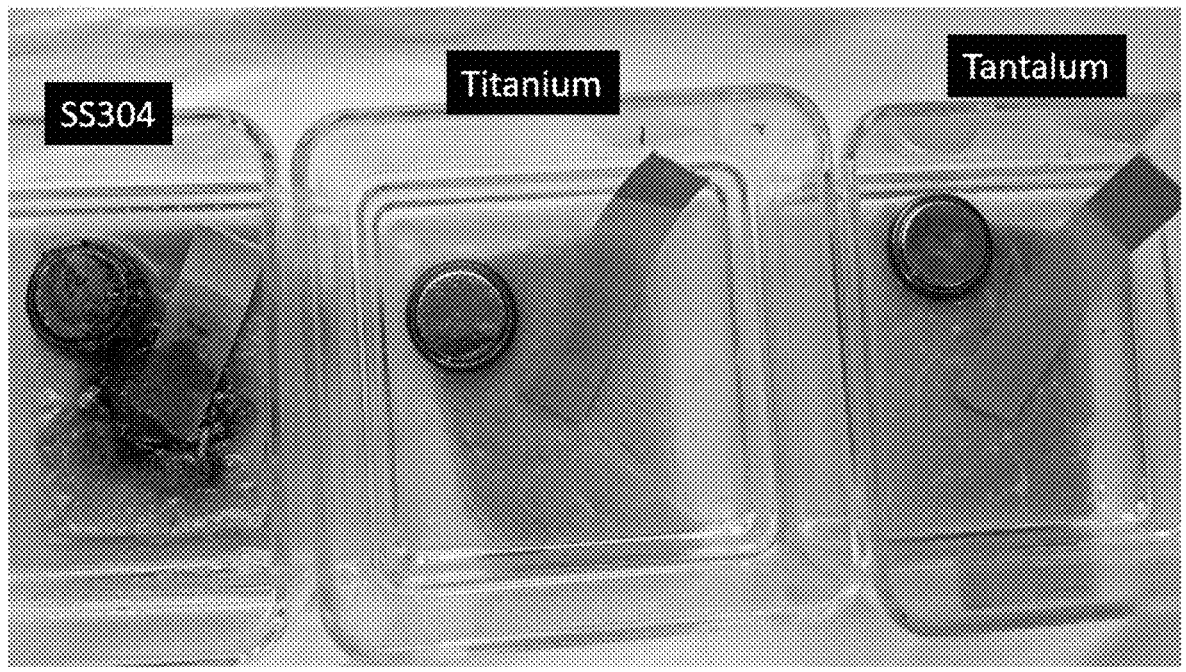
FIG. 27 shows a photographic comparison of deli ham in contact batteries made with stainless steel, titanium and tantalum cathode cases after 24 hours of exposure.

When the setup was dismantled and as soon as the test batteries were flipped from the anode facing side, pH paper (1 to 13) range was placed on the region of ham that was directly in contact with the battery anode case (FIG. 27). In the stainless steel 304 cathode case test battery, the pH of the ham reached 8.5 in 30 minutes and was 12.5 after 24 hours. The titanium cathode case test battery showed a slight increase in pH to 6.5 from 5.5 within 30 minutes and remained at 6.5 pH after 24 hours. Whereas for the tantalum cathode case test battery did not show a change in pH at 30 minute and 24 hour time points.

vii) Exposure to High Temperature and Relative Humidity Over Multiple Days

Exposure of lithium control, lab-made control, and exemplary batteries to high temperature and high humidity conditions was carried out to determine how the batteries perform after accelerated aging conditions.

Figure 28:
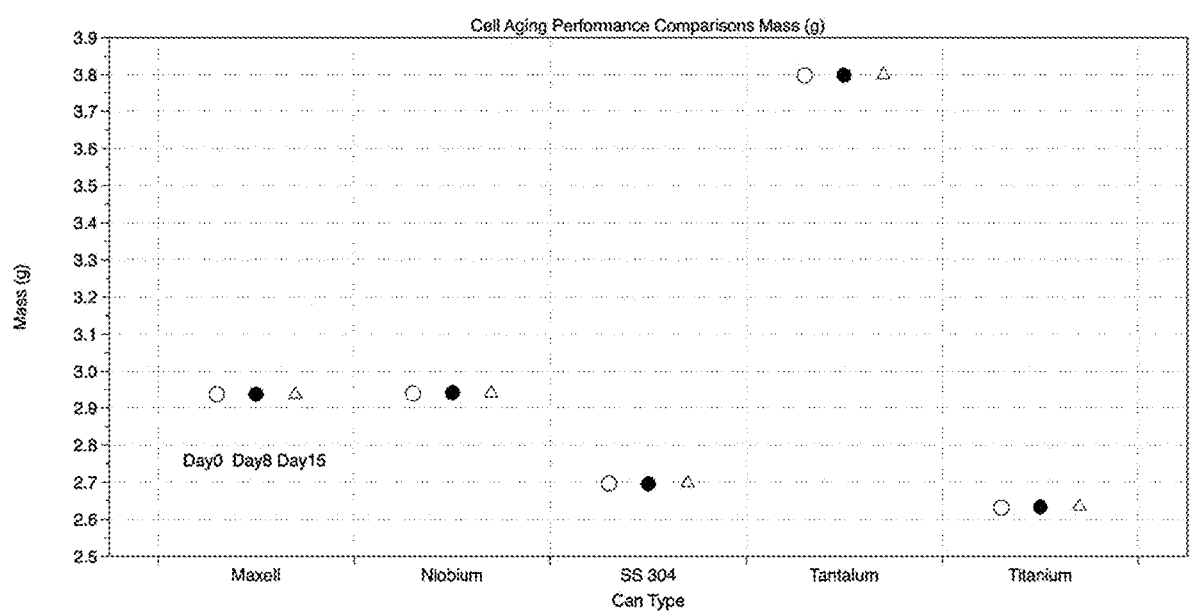
FIG. 28 shows a graph of batteries aging performance reflected as mass change over a 21 day period exposed to 60° C. and 90% RH measured at 0, 8, 15 and 21 days.

FIG. 28 shows results of the following experiment. Test batteries were made using CR2032 cathode cases made with stainless steel 304, titanium and tantalum and CR2032 anode cases made of stainless steel 430. The test batteries were powered by inserting a commercial CR1616 coin-cell battery into the casing and using nickel foil to fill any void and to provide current path from anode to anode. The cases were crimped using an MTI hand crimper with a CR2032 crimp die. A commercially purchased Maxell CR2032 battery was used as a commercial control. Since the lab made test batteries do not contain any electrolyte (apart that which is contained in the commercial CR1616), there was no expectation of weight loss, however, the test batteries also did not gain any additional weight from moisture ingress over this time period. There was no significant change in the mass of the test batteries and may be indicative of static conditions in high temp, high humidity storage.

Figure 29:
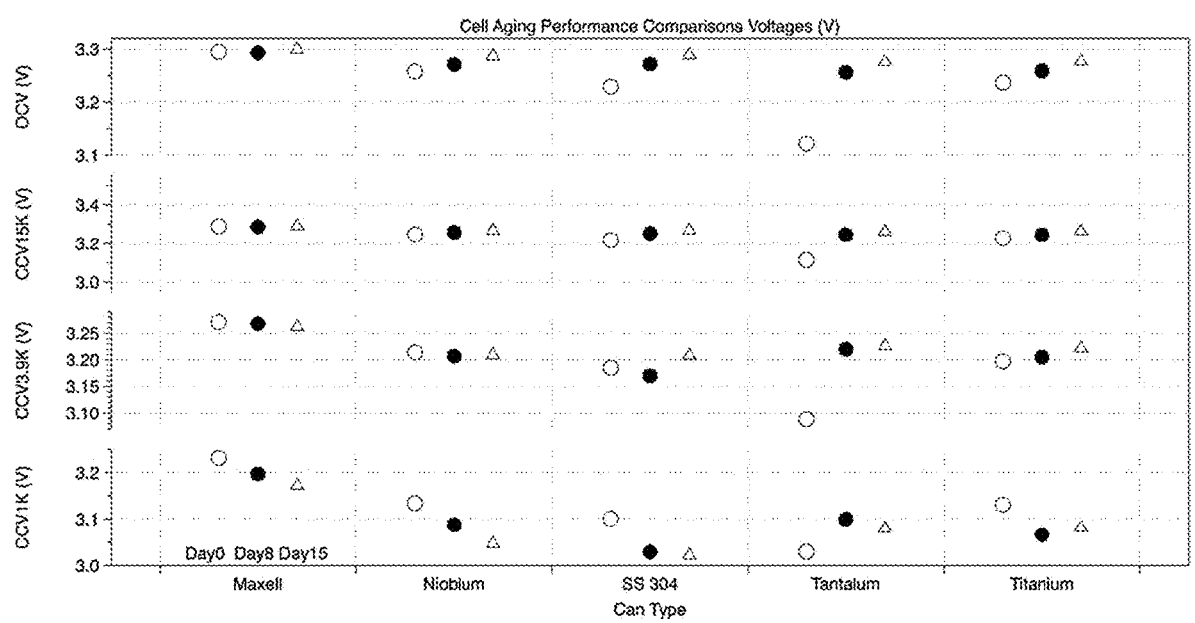
FIG. 29 shows a graph of batteries aging performance reflected as voltage change over a 21 day period exposed to 60° C. and 90% RH measured at 0, 8, 15 and 21 days.

FIG. 29 shows results of the following experiment. Test batteries were made using CR2032 cathode cases made with stainless steel 304, titanium and tantalum and CR2032 anode cases made of stainless steel 430. The test batteries were powered by inserting a commercial CR1616 coin-cell battery into the casing and using nickel foil to fill any void and to provide current path from anode to anode. The cases were crimped using an MTI hand crimper with a CR2032 crimp die. A commercially purchased Maxell CR2032 battery was used as a commercial control. For measuring load voltages, a resistance was connected in parallel and a timer was turned on immediately. The closed circuit voltage as measured by a DC multimeter, was noted at the 5 second time point. The open circuit voltage (OCV), 15 kOhm, 3.9 kOhm voltages remained relatively steady throughout the test condition. The 1 kOhm resistance condition was slightly decreased however, similar to the commercial control, and remained above 3V in all cases. There was no substantial increases in any of the batteries' resistance after storage at 60° C., 90% RH.

Prototype batteries constructed in accordance with this disclosure show stability to heat and humidity similar to the control and to commercially available batteries.

EQUIVALENTS

The foregoing written specification is sufficient to enable one skilled in the art to practice the embodiments. The foregoing description and Examples detail certain embodiments and describes the best mode contemplated by the inventors. It will be appreciated, however, that no matter how detailed the foregoing may appear in text, the embodiment may be practiced in many ways and should be construed in accordance with the appended claims and any equivalents thereof.

What is claimed is:

1. A battery comprising:
   a) an anode case;
   b) a cathode case comprising:
      i) a cathode inner conductive layer comprising aluminum (Al), stainless steel, chromium (Cr), gold (Au), vanadium (V), nickel (Ni), silver (Ag), copper (Cu), magnesium (Mg), zinc (Zn), an alloy thereof, or a combination of any two or more thereof, and
      ii) a cathode deactivating layer comprising a deactivating metal comprising niobium (Nb), tantalum (Ta), an alloy thereof, or any combination thereof, wherein the cathode deactivating layer has a uniform or varying thickness of 50 μm to 200 μm at least at a point in a bottom portion of the cathode case,
      iii) wherein a ratio of the thickness of the cathode deactivating layer to a thickness of the inner conductive layer is from 8:1 to 1:2.5 at least at a point in a bottom portion of the cathode case,
      iv) wherein the cathode case has a uniform or varying thickness of 200 μm to 250 μm at least at a point in a bottom portion of the cathode case,
      v) wherein the cathode case comprises a hem fold structure, wherein the hem fold structure comprises a first side and a second side wherein the first side of the hem fold contacts the second side of the hem fold,
      vi) and further wherein the cathode inner conductive layer and the cathode deactivating layer are in electrical contact,
   c) an electrochemical cell comprising an anode, a cathode, and a separator positioned between the anode and the cathode; and
   d) a gasket between the anode case and the cathode case.

2. The battery of claim 1, wherein the cathode deactivating layer has a uniform or varying thickness of 50 μm to 175 μm at least at a point in a bottom portion of the cathode case.

3. The battery of claim 1, wherein the battery further comprises an external coating on an outer surface of the anode case, or an outer surface of the cathode case, or both, wherein the external coating comprises Ni, Al, Cu, Cr, Zn, an alloy thereof, or any combination of two or more thereof, wherein the external coating has a uniform and varying thickness of 100 nm to 7 μm.

4. The battery of claim 1, wherein the ratio of the thickness of the cathode deactivating layer to the thickness of the inner conductive layer is from 8:1 to 1:2, or 8:1 to 1:1.1, or 8:1 to 1:1, or 6:1 to 1:2, or 3:1 at least at a point in a bottom portion of the cathode case.

5. The battery of claim 3, wherein the external coating comprises Ni and has a uniform and varying thickness of 100 nm to 200 nm.

6. The battery of claim 1, wherein a surface of the cathode inner conductive layer that is in electrical contact with the cathode deactivating layer is not exposed to an ambient environment after manufacture.

7. The battery of claim 1, wherein less than 0.01 mm², or less than 0.05 mm², or less than 0.1 mm², or less than 0.5 mm², or less than 1.0 mm², or less than 1.5 mm² of a surface of the inner conductive layer that is in electrical contact with the deactivating layer is exposed to an ambient environment after manufacture.

8. The battery of claim 1, wherein the cathode case is prepared from a clad laminate comprising the deactivating layer and the conductive layer, wherein the deactivating layer of the clad laminate has a uniform or varying thickness of 60 μm to 200 μm and the conductive layer of the clad laminate has a uniform or varying thickness of 50 μm to 190 μm; and
   wherein each of the first and second sides of the hem fold structure have deactivating layers with uniform or varying thickness of 14 μm to 75 μm and the hem fold structure has a total thickness of 200 μm to 250 μm.

9. The battery of claim 1, wherein the cathode inner conductive layer has a uniform or varying thickness of 50 μm to 200 μm.

10. The battery of claim 1, wherein the cathode inner conductive layer comprises stainless steel.

11. The battery of claim 1, further wherein the cathode deactivating layer has a uniform or varying thickness of 14 μm to 200 μm at least at a point within the hem fold structure.

12. The battery of claim 1, wherein the battery is a button or a coin cell-type battery.

13. The battery of claim 1, wherein a conductive pathway is formed between the anode and the cathode through a conductive aqueous medium when at least a portion of the anode case and a portion of the cathode case contact a conductive aqueous medium, and further wherein the conductive pathway is reduced or suppressed in less than 2 hours, or less than 1 hour, or less than 30 minutes after initial contact with the conductive aqueous medium.

14. The battery of claim 1, wherein the cathode deactivating layer oxidizes forming an oxide layer when at least a portion of the anode case and a portion of the cathode case contact a conductive aqueous medium, and wherein the battery provides a current of less than 1.5 mA, or of less than 1 mA, or of less than 0.5 mA, or of less than 0.3 mA after the oxide layer is formed.

15. The battery of claim 1, wherein the cathode deactivating layer oxidizes forming an oxide layer when at least a portion of the anode case and a portion of the cathode case contact a conductive aqueous medium, and wherein the battery provides a current of less than 1.5 mA, or of less than 1 mA, or of less than 0.5 mA, or of less than 0.3 mA after the oxide layer is formed and further wherein the oxide layer is formed in less than 2 hours, or less than 1 hour, or less than 30 minutes after initial contact with the conductive aqueous medium.

16. The battery of claim 1, wherein an electrolysis reaction occurs when at least a portion of the anode case and a portion of the cathode case contact a conductive aqueous medium, which the electrolysis reaction is suppressed or reduced in less than two hours, or less than 1 hour, or less than 30 minutes, after initial contact with the conductive aqueous medium.

17. The battery of claim 13, wherein the contact with the conductive aqueous medium comprises placement of the battery on a hydrated tissue such that the hydrated tissue contacts both at least a part of the anode case and a part of the cathode case to form a conductive pathway, wherein the hydrated tissue is hydrated pig esophageal tissue.

18. The battery of claim 13, wherein the contact with the conductive aqueous medium comprises immersion in 25% Ringer's solution, and
  i) wherein after immersion for 120 minutes, or for 60 minutes, or for 20 minutes, or for 10 min in 25% Ringer's solution, the pH of the 25% Ringer's solution is less than 9, or less than 8, or less than 7; and/or
  ii) wherein 25% Ringer's solution has a starting pH of 5 to 7.5, and after immersion of the battery in the 25% Ringer's solution, the average pH of the 25% Ringer's solution, sampled at 5-minute intervals, over a 60-minute time period, does not exceed an average pH of 9.5, 9, 8.5, or 8.

19. A cathode case comprising
  a) a cathode inner conductive layer comprising aluminum (Al), stainless steel, chromium (Cr), gold (Au), vanadium (V), nickel (Ni), silver (Ag), copper (Cu), magnesium (Mg), zinc (Zn), an alloy thereof, or a combination of any two or more thereof,
  b) a cathode deactivating layer comprising a deactivating metal comprising Ta, Nb, an alloy thereof, or any combination thereof, wherein the cathode deactivating layer has a uniform or varying thickness of 50 μm to 200 μm at least at a point in a bottom portion of the cathode case;
  c) wherein a ratio of the thickness of the cathode deactivating layer to a thickness of the inner conductive layer is from 8:1 to 1:2.5 at least at a point in a bottom portion of the cathode case,
  d) wherein the cathode case has a uniform or varying thickness of 200 μm to 250 μm at least at a point in a bottom portion of the cathode case, and
  e) further wherein the cathode case comprises a hem fold structure, wherein the hem fold structure comprises a first side and a second side wherein the first side of the hem fold contacts the second side of the hem fold.

20. The cathode case of claim 19, further comprising an external coating on an outer surface of the cathode case, wherein the external coating comprises Ni, Al, Cu, Cr, Zn, an alloy thereof, or any combination of two or more thereof, wherein the external coating has a uniform or varying thickness of 100 nm to 7 μm.

21. The cathode case of claim 20, wherein the external coating comprises Ni and has a uniform or varying thickness of 100 nm to 200 nm.

22. The cathode case of claim 19, further wherein the cathode deactivating layer has a uniform or varying thickness of 14 μm to 200 μm at least at a point within the hem fold structure.

23. The cathode case of claim 19, wherein deactivating metal comprises Nb, or an alloy thereof.

24. The cathode case of claim 19, wherein deactivating metal comprises Ta, or an alloy thereof.

25. The cathode case of claim 19, wherein the cathode inner conductive layer has a uniform or varying thickness of 50 μm to 200 μm.

26. The cathode case of claim 19, wherein the cathode inner conductive layer comprises stainless steel.

27. The cathode case of claim 19, wherein the ratio of the thickness of the cathode deactivating layer to the thickness of the inner conductive layer is from 8:1 to 1:2, or 8:1 to 1:1.1, or 8:1 to 1:1, or 6:1 to 1:2, or 3:1 at least at a point in a bottom portion of the cathode case.

28. The cathode case of claim 19, wherein the cathode deactivating layer oxidizes forming an oxide layer when at least a portion of the anode case and a portion of the cathode case contact a conductive aqueous medium, and wherein the battery provides a current of less than 1.5 mA, or of less than 1 mA, or of less than 0.5 mA, or of less than 0.3 mA after the oxide layer is formed and further wherein the oxide layer is formed in less than 2 hours, or less than 1 hour, or less than 30 minutes after initial contact with the conductive aqueous medium.

29. The cathode case of claim 19, wherein the cathode case is prepared from a clad laminate comprising: the deactivating layer and the conductive layer, wherein the deactivating layer in the clad laminate has a uniform or varying thickness of 60 μm to 200 μm and the conductive layer in the glad laminate has a uniform or varying thickness of 50 μm to 190 μm; and
  wherein each of the first and second sides of the hem fold structure have deactivating layers with uniform or varying thickness of 14 μm to 75 μm and the hem fold structure has a total thickness of 200 μm to 250 μm.

30. The cathode case of claim 19, wherein the cathode case is configured to be interchangeable with a cathode case of a commercially manufactured button cell battery or a coin cell battery.

* * * * *

UNITED STATES PATENT AND TRADEMARK OFFICE
CERTIFICATE OF CORRECTION

| | |
|---|---|
| PATENT NO. | : 11,469,465 B2 |
| APPLICATION NO. | : 17/410904 |
| DATED | : October 11, 2022 |
| INVENTOR(S) | : Bryan Eric Laulicht et al. |

It is certified that error appears in the above-identified patent and that said Letters Patent is hereby corrected as shown below:

In the Claims

In Claim 29, Column 72, Line 45, "the glad laminate" should be --the clad laminate--.

Signed and Sealed this
Third Day of January, 2023

Katherine Kelly Vidal
*Director of the United States Patent and Trademark Office*